US012786560B2

(12) United States Patent
Umeda et al.

(10) Patent No.: US 12,786,560 B2
(45) Date of Patent: Nov. 3, 2026

(54) IMAGING APPARATUS AND ELECTRONIC DEVICE

(71) Applicant: Sony Semiconductor Solutions Corporation, Kanagawa (JP)

(72) Inventors: Kengo Umeda, Tokyo (JP); Haruhisa Naganokawa, Kanagawa (JP); Kazuaki Hashimoto, Kanagawa (JP); Yukiyasu Tatsuzawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 266 days.

(21) Appl. No.: 18/696,629

(22) PCT Filed: Jun. 17, 2022

(86) PCT No.: PCT/JP2022/024300

§ 371 (c)(1),
(2) Date: Dec. 19, 2024

(87) PCT Pub. No.: WO2023/062873

PCT Pub. Date: Apr. 20, 2023

(65) Prior Publication Data

US 2025/0203201 A1 Jun. 19, 2025

(30) Foreign Application Priority Data

Oct. 13, 2021 (JP) ................................ 2021-168426

(51) Int. Cl.
*H04N 23/667* (2023.01)
*H04N 25/11* (2023.01)
(Continued)

(52) U.S. Cl.
CPC ........... *H04N 23/667* (2023.01); *H04N 25/11* (2023.01); *H04N 25/704* (2023.01); *H04N 25/772* (2023.01)

(58) Field of Classification Search
CPC .... H04N 23/667; H04N 25/11; H04N 25/704; H04N 25/772; H04N 25/78
See application file for complete search history.

(56) References Cited

U.S. PATENT DOCUMENTS

2015/0312537 A1* 10/2015 Solhusvik ........... H04N 25/133 348/302
2018/0054578 A1* 2/2018 Kitamori ............. H04N 23/667
(Continued)

FOREIGN PATENT DOCUMENTS

JP 2016224278 A 12/2016
JP 2018033118 A 3/2018
(Continued)

OTHER PUBLICATIONS

International Search Report (PCT/ISA/210), International Application No. PCT/JP2022/024300, dated Aug. 30, 2022.

*Primary Examiner* — Nhan T Tran
(74) *Attorney, Agent, or Firm* — Michael Best & Friedrich LLP

(57) ABSTRACT

According to the present disclosure, an imaging apparatus including a plurality of pixel units is provided. Each of the pixel units includes: a plurality of photoelectric conversion elements; a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, in which, there are: a first mode in which electric charges photoelectrically converted by the plurality of photoelectric conversion elements are transferred to the floating diffusion in different periods, and a conversion period of the analog-to-digital conversion unit is made different in accordance with the different periods; and
(Continued)

a second mode in which electric charges generated by at least two of the plurality of photoelectric conversion elements are transferred to the floating diffusion, and are simultaneously converted by the analog-to-digital conversion unit.

22 Claims, 44 Drawing Sheets

(51) Int. Cl.

| | |
|---|---|
| ***H04N 25/704*** | (2023.01) |
| ***H04N 25/772*** | (2023.01) |

(56) References Cited

U.S. PATENT DOCUMENTS

| | | | | |
|---|---|---|---|---|
| 2018/0123050 | A1* | 5/2018 | Rosselli | C07D 221/14 |
| 2019/0013799 | A1* | 1/2019 | Sakakibara | H04N 25/78 |
| 2020/0119065 | A1* | 4/2020 | Yun | H10F 39/8063 |
| 2020/0161352 | A1* | 5/2020 | Takahashi | H04N 25/778 |
| 2022/0190023 | A1* | 6/2022 | Jeong | H10F 39/18 |

FOREIGN PATENT DOCUMENTS

| | | | |
|---|---|---|---|
| JP | 2020092346 | A | 6/2020 |
| WO | 2017119220 | A1 | 7/2017 |
| WO | 2019119220 | A1 | 6/2019 |

* cited by examiner

FIG. 37

| | UNIT 1 | UNIT 2 | UNIT 3 | UNIT 4 |
|---|---|---|---|---|
| 1st AD | B+C+D | A+B+C+D | A+B+C+D | A+B+C+D |
| 2nd AD | A | | | |

(MODE 1) MOVING SUBJECT+BRIGHT STATE→GS, AND ZAF IS USED FOR AF

FIG. 38

| | UNIT 1 | UNIT 2 | UNIT 3 | UNIT 4 |
|---|---|---|---|---|
| 1st AD | B+C+D | A+C | A+B | A+B+C+D |
| 2nd AD | A | B+D | C+D | |

(MODE 2) MOVING SUBJECT+DARK STATE→GS, AND 2x2OCL IS USED FOR AF

FIG. 39

| | UNIT 1 | UNIT 2 | UNIT 3 | UNIT 4 |
|---|---|---|---|---|
| 1st AD | A | A | A | A |
| 2nd AD | B | B | B | B |
| 3rd AD | C | C | C | C |
| 4th AD | D | D | D | D |

(MODE 3) STILL SUBJECT+BRIGHT STATE→NON-GS, AND ZAF IS USED FOR AF

FIG. 40

| | UNIT 1 | UNIT 2 | UNIT 3 | UNIT 4 |
|---|---|---|---|---|
| 1st AD | A | A+C | A+B | A |
| 2nd AD | B | B+D | C+D | B |
| 3rd AD | C | | | C |
| 4th AD | D | | | D |

(MODE 3) STILL SUBJECT+DARK STATE→NON-GS, AND 2x2OCL IS USED FOR AF

IMAGING APPARATUS AND ELECTRONIC DEVICE

TECHNICAL FIELD

The present disclosure relates to an imaging apparatus and an electronic device.

BACKGROUND ART

An imaging apparatus of a pixel AD type that performs AD conversion for every pixel is known. However, since an AD conversion unit is provided for every pixel, a pixel size increases, and it is difficult to miniaturize the pixel. Therefore, development of an imaging apparatus that performs AD conversion for every area in which an AD conversion unit is shared by a plurality of pixels is in progress.

CITATION LIST

Patent Document

Patent Document 1: International Publication No. 2017/119220

SUMMARY OF THE INVENTION

Problems to be Solved by the Invention

Whereas, in an imaging apparatus that performs AD conversion for every area of sharing, image distortion occurs due to a shift in reading time for every pixel.

Therefore, the present disclosure provides an imaging apparatus and an electronic device capable of suppressing distortion of an image while suppressing an increase in pixel size.

Solutions to Problems

In order to solve the problem described above, according to the present disclosure, an imaging apparatus is provided including a plurality of pixel units, in which each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

Each of the plurality of photoelectric conversion elements may be connected to the floating diffusion via a first transistor, and the imaging apparatus may further include a vertical driving unit configured to supply a first control signal that brings the first transistor into a connected state or a disconnected state.

A predetermined potential may be supplied to each of the plurality of photoelectric conversion elements via a second transistor, and the vertical driving unit may further include a vertical driving unit configured to supply two control signals that bring the second transistor into a connected state or a disconnected state.

The vertical driving unit may change the first control signal and the second control signal in response to a mode setting signal.

Each of the plurality of photoelectric conversion elements may receive light in a same wavelength band.

At least two photoelectric conversion elements among the plurality of photoelectric conversion elements may individually receive light via color filters of different colors.

At least one of the plurality of photoelectric conversion elements may be configured as a pixel in which a light receiving unit is partially shielded from light by a light shielding member.

Each of the plurality of photoelectric conversion elements may receive light via a lens arranged at a corresponding position.

At least two photoelectric conversion elements among the plurality of photoelectric conversion elements may receive light via one lens arranged at a position corresponding to the at least two photoelectric conversion elements.

The plurality of photoelectric conversion elements may include a first photoelectric conversion element formed containing silicon and a second photoelectric conversion element formed containing non-silicon.

The first photoelectric conversion element and the second photoelectric conversion element may be stacked, and the first photoelectric conversion element may receive light transmitted through the second photoelectric conversion element.

The imaging apparatus may receive light transmitted through a lens arranged at a position corresponding to the stacked first and second photoelectric conversion elements.

In the first mode, the vertical driving unit may control the second transistor connected to each of the plurality of photoelectric conversion elements from a disconnected state to a connected state in time series.

In the second mode, the vertical driving unit may simultaneously control the second transistor connected to each of the plurality of photoelectric conversion elements from a disconnected state to a connected state.

The plurality of photoelectric conversion elements in each of the pixel units may include at least two or more photoelectric conversion elements configured to receive light through a green filter, a photoelectric conversion element configured to receive light through a red filter, and a photoelectric conversion element configured to receive light through a blue filter, and there may be:

a mode in which electric charges generated by the plurality of photoelectric conversion elements are individually transferred to the floating diffusion in different periods, and a conversion period of the analog-to-digital conversion unit is made different in accordance with the different periods; and a mode including a first period in which an electric charge generated by the photoelectric conversion element that has received light via the red filter or the blue filter is transferred to the floating diffusion and converted by the analog-to-digital conversion unit, the mode including a second period different from the first period in which electric charges generated by the at least two or more photoelectric conversion elements that receive light via the green filter are transferred to the floating diffusion and simultaneously converted by the analog-to-digital conversion unit.

Light may be received through one lens arranged at a position corresponding to at least two photoelectric conversion elements among the plurality of photoelectric conversion elements in each of the pixel units, and there may be:

a mode in which electric charges generated by the two photoelectric conversion elements are individually transferred to the floating diffusion in different periods, and a conversion period of the analog-to-digital conversion unit is made different in accordance with the different periods; and a mode in which electric charges generated by the two photoelectric conversion elements are transferred to the floating diffusion, and are simultaneously converted by the analog-to-digital conversion unit.

Light may be received through one lens arranged at a position corresponding to at least four photoelectric conversion elements among the plurality of photoelectric conversion elements in each of the pixel units, and there may be:

a mode in which electric charges generated by the four photoelectric conversion elements are individually transferred to the floating diffusion in different periods, and a conversion period of the analog-to-digital conversion unit is made different in accordance with the different periods;

a mode in which electric charges generated by two photoelectric conversion elements among the four photoelectric conversion are transferred to the floating diffusion, and are simultaneously converted by the analog-to-digital conversion unit; and a mode in which electric charges generated by the four photoelectric conversion elements are transferred to the floating diffusion, and are simultaneously converted by the analog-to-digital conversion unit.

At least one of the plurality of photoelectric conversion elements in each of the pixel units may be configured as a pixel in which a light receiving unit is partially shielded from light by a light shielding member, and there may be:

a mode in which electric charges generated by the plurality of photoelectric conversion elements are individually transferred to the floating diffusion in different periods, and a conversion period of the analog-to-digital conversion unit is made different in accordance with the different periods; and a mode in which an electric charge generated by a photoelectric conversion element that has received light via the predetermined diaphragm is transferred to the floating diffusion and converted by the analog-to-digital conversion unit, and then electric charges generated by photoelectric conversion elements different from the photoelectric conversion element that has received light via the predetermined diaphragm among the plurality of photoelectric conversion elements are transferred to the floating diffusion and simultaneously converted by the analog-to-digital conversion unit.

There may be:

a mode in which electric charges generated by at least two photoelectric conversion elements among the plurality of photoelectric conversion elements in each of the pixel units are individually transferred to the floating diffusion in different periods, and a conversion period of the analog-to-digital conversion unit is made different in accordance with the different periods; and a mode in which an electric charge generated by one photoelectric conversion element among the plurality of photoelectric conversion elements is transferred to the floating diffusion and converted by the analog-to-digital conversion unit, and then electric charges generated by two photoelectric conversion elements among the plurality of photoelectric conversion elements are transferred to the floating diffusion and simultaneously converted by the analog-to-digital conversion unit.

In order to solve the problem described above, according to the present disclosure, an imaging apparatus is provided in which a plurality of first pixel units and a plurality of second pixel units are arranged, a first control signal supplied to a first pixel unit and a first control signal supplied to a second pixel unit are individually connected to a vertical driving unit, and the vertical driving unit changes the first control signal supplied to the first pixel unit and the first control signal supplied to the second pixel unit in response to a mode setting signal.

In order to solve the problem described above, according to the present disclosure, an electronic device is provided including:

the imaging apparatus; and a control unit configured to generate the mode setting signal in accordance with image data generated using the imaging apparatus.

The control unit may generate the mode setting signal on the basis of a degree of brightness of a subject based on the image data and a degree of motion of the subject.

The control unit may generate the mode setting signal on the basis of a degree of motion of the subject.

In order to solve the problem described above, according to the present disclosure, an electronic device is provided including:

a pixel array unit including a plurality of pixel groups each including a plurality of image-plane phase difference pixels; and a control unit configured to perform control to provide a different timing of imaging a subject through a lens for each of the plurality of pixel groups, in which there may be at least one of:

a fixed mode in which a position of the lens is fixed; or a moving mode in which a position of the lens is different for each of the different timings.

The electronic device may further include:

a phase difference detecting section configured to generate phase difference information on the basis of an image signal of the plurality of phase difference pixels; and an inference unit configured to use the phase difference information to infer a position of the lens in a next frame or a next sub frame.

In the fixed mode, the phase difference detecting section may generate time-series phase difference information on the basis of an image signal of the plurality of phase difference pixels, the image signal being obtained for each of the plurality of pixel groups, and the inference unit may use the time-series phase difference information to infer a position of the lens of a next frame.

The control unit may move the lens to a position of the lens inferred by the inference unit on the basis of image capture start time of a next frame.

In the moving mode, the control unit may cause a display section to display a captured image obtained for the plurality of pixel groups each.

An input unit configured to input an instruction signal for selection of an image to be displayed on the display section may be further provided, and the control unit may select a captured image obtained for the plurality of pixel groups each, on the basis of the instruction signal.

The control unit may cause a storage unit to store only a captured image selected from among captured images obtained for the plurality of pixel groups each, on the basis of the instruction signal.

The pixel array unit may be sectioned into rectangular regions, and pixels including the plurality of image-plane phase difference pixels may be arranged in a matrix, and the control unit may read image signals in parallel in a predetermined order from a pixel in a region for each of the rectangular regions.

In the moving mode, a plurality of image-plane phase difference pixels may be included in each of the rectangular regions, and the electronic device may further include:

a phase difference detecting section configured to generate phase difference information on the basis of an image signal read in a predetermined order for each of the rectangular regions; and an inference unit capable of inferring a position of a lens in accordance with the predetermined order by using the phase difference information.

In order to solve the problem described above, according to the present disclosure, an electronic device may be provided in which, in a pixel array unit, pixels including the plurality of image-plane phase difference pixels may be arranged in a matrix, and the pixel array unit may be sectioned into rectangular regions, and the electronic device may include a control unit configured to read image signals in parallel in a predetermined order from a pixel in a region for each of the rectangular regions.

The pixel array unit may include a plurality of pixel units, and each of the pixel units may include:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements.

There may be:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

The pixel array unit may include a plurality of pixel units, each of the pixel units may include: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there may be:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

The pixel array unit may include a plurality of pixel units, each of the pixel units may include: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, light may be received through one on-chip lens arranged at a position corresponding to at least two photoelectric conversion elements among the plurality of photoelectric conversion elements in each of the pixel units, and there may be:

a mode in which electric charges generated by the two photoelectric conversion elements are individually transferred to the floating diffusion in different periods, and a conversion period of the analog-to-digital conversion unit is made different in accordance with the different periods; and a mode in which electric charges generated by the two photoelectric conversion elements are transferred to the floating diffusion, and are simultaneously converted by the analog-to-digital conversion unit.

The pixel array unit may include a plurality of pixel units, each of the pixel units may include: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, light may be received through one on-chip lens arranged at a position corresponding to at least four photoelectric conversion elements among the plurality of photoelectric conversion elements in each of the pixel units, and there may be:

a mode in which electric charges generated by the four photoelectric conversion elements are individually transferred to the floating diffusion in different periods, and a conversion period of the analog-to-digital conversion unit is made different in accordance with the different periods;

a mode in which electric charges generated by two photoelectric conversion elements among the four photoelectric conversion are transferred to the floating diffusion, and are simultaneously converted by the analog-to-digital conversion unit; and a mode in which electric charges generated by the four photoelectric conversion elements are transferred to the floating diffusion, and are simultaneously converted by the analog-to-digital conversion unit.

The pixel array unit may include a plurality of pixel units, each of the pixel units may include: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, at least one of the plurality of photoelectric conversion elements in each of the pixel units may be configured as a pixel in which a light receiving unit is partially shielded from light by a light shielding member, and there may be:

a mode in which electric charges generated by the plurality of photoelectric conversion elements are individually transferred to the floating diffusion in different periods, and a conversion period of the analog-to-digital conversion unit is made different in accordance with the different periods; and a mode in which an electric charge generated by a photoelectric conversion element that has received light via the predetermined diaphragm is transferred to the floating diffusion and converted by the analog-to-digital conversion unit, and then electric charges generated by photoelectric conversion elements different from the photoelectric conversion element that has received light via the predetermined diaphragm among the plurality of photoelectric conversion elements are transferred to the floating diffusion and simultaneously converted by the analog-to-digital conversion unit.

In order to solve the problem described above, according to the present disclosure, an electronic device is provided including:

a pixel array unit including a plurality of pixel groups each including a plurality of image-plane phase difference pixels;

a control unit configured to perform control to provide a different timing of imaging a subject through a lens for each of the plurality of pixel groups;

a phase difference detecting section configured to generate time-series phase difference information on the basis of an image signal of the plurality of phase difference pixels, the image signal being obtained for each of the plurality of pixel groups; and an inference unit configured to use the time-series phase difference information to infer a position of the lens of a next frame.

In order to solve the problem described above, according to the present disclosure, an electronic device is provided including:

a pixel array unit including a plurality of pixel groups each including a plurality of image-plane phase difference pixels; and a control unit configured to perform control to provide a different timing of imaging a subject through a lens for each of the plurality of pixel groups, in which the control unit changes a position of the lens for each of the plurality of pixel groups.

BRIEF DESCRIPTION OF DRAWINGS

FIG. 37 is a table depicting a mode determination example in a case where luminance of a subject is in a bright state and a degree of motion is high.

FIG. 38 is a table depicting a mode determination example in a case where luminance of a subject is in a dark state and a degree of motion is high.

FIG. 39 is a table depicting a mode determination example in a case where luminance of a subject is in a bright state and a degree of motion is low.

FIG. 40 is a table depicting a mode determination example in a case where luminance of a subject is in a dark state and a degree of motion is low.

MODE FOR CARRYING OUT THE INVENTION

The following is a description of embodiments of an imaging apparatus and an electronic device, with reference to the drawings. Although principal components of the imaging apparatus and the electronic device will be mainly described below, the imaging apparatus and the electronic device may include components and functions that are not illustrated or described. The following description does not exclude components and functions that are not illustrated or described.

First Embodiment

Figure 1:
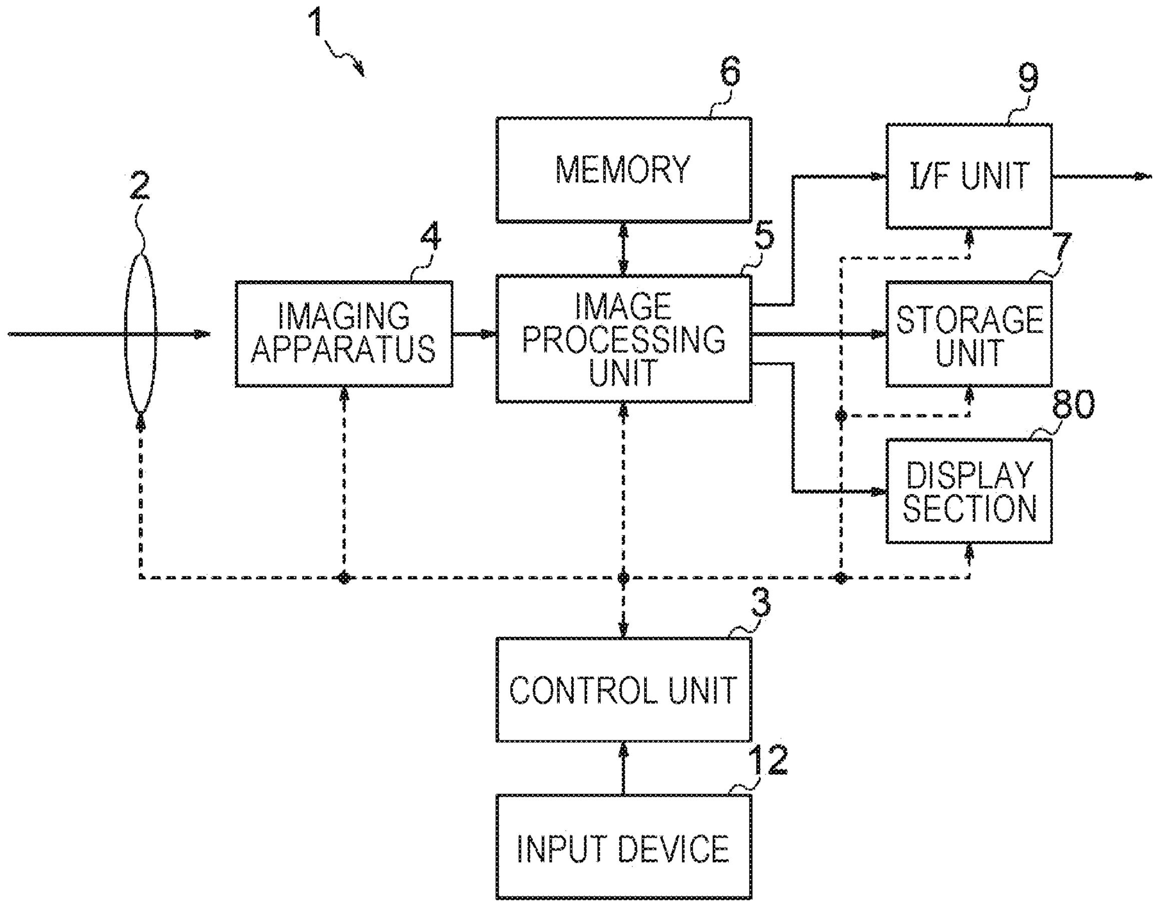
FIG. 1 is a block diagram depicting a configuration of an example of an electronic device.

FIG. 1 is a block diagram depicting a configuration of an example of an electronic device 1 applicable in common to each embodiment. In FIG. 1, the electronic device 1 includes an optical system 2, a control unit 3, an imaging apparatus 4, an image processing unit 5, a memory 6, a storage unit 7, a display section 80, an interface (I/F) unit 9, and an input device 12.

Here, as the electronic device 1, a digital still camera, a digital video camera, a mobile phone or a smartphone with an imaging function, or the like can be applied. Furthermore, a monitoring camera, an in-vehicle camera, a medical camera, or the like can also be applied as the electronic device 1.

The imaging apparatus 4 includes, for example, a plurality of photoelectric conversion elements arranged in a matrix. The photoelectric conversion element converts received light into electric charges by photoelectric conversion. Details of the imaging apparatus 4 will be described later.

The optical system 2 includes a main lens obtained by combining one or a plurality of lenses and a mechanism for driving the main lens, and forms an image of image light (incident light) from a subject on a light receiving surface of the imaging apparatus 4 via the main lens. Furthermore, the optical system 2 includes an autofocus mechanism that adjusts focus in response to a control signal and a zoom mechanism that changes a zoom ratio in response to a control signal. Furthermore, the electronic device 1 may be configured such that the optical system 2 is detachable and can be replaced with another optical system 2. Moreover, an on-chip lens of the imaging apparatus 4 may be included in the optical system 2.

The image processing unit 5 executes predetermined image processing on image data output from the imaging apparatus 4. For example, the image processing unit 5 is connected to the memory 6 such as a frame memory, and writes image data output from the imaging apparatus 4 into the memory 6. The image processing unit 5 performs predetermined image processing on the image data written in the memory 6, and writes again the image data subjected to the image processing in the memory 6.

The storage unit 7 is, for example, a non-volatile memory such as a flash memory or a hard disk drive, and stores image data output from the image processing unit 5 in a non-volatile manner. The display section 80 includes, for example, a display device such as a liquid crystal display (LCD) and a drive circuit that drives the display device, and can display an image based on image data output by the image processing unit 5. The I/F unit 9 is an interface for transmitting image data output from the image processing unit 5 to the outside. For example, a universal serial bus (USB) can be applied as the I/F unit 9. Without limiting to this, the I/F unit 9 may be an interface connectable to a network by wired communication or wireless communication.

The input device 12 includes an operation element for receiving a user input. If the electronic device 1 is, for example, a digital still camera, a digital video camera, a mobile phone or a smartphone with an imaging function, the input device 12 can include a shutter button for instructing imaging by the imaging apparatus 4 or an operation element for realizing the function of the shutter button.

The control unit 3 includes, for example, a processor such as a central processing unit (CPU), a read only memory (ROM), and a random access memory (RAM), and controls the entire operation of the electronic device 1 by using the RAM as a work memory, in accordance with a program stored in advance in the ROM. For example, the control unit 3 can control the operation of the electronic device 1 in accordance with a user input received by the input device 12. Furthermore, the control unit 3 can control the autofocus mechanism in the optical system 2 on the basis of an image processing result of the image processing unit 5. Furthermore, the control unit 3 can set a drive mode of the imaging apparatus 4 on the basis of image data output from the imaging apparatus 4. Note that, in the present embodiment, the drive mode may be simply referred to as a mode.

Figure 2:
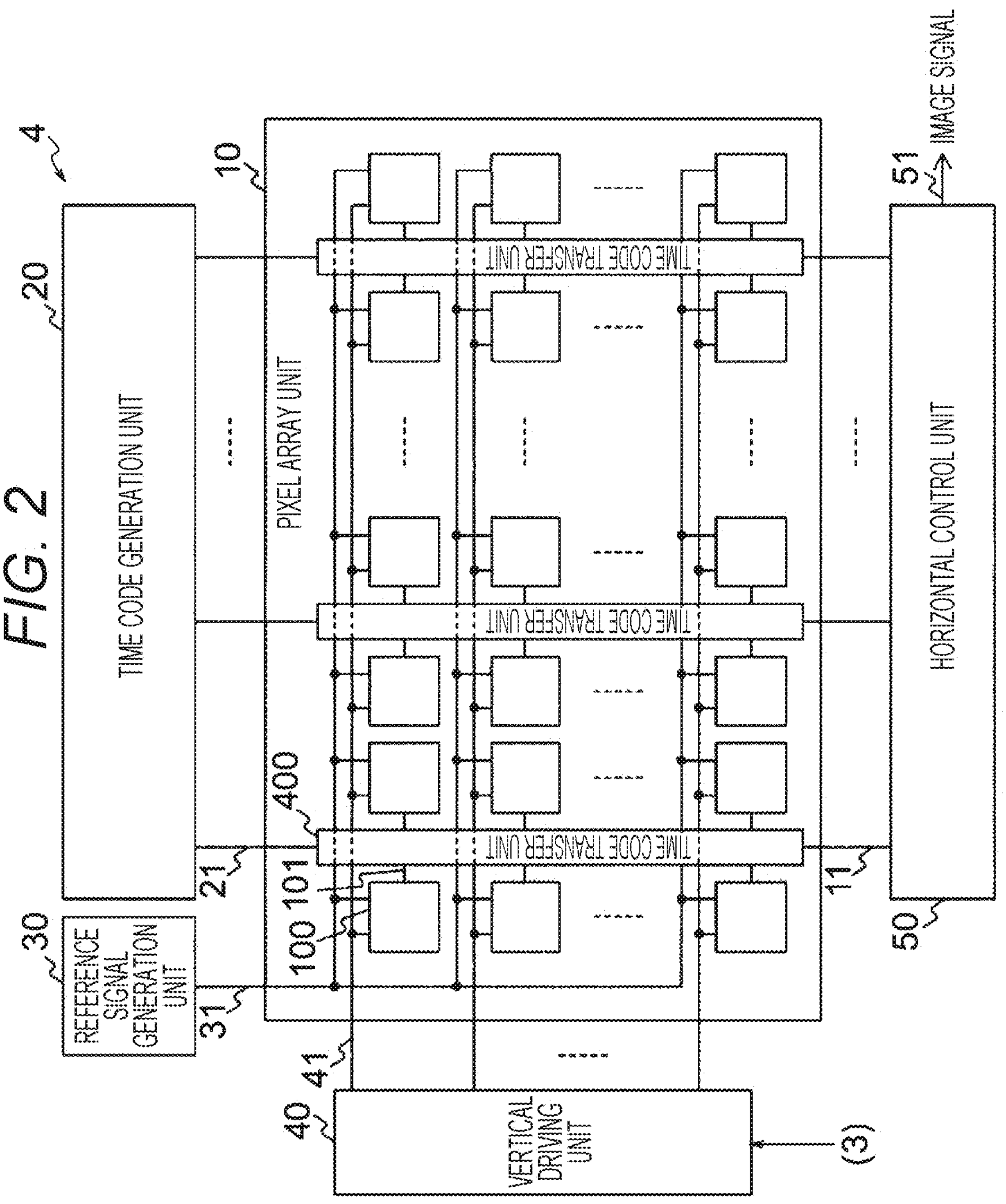
FIG. 2 is a diagram depicting a configuration example of an imaging apparatus.

FIG. 2 is a diagram depicting a configuration example of the imaging apparatus 4 according to an embodiment of the present technology. The imaging apparatus 4 includes a pixel array unit 10, a time code generation unit 20, a reference signal generation unit 30, a vertical driving unit 40, and a horizontal control unit 50.

In the pixel array unit 10, a plurality of pixel units 100 is arranged to generate an image signal. The pixel array unit 10 includes the pixel units 100 that are arranged in a two-dimensional matrix to generate an image signal, and a plurality of time code transfer units 400 arranged between pixel columns. The pixel unit 100 includes a plurality of pixels 140 (see FIG. 4 described later). Moreover, the plurality of pixels 140 is arranged in a two-dimensional matrix. The pixel unit 100 performs photoelectric conversion to generate an analog image signal, and performs analog-to-digital conversion on the analog image signal. Thereafter, the pixel unit 100 outputs a time code to be described later as a result of the analog-to-digital conversion. The time code transfer unit 400 transfers this time code. A signal line 101 is a signal line that connects the pixel unit 100 and the time code transfer unit 400. Details of the pixel unit 100 will be described later.

The time code generation unit 20 generates a time code, and outputs the time code to the time code transfer unit 400. Here, the time code is a code indicating an elapsed time from a start of analog-to-digital conversion in the pixel unit 100. The time code has a size equal to a bit depth of a digital image signal after conversion, and for example, a gray code can be used. The time code is output to the time code transfer unit 400 via a signal line 21.

The reference signal generation unit 30 generates a reference signal, and outputs the reference signal to the pixel unit 100. This reference signal is a signal serving as a reference for analog-to-digital conversion in the pixel unit 100, and for example, a signal whose voltage decreases in a ramp shape can be used. This reference signal is output via a signal line 31. Furthermore, the generation and the output of the time code by the time code generation unit 20 are executed in synchronization with the generation and the output of the reference signal by the reference signal generation unit 30. As a result, the time code and the reference signal output from the time code generation unit 20 and the reference signal generation unit 30 correspond to each other on a one-to-one basis, and a voltage of the reference signal can be acquired from the time code. A time code decoding unit 52 described later performs decoding by acquiring the voltage of the reference signal from the time code.

The vertical driving unit 40 generates and outputs a control signal or the like of the pixel unit 100. This control signal is output to the pixel unit 100 via a signal line 41. Furthermore, the vertical driving unit 40 changes the control signal in accordance with a drive mode supplied from the control unit 3.

The horizontal control unit 50 processes the time code transferred by the time code transfer unit 400. The time code is input to the horizontal control unit 50 via a signal line 11.

Figure 3:
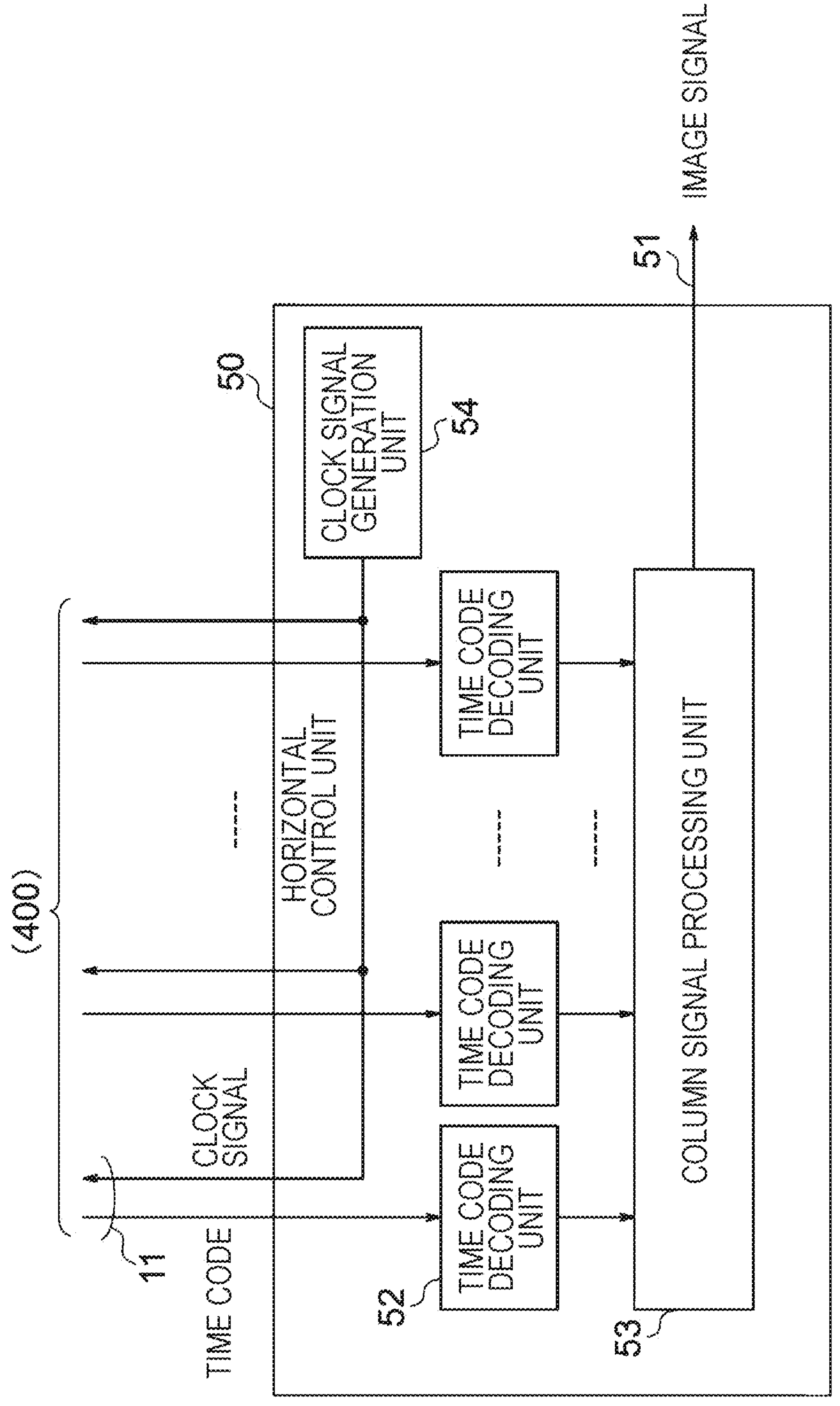
FIG. 3 is a diagram depicting a configuration example of a horizontal control unit.

FIG. 3 is a diagram depicting a configuration example of the horizontal control unit 50 according to an embodiment of the present technology. The horizontal control unit 50 includes the time code decoding unit 52, a column signal processing unit 53, and a clock signal generation unit 54.

The time code decoding unit 52 decodes a time code. By this decoding, a digital image signal that is a result of analog-to-digital conversion is generated. A plurality of the time code decoding units 52 is arranged in the horizontal control unit 50, and has a one-to-one correspondence with the time code transfer unit 400 arranged in the pixel array unit 10. The time code is simultaneously input from the corresponding time code transfer units 400 to these time code decoding units 52. Decoding of the input time code is simultaneously performed in parallel by these time code decoding units 52. Thereafter, the plurality of decoded digital image signals is input to the column signal processing unit 53.

The column signal processing unit 53 processes a digital image signal output from the time code decoding unit 52. As this processing, correlated double sampling (CDS) can be performed. Furthermore, the column signal processing unit 53 horizontally transfers the processed digital image signal. In this case, the processed image signals corresponding to the plurality of digital image signals simultaneously input by the plurality of time code decoding units 52 are sequentially transferred and output. The image signal output from the column signal processing unit 53 corresponds to an output image signal of the imaging apparatus 4.

Figure 4:
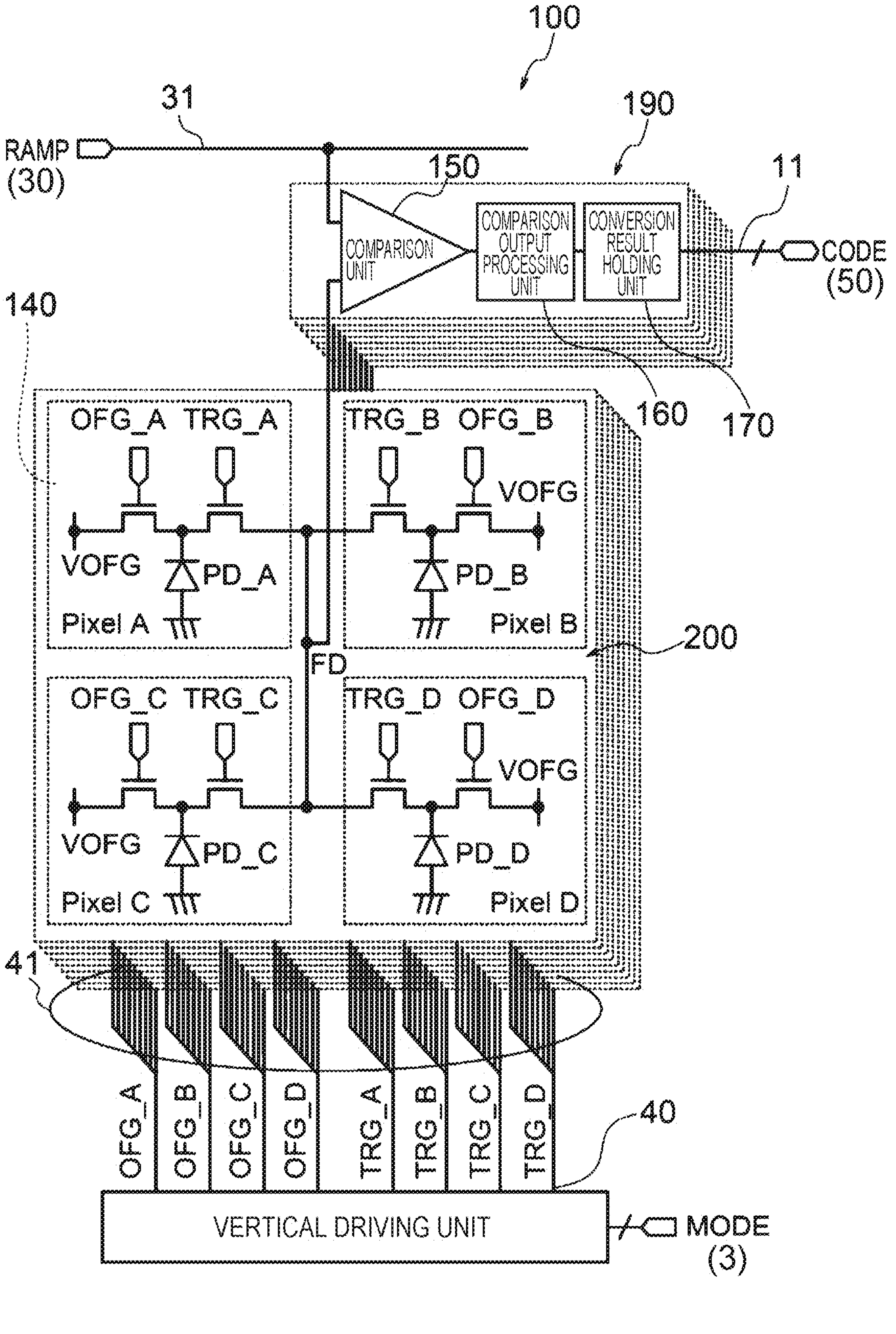
FIG. 4 is a block diagram depicting a configuration example of a pixel unit.

FIG. 4 is a block diagram depicting a configuration example of the pixel unit 100. As depicted in FIG. 4, the pixel unit 100 includes an AD conversion unit 190 and a unit 200. The AD conversion unit 190 performs analog-to-digital conversion on an analog image signal generated by the unit 200. The analog-to-digital conversion unit (AD conversion unit) 190 includes a comparison unit 150, a comparison output processing unit 160, and a conversion result holding unit 170.

The unit 200 includes a plurality of pixels 140 and a floating diffusion (floating diffusion layer) FD connected to the plurality of pixels 140. For example, the analog-to-digital conversion unit 190 and the unit 200 are stacked to be configured. In the floating diffusion FD, an electric charge corresponding to one of a plurality of analog image signals output from the plurality of pixels 140 or corresponding to an addition value of the plurality of analog image signals is accumulated. That is, a voltage of the floating diffusion FD corresponds to one of the plurality of analog image signals or an addition value of the plurality of analog image signals. Therefore, in the following description, the voltage of the floating diffusion FD may be referred to as an analog image signal. Note that the floating diffusion (floating diffusion layer) FD according to the present embodiment corresponds to an energy storage unit.

The analog-to-digital conversion unit 190 performs analog-to-digital conversion on the analog image signals generated by the plurality of pixels 140 and the like. The analog-to-digital conversion unit 190 includes the comparison unit 150, the comparison output processing unit 160, and the conversion result holding unit 170. Since the analog-to-digital conversion unit 190 is configured in the pixel array unit 10, it is possible to perform AD conversion on the voltage of the floating diffusion FD at a higher speed. Furthermore, since one analog-to-digital conversion unit 190 is configured for the unit 200, a volume of the pixel array unit 10 can be made smaller than that in a case where one analog-to-digital conversion unit 190 is configured for every pixel 140.

The comparison unit 150 compares a reference signal RAMP generated by the reference signal generation unit 30 with the voltage of the floating diffusion FD. A comparison result is output to the comparison output processing unit 160. That is, the comparison unit 150 compares the reference signal with one of the plurality of analog image signals output from the pixels 140 and the like or an addition value of the plurality of analog image signals. A comparison result of this is output as an electric signal. For example, a signal having a value "1" is output when a voltage of the analog image signal is smaller than a voltage of the reference signal, and a signal having a value "0" is output when the voltage of the analog image signal is larger than the voltage of the reference signal.

The comparison output processing unit 160 processes the comparison result output by the comparison unit 150, and outputs the processed comparison result to the conversion result holding unit 170. The processed comparison result is output to the conversion result holding unit 170. As this processing, for example, level conversion and waveform shaping can be performed.

On the basis of the processed comparison result output by the comparison output processing unit 160, the conversion result holding unit 170 holds a time code output from the time code transfer unit 400 as a result of analog-to-digital conversion. For example, when the comparison result changes from the value "1" to "0", the conversion result holding unit 170 holds the time code output from the time code transfer unit 400. The time code at this time is a time code generated by the time code generation unit 20 and transferred to the pixel 140 by the time code transfer unit 400. Thereafter, the conversion result holding unit 170 outputs the held time code to the time code transfer unit 400 under the control of the vertical driving unit 40. The time code transfer unit 400 transfers the output time code to the time code decoding unit 52 of the horizontal control unit 50.

The conversion result holding unit 170 uses a signal that changes in a ramp shape from a high voltage to a low voltage as the reference signal RAMP, and holds a time code of when the voltage of the reference signal RAMP transitions from a state higher than the voltage of the analog image signal to a state lower than the voltage of the analog image signal. That is, the time code of when the analog image signal and the reference signal become substantially equal is held in the conversion result holding unit 170. The held time code is converted into a digital signal representing the voltage of the reference signal at a corresponding time in the time code decoding unit 52 (see FIG. 3). As a result, the analog image signals generated by the pixels 140 and the like can be subjected to analog-to-digital conversion.

Figure 5:
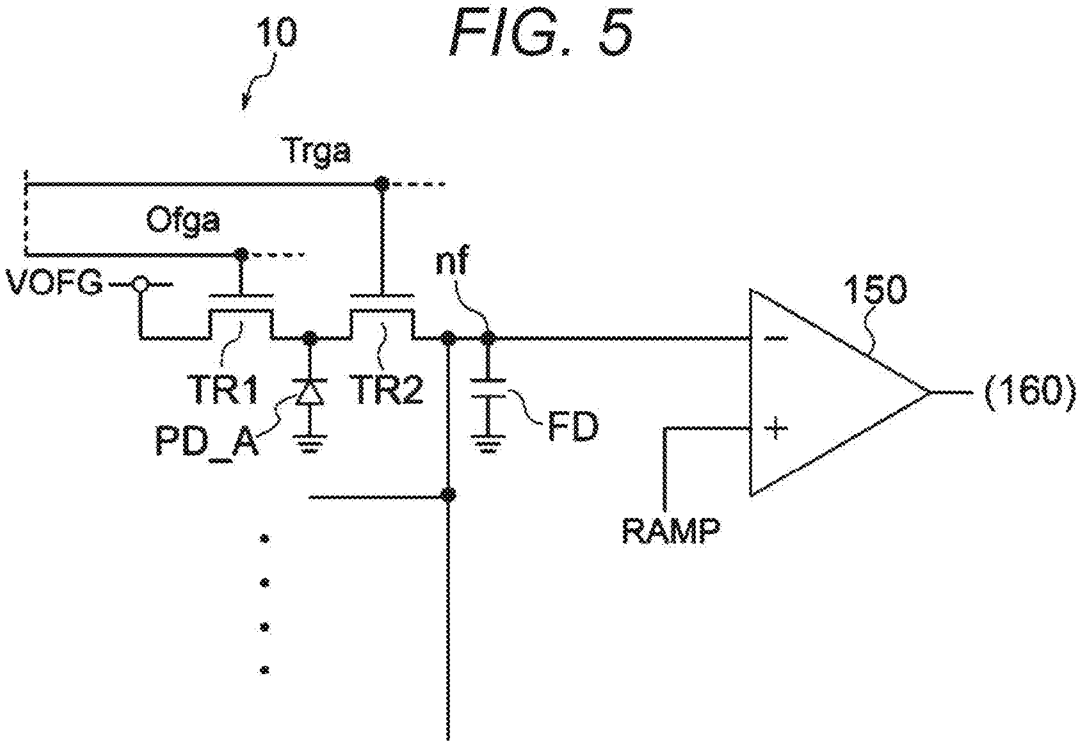
FIG. 5 is a block diagram depicting a circuit configuration example of a unit.

FIG. 5 is a block diagram depicting a circuit configuration example of the unit 200. While referring to FIG. 4, a circuit configuration example of the unit 200 will be described with reference to FIG. 5. As depicted in FIG. 5, in the unit 200, a plurality of pixels 140 is connected to a node nf. That is, the unit 200 includes a plurality of photoelectric conversion elements PD_A, PD_B, PD_C, and PD_D, a plurality of overflow gate transistors TR1, a plurality of charge transfer transistors TR2, and the floating diffusion FD (indicated by a symbol of a capacitor in the figure). The overflow gate transistor TR1 and the charge transfer transistor TR2 are, for example, N-channel MOS transistors. In the following description, the pixels 140 including the plurality of photoelectric conversion elements PD_A, PD_B, PD_C, and PD_D may be referred to as Pixel A, Pixel B, Pixel C, and Pixel D (see FIG. 13 described later), respectively. Note that the overflow gate transistor TR1 according to the present embodiment corresponds to a first transistor, and the charge transfer transistor TR2 according to the present embodiment corresponds to a second transistor.

Here, the pixel 140 including the photoelectric conversion element PD_A will be described, but other pixels 140 also have an equivalent configuration. More specifically, a power supply voltage VOFG is applied to a drain of the overflow gate transistor TR1, and a source is connected to a cathode of the photoelectric conversion element PD_A. An anode of the photoelectric conversion element PD_A is grounded. Furthermore, a source of the charge transfer transistor TR2 is connected to the cathode of the photoelectric conversion element PD_A, and a drain is connected to the node nf. One end of the floating diffusion FD is connected to the node nf. Furthermore, another end of the floating diffusion FD is grounded. Furthermore, the node nf is connected to an inverting terminal of the comparison unit 150. The reference signal RAMP is input to a non-inverting terminal of the comparison unit 150.

A signal line Ofga is connected to a gate of the overflow gate transistor TR1, and a control signal OFG_A is supplied thereto. The overflow gate transistor TR1 enters a conductive state when the control signal OFG_A is at a high level, and the overflow gate transistor TR1 enters a non-conductive state when the control signal OFG_A is at a low level.

Furthermore, a signal line Trga is connected to a gate of the charge transfer transistor TR2, and a control signal TRG_A is supplied thereto. The charge transfer transistor TR2 enters a conductive state when the control signal TRG_A is at a high level, and the charge transfer transistor TR2 enters a non-conductive state when the control signal TRG_A is at a low level.

The photoelectric conversion element PD_A generates electric charges corresponding to an amount of emitted light, and holds the generated electric charge. For example, a photodiode can be used as the photoelectric conversion element PD_A.

The overflow gate transistor TR1 discharges electric charges excessively generated in the photoelectric conversion element PD_A. Furthermore, the overflow gate transistor TR1 discharges the electric charges accumulated in the photoelectric conversion element PD_A, in the conductive state.

The charge transfer transistor TR2 transfers the electric charges generated by the photoelectric conversion element PD_A to the floating diffusion FD. That is, the charge transfer transistor TR2 transfers the electric charges by conducting between the photoelectric conversion element PD_A and the floating diffusion FD.

As described above, a signal corresponding to the electric charges held in the floating diffusion FD corresponds to the analog image signal generated by the photoelectric conversion element PD_A, and is output to the comparison unit 150. In this way, the plurality of signal lines (Ofga, Trga) is connected to the pixel 140, and the control signals OFG_A and TRG_A are supplied thereto. As described above, other pixels 140 also have an equivalent configuration. That is, the plurality of signal lines (Ofg, Trg) is connected to each of other pixels 140, and control signals OFG_B, TRG_B, OFG_C, TRG_C, OFG_D, and TRG_D are supplied thereto. Note that the pixel unit 100 according to the present embodiment includes four pixels 140, but is not limited thereto. For example, as described later, the number of pixels 140 may be eight. Moreover, the number of pixels 140 may be 16, 32, or the like.

A configuration example of the unit 200 will be described with reference to FIGS. 6 to 12. Various on-chip lenses, filters, and the like can be arranged in the unit 200. Note that a filter according to the present embodiment will be described as an example of a color filter, but is not limited thereto, and a deflection filter or the like may be arranged.

Figure 6:
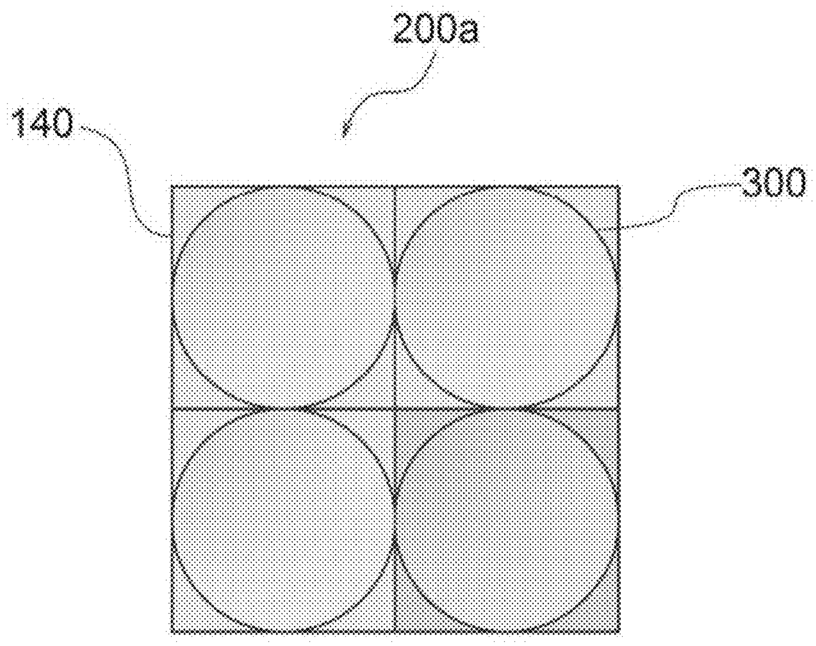
FIG. 6 is a view depicting a configuration example of a unit in which one on-chip lens is arranged for one pixel.

FIG. 6 is a view depicting a configuration example of a unit 200*a* in which one on-chip lens 300 is arranged for one pixel 140. As depicted in FIG. 6, in the unit 200*a*, one on-chip lens 300 is provided for each pixel 140. The on-chip lens 300 can condense light incident on a photoelectric conversion unit of the photoelectric conversion element of the pixel 140 via the optical system 2 (see FIG. 1).

Figure 7:
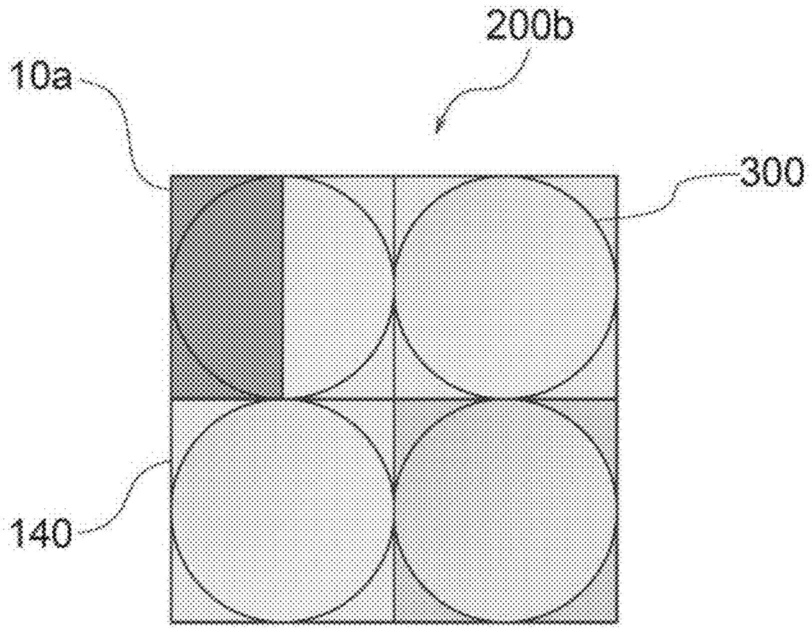
FIG. 7 is a view depicting a configuration example of a unit in which an on-chip lens is arranged in an image-plane phase pixel.

FIG. 7 is a view depicting a configuration example of a unit 200*b* in which the on-chip lens 300 is arranged in each of three pixels 140 and an image-plane phase pixel 10*a*. As depicted in FIG. 7, in the unit 200*b*, one on-chip lens 300 is provided for each of the pixels 140 and the image-plane phase pixel (ZAF pixel) 10*a*. In the image-plane phase pixel 10*a*, for example, a slit-shaped diaphragm is arranged in a light receiving unit, and a range through which incident light passes is limited. That is, the image-plane phase pixel 10*a* is configured as a pixel in which a part of the light receiving unit is shielded from light by a light shielding member.

The on-chip lens 300 can condense light on the photoelectric conversion unit of the photoelectric conversion element in the pixel 140. Furthermore, image-plane phase information of the electronic device 1 can be obtained by the image plane pixel 10*a*, and autofocus of the electronic device 1 can be performed.

Figure 8:
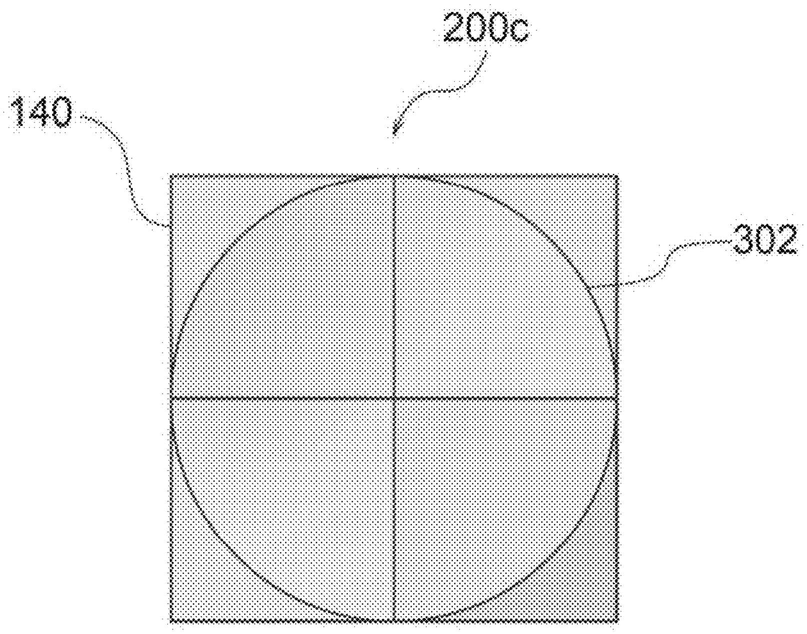
FIG. 8 is a view depicting a configuration example of a unit in which one on-chip lens 2 is arranged for four pixels.

FIG. 8 is a view depicting a configuration example of a unit 200*c* in which one on-chip lens 302 is arranged for four pixels 140. As depicted in FIG. 8, in the unit 200*c*, one on-chip lens 302 is provided for the four pixels 140. The on-chip lens 302 can condense light on the photoelectric conversion unit of the photoelectric conversion element of the four pixels 140. In the unit 200*c*, it is also possible to obtain phase information by simultaneously adding pixel signals by two vertical pixels. Similarly, in the unit 200*c*, it is also possible to obtain image-plane phase information by simultaneously adding pixel signals by two horizontal pixels. For example, the image-plane phase information of the image-plane phase pixel 140*a* (see FIG. 7) has higher accuracy in a bright state, and the image-plane phase information of the unit 200*c* has higher accuracy in a dark state.

Figure 9:
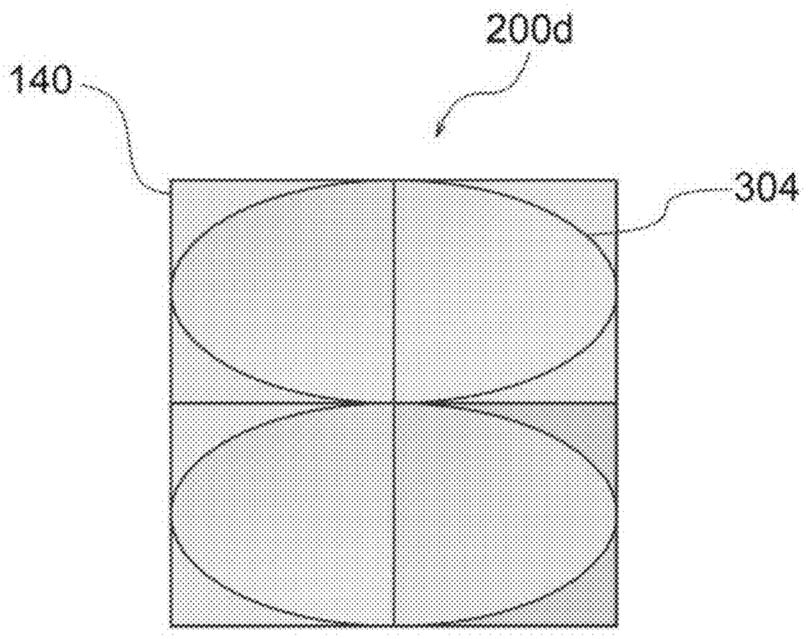
FIG. 9 is a view depicting a configuration example of a unit in which one on-chip lens is arranged for two pixels.

FIG. 9 is a view depicting a configuration example of a unit 200*d* in which one on-chip lens 304 is arranged for two pixels 140. As depicted in FIG. 9, in the unit 200*d*, one on-chip lens 304 is provided for every two pixels. As a result, a combination of the two pixels 140 of the unit 200*d* can detect an image-plane phase difference. As a result, information about a focus state of the electronic device 1 can be obtained, and autofocus can be performed. Image-plane phase information of the unit 200*d* has higher accuracy in a dark state, for example. In this way, for example, image-plane phase information of each of the image-plane phase pixel 10*a* (see FIG. 7), the unit 200*c*, and the unit 200*d* can be selectively used in accordance with brightness of a subject.

Figure 10:
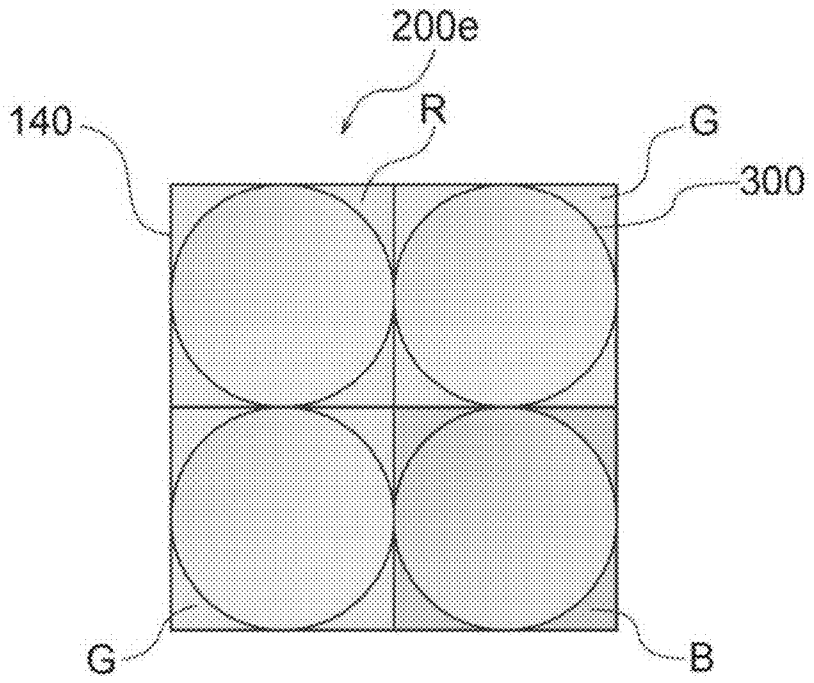
FIG. 10 is a view depicting a configuration example of a unit in which color filters in a Bayer array are arranged.

FIG. 10 is a view depicting a configuration example of a unit 200*e* in which color filters R, G, and B in a Bayer array are arranged. In the figure, reference numeral R denotes the pixel 140 in which the color filter R is arranged and red light is received, reference numeral G denotes the pixel 140 in which the color filter G is arranged and green light is received, and reference numeral B denotes the pixel 140 in which the color filter B is arranged and blue light is received. This similarly applies to other drawings. In the unit 200*e*, color imaging is possible. Furthermore, in the present embodiment, a pixel in which the color filter R is arranged may be referred to as a red pixel, a pixel in which the color filter G is arranged may be referred to as a green pixel, and a pixel in which the color filter B is arranged may be referred to as a blue pixel.

Figure 11:
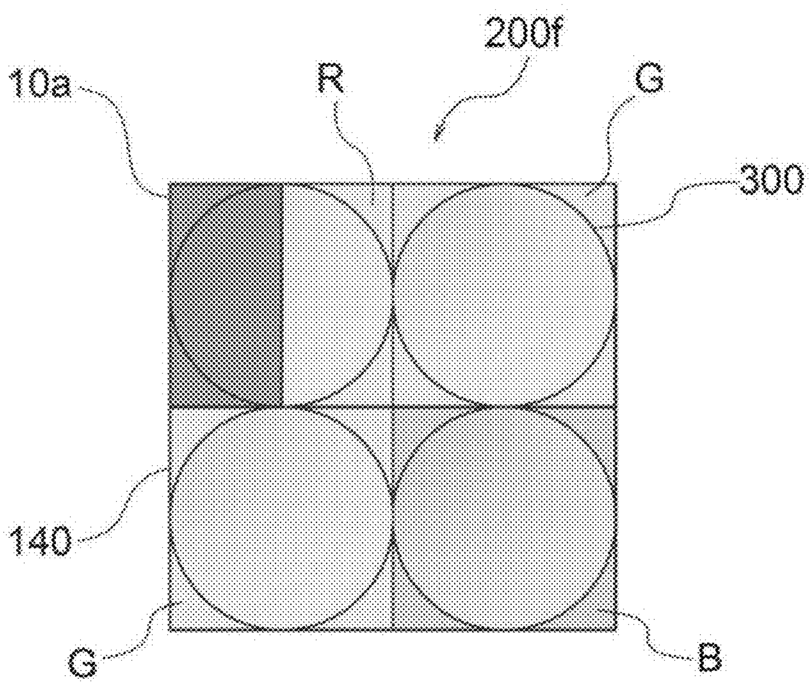
FIG. 11 is a view depicting a configuration example of a unit of the Bayer array including image-plane phase pixels.
Figure 12:
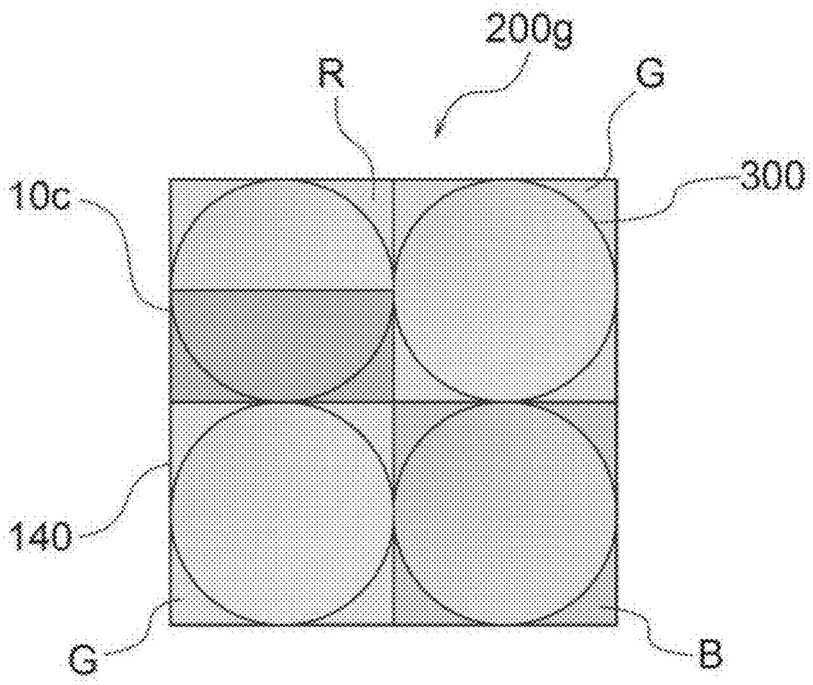
FIG. 12 is a view depicting a configuration example of a unit of the Bayer array including image-plane phase pixels having different phase directions.

FIG. 11 is a view depicting a configuration example of a unit 200*f* in the Bayer array including the image-plane phase pixel 10*a*. FIG. 12 is a diagram depicting a configuration example of a unit 200*g* in the Bayer array including an image-plane phase pixel 10*c* having a phase direction different from that in FIG. 11. In the units 200*f* and 200*g*, color imaging is possible. Furthermore, the units 200*f* and 200*g* can detect an image-plane phase difference.

Here, an imaging mode of the imaging apparatus 4 will be described with reference to FIGS. 13 and 14. As described above, the imaging apparatus 4 sets a drive mode by changing each of the control signals of OFG_A to OFG_D and TRG_A to TRG_D in response to a control signal from the control unit 3 (see FIG. 1).

Figure 13:
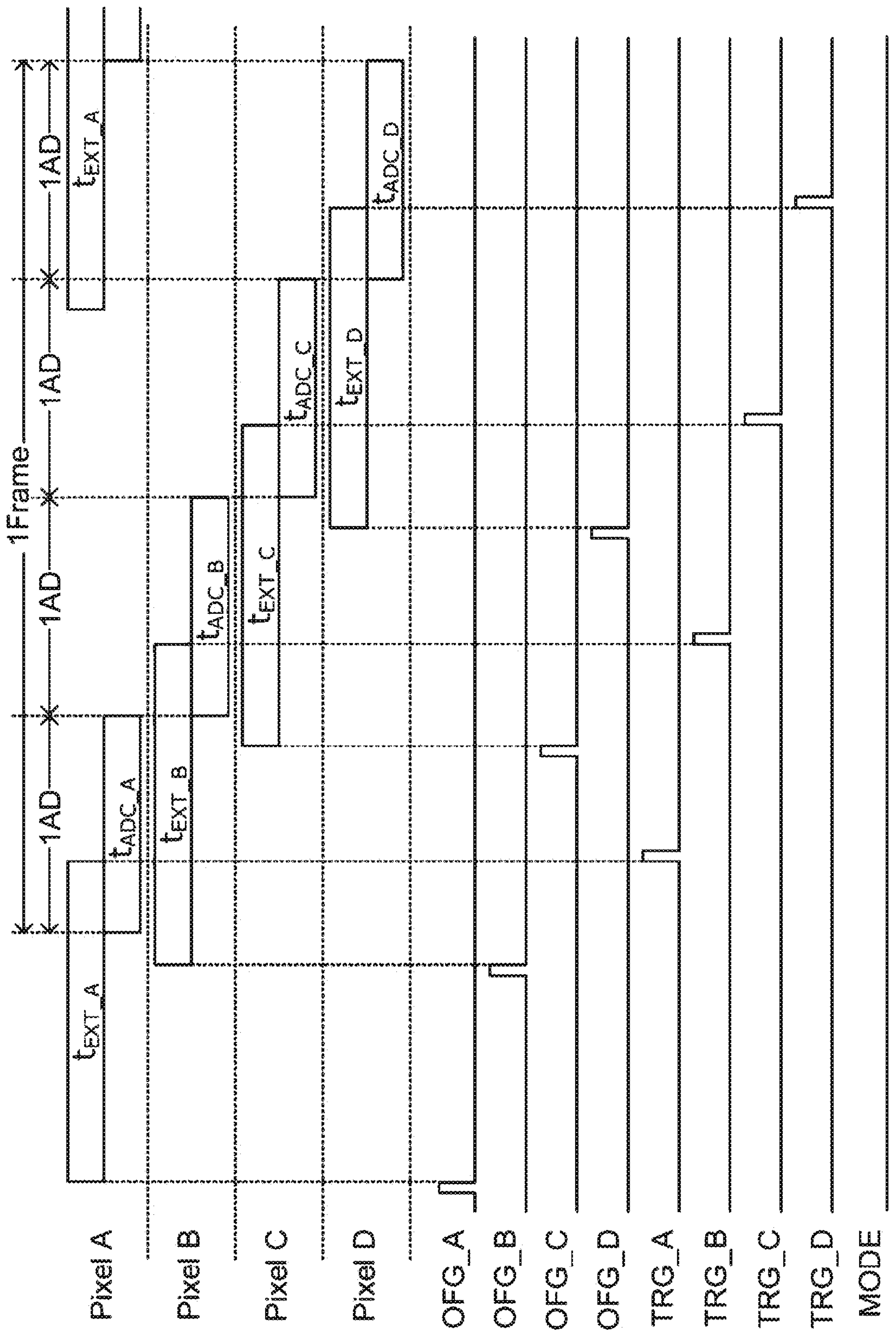
FIG. 13 is a time chart depicting a control example in Mode 1.

FIG. 13 is a time chart depicting a control example of Mode 1. A horizontal axis represents time. As described above, Pixel A, Pixel B, Pixel C, and Pixel D indicate the individual pixels 140 constituting the unit 200. Furthermore, the control signals OFG_A to OFG_D indicate gate signals of the overflow gate transistor TR1 (see FIG. 5), and the control signals TRG_A to TRG_D indicate gate signals of the charge transfer transistor TR2. A mode setting signal MODE supplied from the control unit 3 indicates Mode 1 in a case of low, and indicates Mode 2 in a case of high, for example.

As depicted in FIG. 13, first, the control signal OFG_A becomes a high level, and the photoelectric conversion element PD_A (see FIG. 4) of Pixel A is reset. Subsequently, the control signal OFG_A becomes a low level, and a photoelectric conversion period $t_{EXT\_A}$ by the photoelectric conversion element PD_A is started.

Next, the floating diffusion FD (see FIG. 4) is reset, and an AD conversion period $t_{ADCT\_A}$ of Pixel A is started. Subsequently, the control signal TRG_A becomes a high level, accumulated electric charges of the photoelectric conversion element PD_A of Pixel A are transferred to the floating diffusion FD, and the photoelectric conversion period $t_{EXT\_A}$ is ended. Subsequently, the AD conversion period $t_{ADCT\_A}$ is ended. Pixel B, Pixel C, and Pixel D are similarly driven, and AD conversion periods $t_{ADCT\_A}$ to $t_{ADCT\_D}$ are executed with a time series shift so as not to overlap. In Mode 1, each of the AD conversion periods $t_{ADCT\_A}$ to $t_{ADCT\_D}$ corresponds to one AD period, and four AD periods correspond to one Frame.

In this way, in Mode 1, the photoelectric conversion periods $t_{EXT\_A}$ to $T_{EXT\_D}$ of the individual pixels 140 constituting the unit 200 are executed with a time series shift. Then, in conjunction with the photoelectric conversion periods $T_{EXT\_A}$ to $T_{EXT\_D}$, the AD conversion periods $t_{ADCT\_A}$ to $t_{ADCT\_D}$ are executed with a time series shift so as not to overlap as described above. As can be seen from these, in the control example of Mode 1, the accumulated electric charges for each of the pixels Pixel A, Pixel B, Pixel C, and Pixel D are converted into a digital image signal. As a result, in Mode 1, a high-resolution image can be captured. Furthermore, a mode in which the accumulated electric charges of each of the pixels Pixel A, Pixel B, Pixel C, and Pixel D are converted into a digital image signal may be referred to as a high-resolution mode.

Figure 14:
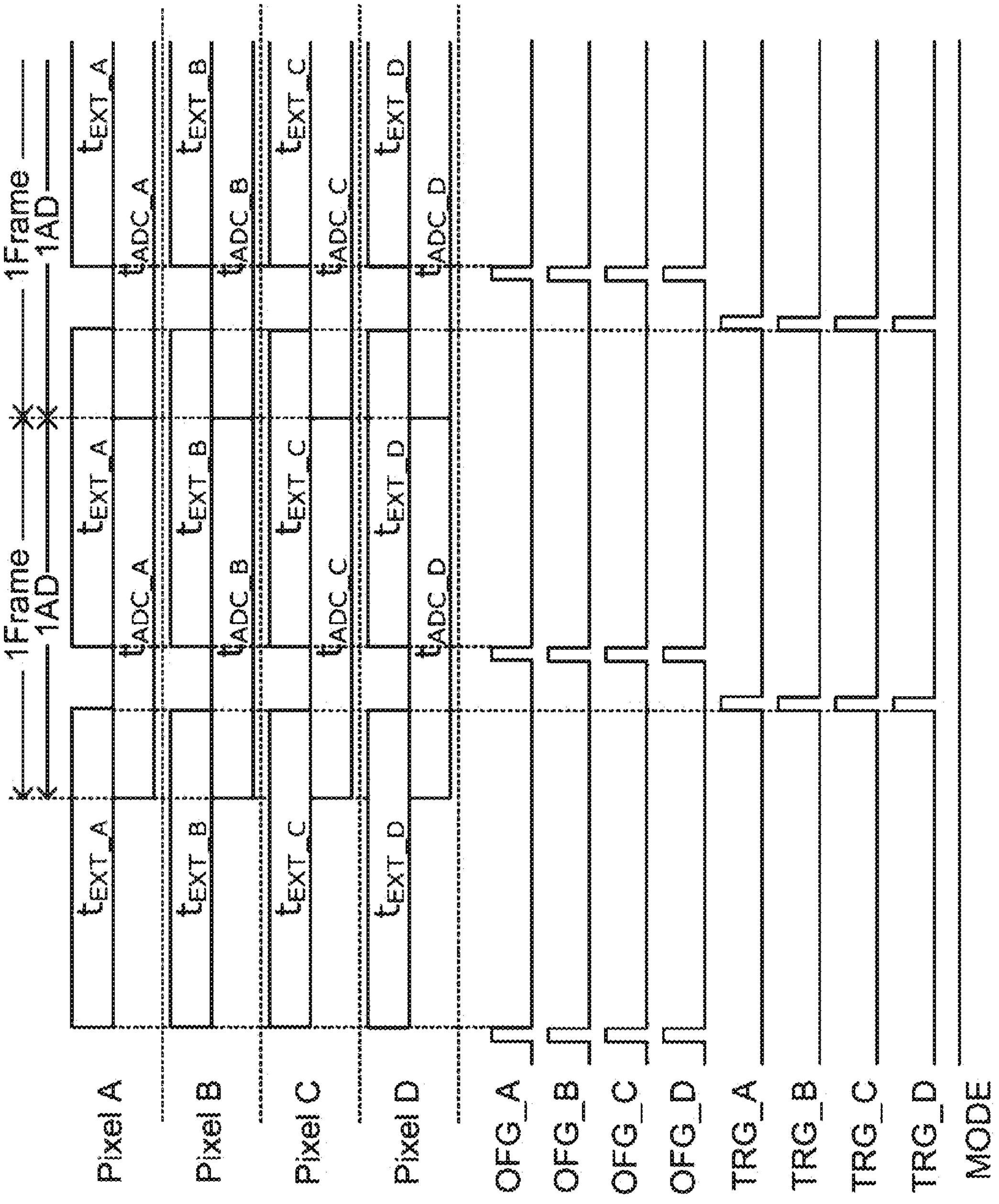
FIG. 14 is a time chart depicting a control example in Mode 2.

FIG. 14 is a time chart depicting a control example of Mode 2. A horizontal axis represents time. Pixel A, Pixel B, Pixel C, and Pixel D indicate the individual pixels 140 constituting the unit 200. Furthermore, the control signals OFG_A to OFG_D indicate gate signals of the overflow gate transistor TR1 (see FIG. 5), and the control signals OFG_A to OFG_D indicate gate signals of the charge transfer transistor TR2. The mode setting signal MODE indicates Mode 1 in a case of low, and indicates Mode 2 in a case of high. Mode 2 is an example corresponding to a global shutter method in which all the pixels 140 included in the pixel array unit 10 are simultaneously driven to an exposure state.

As depicted in FIG. 14, first, the control signals OFG_A to OFG_D simultaneously become a high level, and the photoelectric conversion elements PD_A (see FIG. 4) of Pixel A to Pixel D are reset. Subsequently, OFG_A to OFG_D simultaneously become a low level, and the photoelectric conversion periods $t_{EXT\_A}$ to $t_{EXT\_D}$ by the photoelectric conversion elements PD_A to PD_D are simultaneously started. Note that each of the AD conversion periods $t_{ADCT\_A}$ to $t_{ADCT\_D}$ corresponds to one AD period, and one AD period corresponds to one Frame in Mode 2.

Next, the floating diffusion FD (see FIG. 4) is reset, and the AD conversion periods $t_{ADCT\_A}$ to $t_{ADCT\_D}$ Of Pixel A to Pixel D are simultaneously started. Subsequently, the control signals TRG_A to TRG_G simultaneously become a high level, accumulated electric charges of the photoelectric conversion elements PD_A to PD_DA of Pixel A to Pixel D are simultaneously transferred to the floating diffusion FD, and the photoelectric conversion periods $t_{EXT\_A}$ to $T_{EXT\_D}$ are simultaneously ended. Subsequently, the AD conversion periods $t_{ADCT\_A}$ to $t_{ADCT\_D}$ are ended simultaneously. As can be seen from these, in the control example of Mode 2, photoelectric conversion is simultaneously performed for each of the pixels Pixel A, Pixel B, Pixel C, and Pixel D, and individual accumulated electric charges are summed by the floating diffusion FD and converted into a digital image signal. As a result, in Mode 2, it is possible to perform global shutter (GS) imaging by the global shutter method in which image distortion due to a shift in imaging time in each pixel is suppressed although the resolution is lower than that in Mode 1.

Here, various control examples will be further described with reference to flowcharts depicted in FIGS. 15 to 20. Note that, in FIGS. 15 to 20, a description will be given to an example of controlling the mode by using the mode selection signal from the input device 12 in the electronic device 1 (see FIG. 1), but the present invention is not limited thereto. As described later, the control unit 3 can also set the mode on the basis of image data of the imaging apparatus 4.

Figure 15:
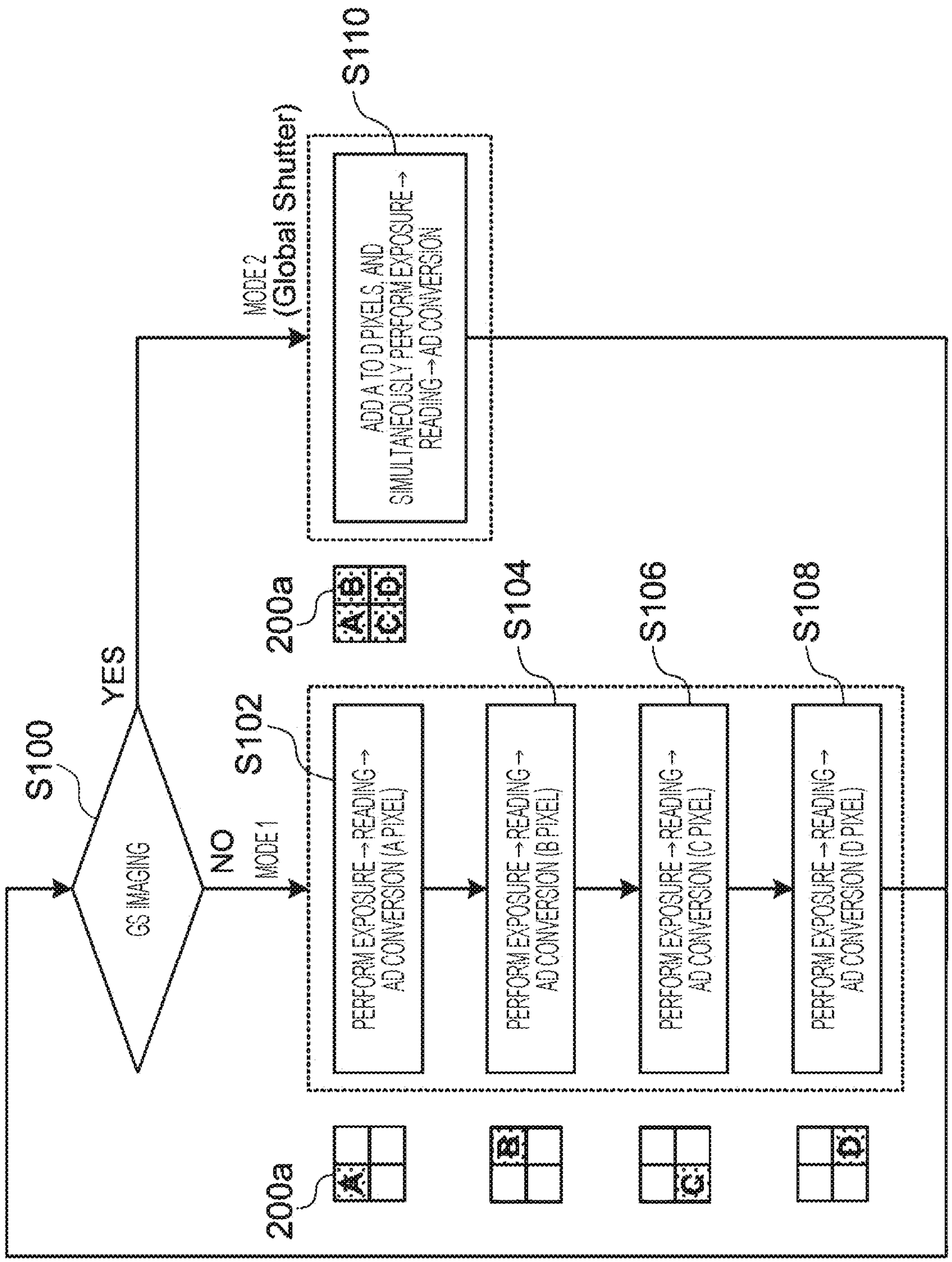
FIG. 15 is a flowchart depicting a control example of Mode 1 and Mode 2.

FIG. 15 is a flowchart depicting a control example of Mode 1 and Mode 2. As depicted in FIG. 15, Mode 2 is a control example of global shutter (GS) imaging. Here, an example using the unit 200*a* (see FIG. 6) will be described.

First, a mode selection signal is input from the input device 12 (see FIG. 1) of the electronic device 1, and the control unit 3 determines whether or not to be the GS imaging on the basis of the input (step S100). When the control unit 3 determines not to be the global shutter imaging (NO in step S100), the control unit 3 starts the control depicted in FIG. 13 as Mode 1, for example. That is, first, photoelectric conversion by exposure of Pixel A, reading, and AD conversion are performed (step S102). Next, photoelectric conversion by exposure of Pixel B, reading, and AD conversion are performed (step S104). Next, photoelectric conversion by exposure of Pixel C, reading, and AD conversion are performed (step S106). Next, photoelectric conversion by exposure of Pixel D, reading, and AD conversion are performed (step S108).

Whereas, when the control unit 3 determines to be the global shutter imaging (YES in step S100), the control unit 3 starts the control depicted in FIG. 14 as Mode 2, for example. That is, photoelectric conversion by exposure of Pixel A to Pixel D is simultaneously performed, reading is simultaneously performed to the floating diffusion FD (see FIG. 4), and AD conversion is performed on the basis of a potential of the floating diffusion FD (step S110). In this way, the high-resolution imaging in Mode 1 and the GS imaging can be performed under the control of the control unit 3.

Figure 16:
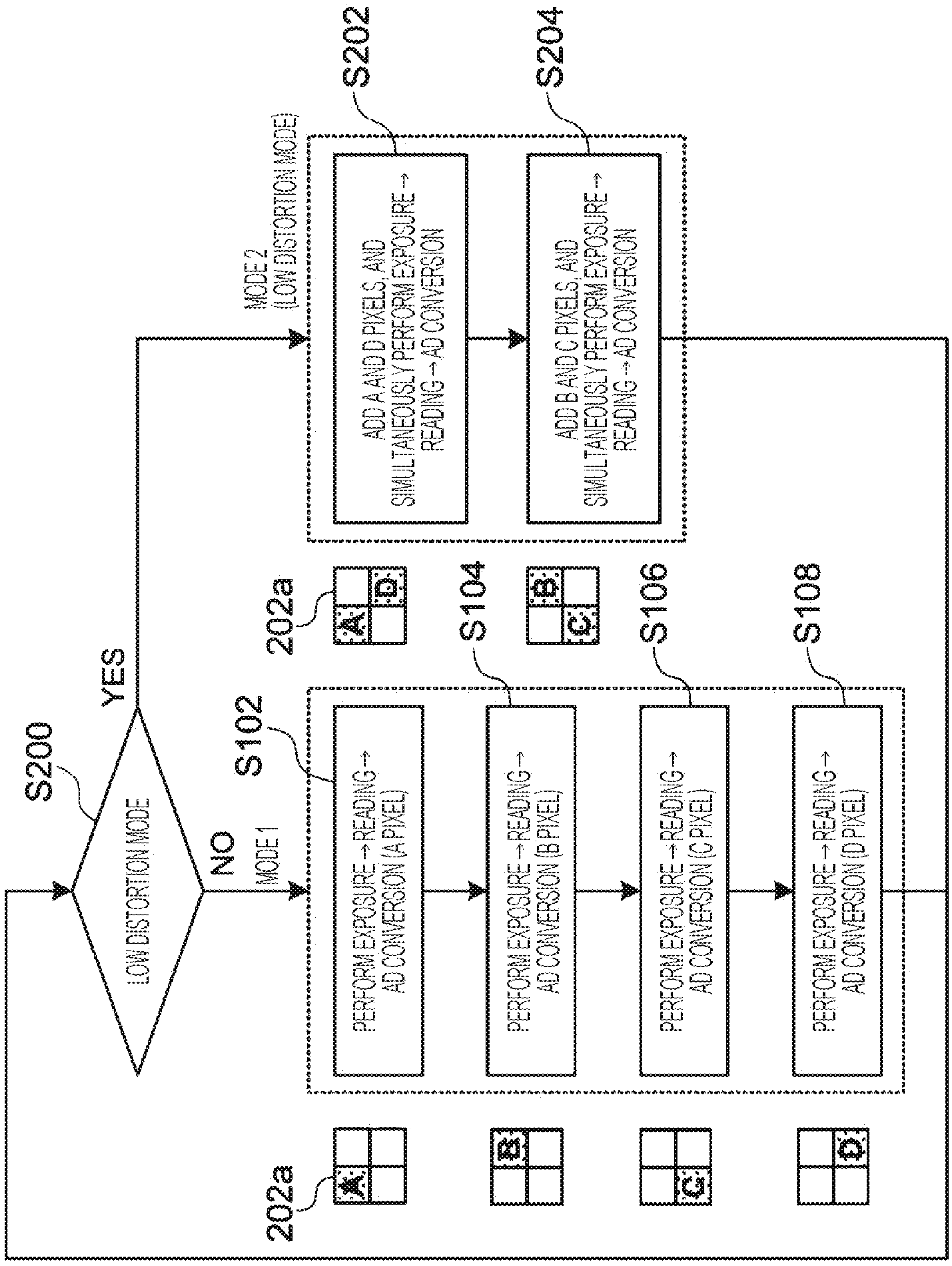
FIG. 16 is a flowchart depicting a control example having a low distortion mode.

FIG. 16 is a flowchart depicting a control example having a low distortion mode. As depicted in FIG. 16, Mode 2 is an example corresponding to the low distortion mode. Here, an example using the unit 200*a* (see FIG. 6) will be described.

As depicted in FIG. 16, first, a mode selection signal is input from the input device 12 (see FIG. 1) of the electronic device 1, and the control unit 3 determines whether or not to be the low distortion mode on the basis of the input (step S200). When the control unit 3 determines not to be the low distortion mode (NO in step S200), the control unit 3 executes, for example, control steps S102 to S108 depicted in FIG. 15 as Mode 1. In this way, in Mode 1, high-resolution imaging is possible.

Whereas, when the control unit 3 determines to be the low distortion mode (YES in step S200), as Mode 2, the control unit 3 first simultaneously performs photoelectric conversion by exposure of Pixel A and Pixel D, simultaneously performs reading to the floating diffusion FD (see FIG. 4), and performs AD conversion on the basis of a potential of the floating diffusion FD (step S202). Next, photoelectric conversion by exposure of Pixel B and Pixel C is simultaneously performed, reading is simultaneously performed to the floating diffusion FD (see FIG. 4), and AD conversion is performed on the basis of a potential of the floating diffusion FD (step S204). In this way, in the low distortion mode, since imaging is performed for every two pixels of the unit 202*a*, it is possible to perform imaging in which distortion is suppressed as compared with Mode 1.

Figure 17:
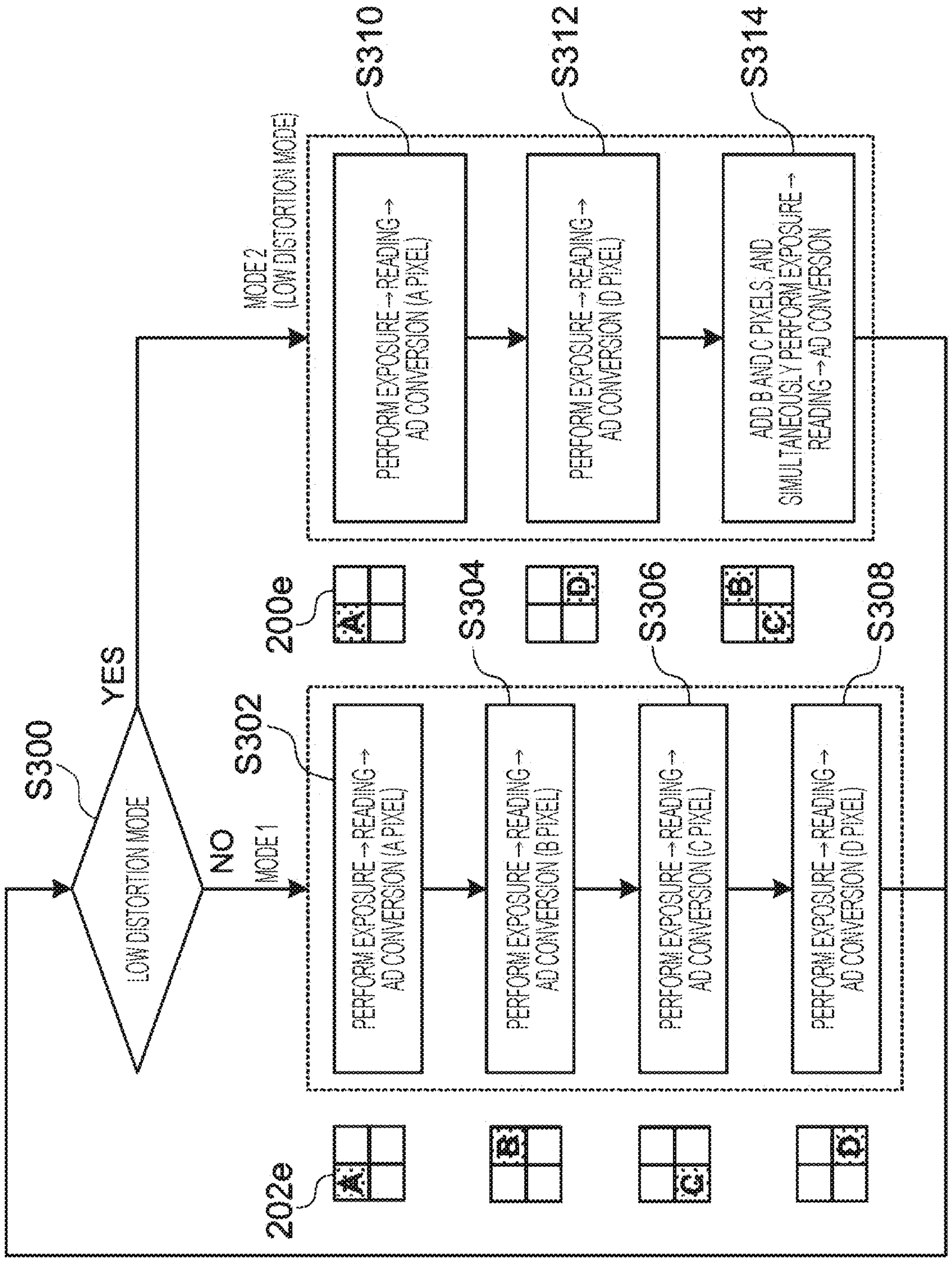
FIG. 17 is a flowchart depicting a control example having the low distortion mode of the Bayer array.

FIG. 17 is a flowchart depicting a control example having the low distortion mode in a case of using the unit 200*e* (see FIG. 10) of the Bayer array. As depicted in FIG. 17, Mode 2 is an example corresponding to the low distortion mode.

As depicted in FIG. 17, first, a mode selection signal is input from the input device 12 (see FIG. 1) of the electronic device 1, and the control unit 3 determines whether or not to be the low distortion mode on the basis of the input (step S300). When the control unit 3 determines not to be the low distortion mode (NO in step S300), the control unit 3 first performs photoelectric conversion by exposure of Pixel A, reading, and AD conversion as Mode 1, to generates a red signal (step S302). Next, photoelectric conversion by exposure of Pixel B, reading, and AD conversion are performed to generate a green signal (step S304). Next, photoelectric conversion by exposure of Pixel C, reading, and AD conversion are performed to generate a green signal (step S306). Then, photoelectric conversion by exposure of Pixel D, reading, and AD conversion are performed to generate a blue signal (step S308). In this way, in Mode 1, high-resolution imaging is possible.

Whereas, when the control unit 3 determines to be the low distortion mode (YES in step S300), the control unit 3 performs photoelectric conversion by exposure of Pixel A, reading, and AD conversion as Mode 2, to generate a red signal (step S310). Next, photoelectric conversion by exposure of Pixel D, reading, and AD conversion are performed to generate a blue signal (step S312). Then, next, photoelectric conversion by exposure of Pixel B and Pixel C is simultaneously performed, reading is simultaneously performed to the floating diffusion FD (see FIG. 4), and AD conversion is performed on the basis of a potential of the floating diffusion FD to generate a green signal (step S314). In this way, in the low distortion mode of the Bayer array, since simultaneous imaging of the two pixels of green pixels in the unit 200*e* is performed, it is possible to perform imaging in which distortion is suppressed as compared with Mode 1.

Figure 18:
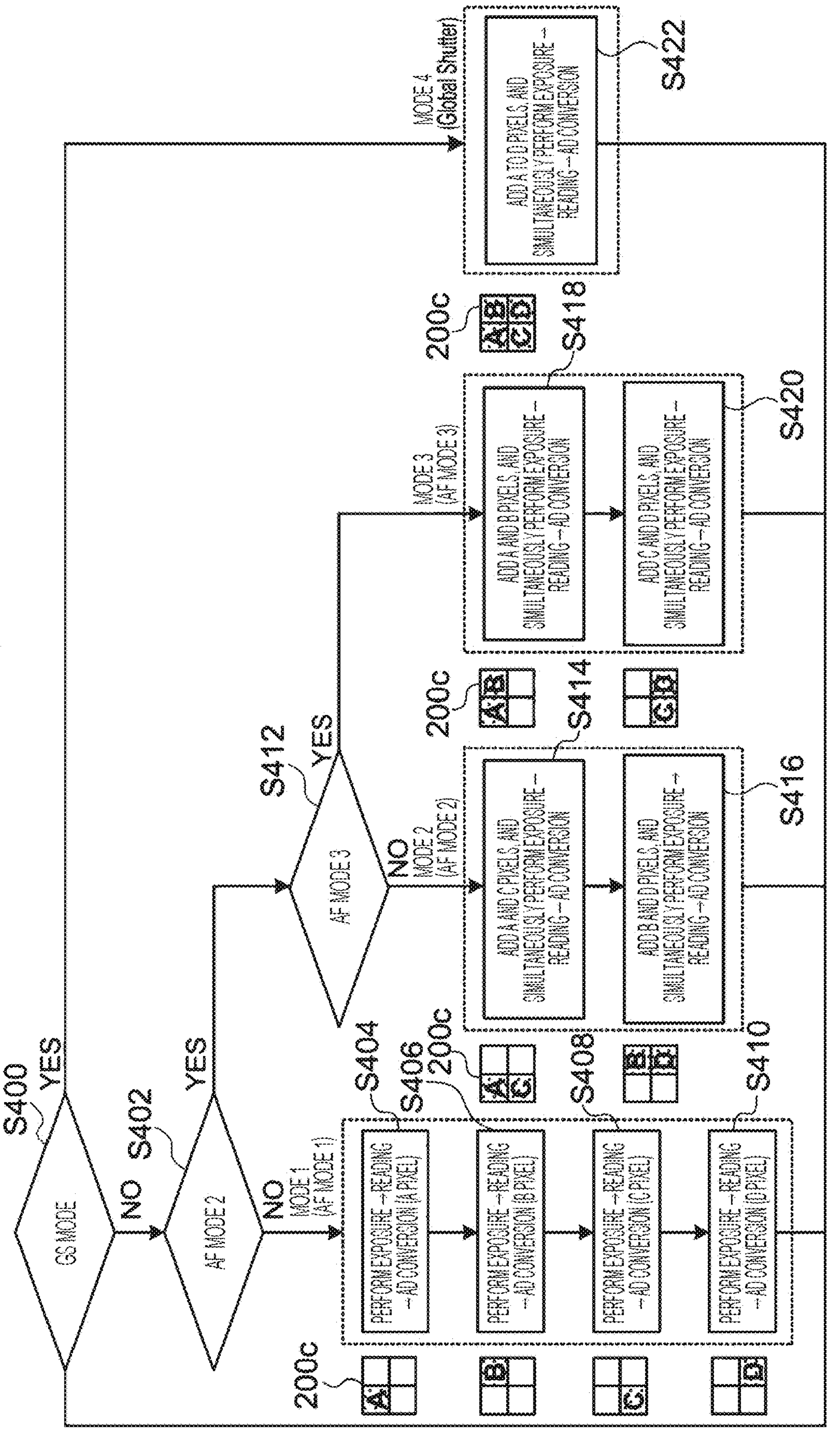
FIG. 18 is a flowchart depicting a control example using a unit in which one on-chip lens is arranged.

FIG. 18 is a flowchart depicting a control example using the unit 200*c* (see FIG. 8) in which one on-chip lens is arranged for four pixels. As depicted in FIG. 18, Mode 1 corresponds to an AF mode 1, Mode 2 corresponds to an AF mode 2, Mode 3 corresponds to an AF mode 3, and Mode 4 corresponds to a GS mode. In this way, the unit 200*c* can be driven in four modes.

As depicted in FIG. 18, first, a mode selection signal is input from the input device 12 (see FIG. 1) of the electronic device 1, and the control unit 3 determines whether or not to be the GS mode on the basis of the input (step S400). When it is determined not to be the GS mode (NO in step S400), it is further determined whether or not to be the AF mode 2 (step S402). When the control unit 3 determines not to be the AF mode 2 (NO in step S402), the control unit 3 first performs photoelectric conversion by exposure of Pixel A, reading, and AD conversion as Mode 1 (step S404). Next, photoelectric conversion by exposure of Pixel B, reading, and AD conversion are performed (step S406). Next, photoelectric conversion by exposure of Pixel C, reading, and AD conversion are performed (step S408). Next, photoelectric conversion by exposure of Pixel D, reading, and AD conversion are performed (step S410). In this way, the AF mode 1 corresponds to the high-resolution mode.

Whereas, when the control unit 3 determines to be the AF mode 2 (YES in step S402), the control unit 3 further determines whether or not to be the AF mode 3 (step S412). When the control unit 3 determines not to be the AF mode 3 (NO in step S412), as Mode 2, the control unit 3 first simultaneously performs photoelectric conversion by exposure of Pixel A and Pixel C, simultaneously performs reading to the floating diffusion FD (see FIG. 4), and performs AD conversion on the basis of a potential of the floating diffusion FD (step S414). Next, photoelectric conversion by exposure of Pixel B and Pixel D is simultaneously performed, reading is simultaneously performed to the floating diffusion FD (see FIG. 4), and AD conversion is performed on the basis of a potential of the floating diffusion FD (step S416). In this way, in the AF mode 2, it is possible to obtain image-plane phase information by two vertical pixels.

Whereas, when the control unit 3 determines to be the AF mode 3 (YES in step S412), as Mode 3, the control unit 3 first simultaneously performs photoelectric conversion by exposure of Pixel A and Pixel B, simultaneously performs reading to the floating diffusion FD (see FIG. 4), and performs AD conversion on the basis of a potential of the floating diffusion FD (step S418). Next, photoelectric conversion by exposure of Pixel B and Pixel D is simultaneously performed, reading is simultaneously performed to the floating diffusion FD (see FIG. 4), and AD conversion is performed on the basis of a potential of the floating diffusion FD (step S420). In this way, in the AF mode 3, it is possible to obtain image-plane phase information by two horizontal pixels.

Whereas, when the control unit 3 determines to be the GS mode (YES in step S400), the control unit 3 simultaneously performs photoelectric conversion by exposure of Pixel A to Pixel D, simultaneously to the floating diffusion FD (see FIG. 4). In this way, the unit 200*c* includes at least two operation modes of the mode (AF mode 1) in which AD conversion is performed four times on four pixels and Modes 2 and 3 (AF mode 2, AF mode 3) in which AD conversion is performed twice by adding two pixels on each of the left and right sides by the floating diffusion FD. Mode 1 is not global shutter (GS), but enables high-resolution imaging. Whereas, in Modes 2 and 3, a phase difference can be sensed at a high speed, and auto focus (AF) processing can be performed at a higher speed. In Mode 4, the GS imaging can be performed, and a low-distortion image can be captured.

Figure 19:
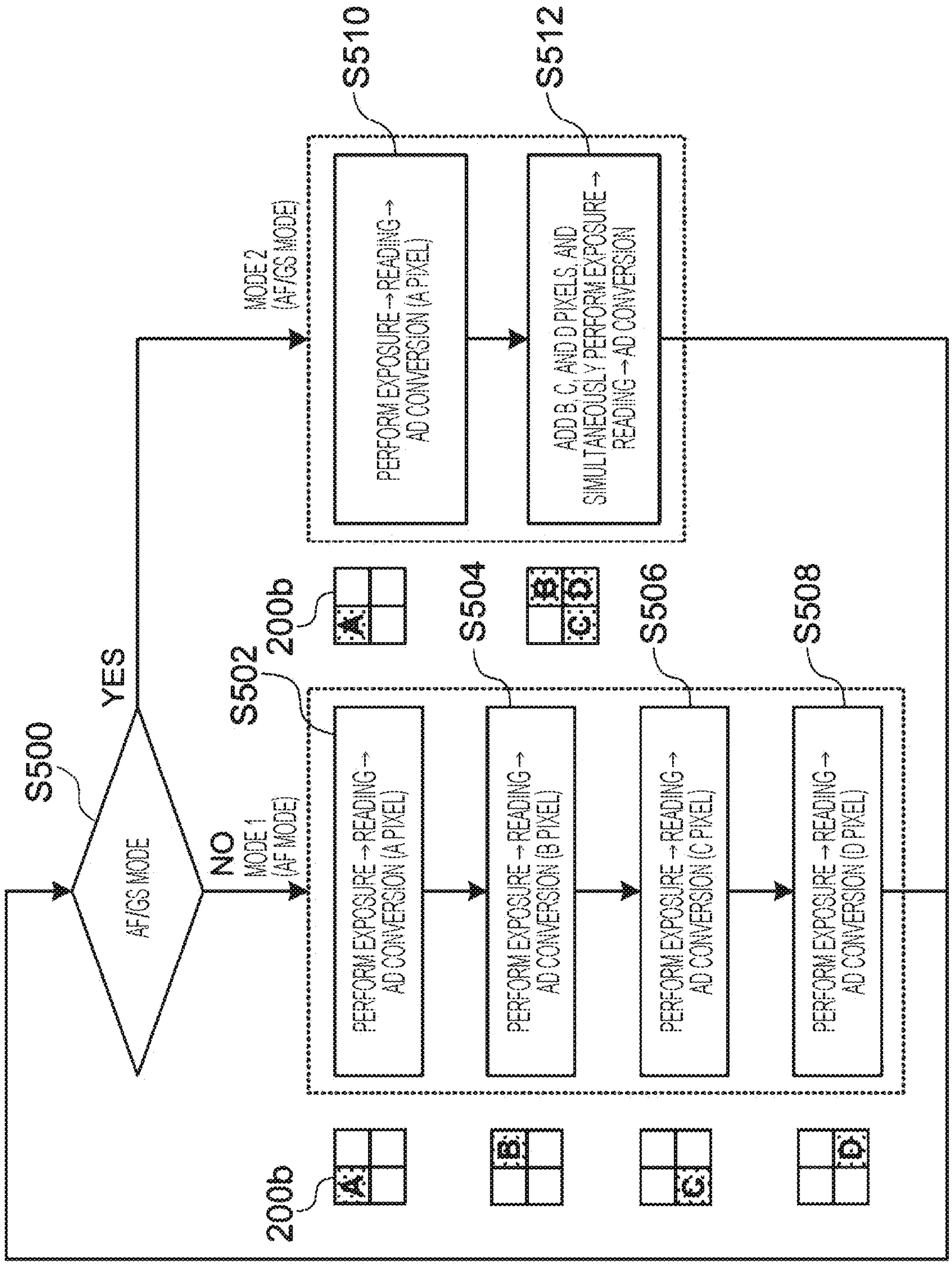
FIG. 19 is a flowchart depicting a control example using a unit in which an image-plane phase difference pixel is arranged.

FIG. 19 is a flowchart depicting a control example using the unit 200*b* (see FIG. 7) in which the same color is used and image-plane phase difference pixels (ZAF pixels) are arranged in A pixel. As depicted in FIG. 19, Mode 1 corresponds to an AF mode, and mode 2 corresponds to an AF/GS mode.

As depicted in FIG. 19, first, a mode selection signal is input from the input device 12 (see FIG. 1) of the electronic device 1, and the control unit 3 determines whether or not to be the AF/GS mode on the basis of the input (step S500). When the control unit 3 determines not to be the AF/GS mode (NO in step S500), the control unit 3 first performs photoelectric conversion by exposure of Pixel A, reading, and AD conversion as Mode 1 (step S502). Next, photoelectric conversion by exposure of Pixel B, reading, and AD conversion are performed (step S504). Next, photoelectric conversion by exposure of Pixel C, reading, and AD conversion are performed (step S506). Next, photoelectric conversion by exposure of Pixel D, reading, and AD conversion are performed (step S508). In this way, Mode 1 corresponds to the high-resolution mode.

Whereas, when the control unit 3 determines to be the AF/GS mode (YES in step S500), the control unit 3 first performs photoelectric conversion by exposure of Pixel A, reading, and AD conversion as Mode 2 (step S510). Next, the control unit 3 simultaneously performs photoelectric conversion by exposure of Pixel B, Pixel C, and Pixel D, simultaneously performs reading to the floating diffusion FD (see FIG. 4), and performs AD conversion on the basis of a potential of the floating diffusion FD (step S512).

In this way, in Mode 1, it is possible to obtain an image signal of each pixel by performing AD conversion four times on four pixels. In Mode 2, three pixels other than the image-plane phase difference pixel are added by the floating diffusion FD, and AD conversion is performed. Furthermore, in Mode 2, it is possible to obtain an image signal of the image-plane phase difference pixel by performing AD conversion only on the image-plane phase difference pixel. As a result, Mode 1 is not the GS imaging, but enables high-resolution imaging, and Mode 2 enables to simultaneously realize the GS mode in which distortion is suppressed and the phase difference sensing by using the image-plane phase difference pixel.

Figure 20:
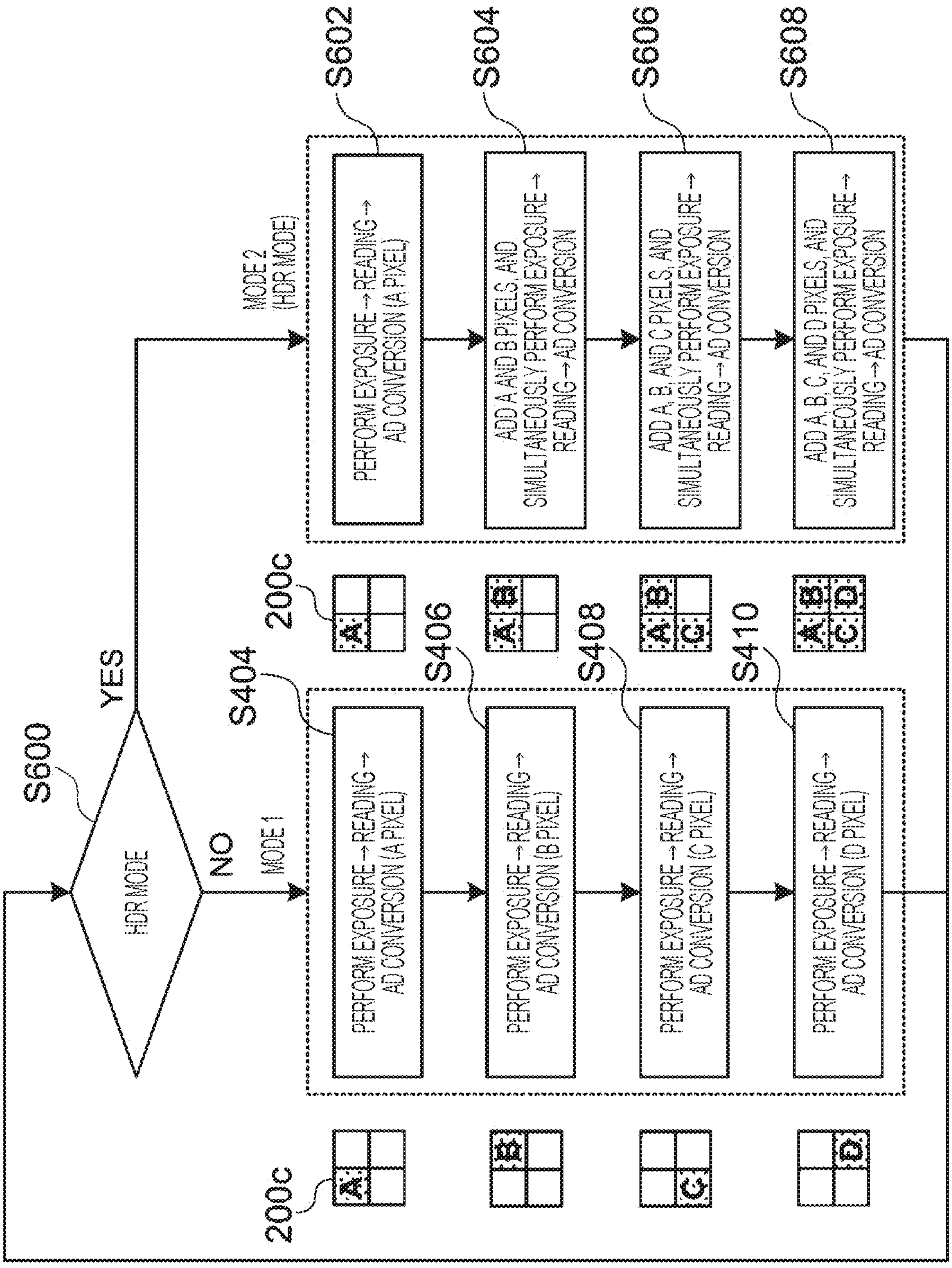
FIG. 20 is a flowchart depicting a control example having an HDR mode.

FIG. 20 is a flowchart depicting control example in a high dynamic range (HDR) mode using the unit 200*c* (see FIG. 8) in which one on-chip lens is arranged for four pixels. As depicted in FIG. 20, Mode 2 corresponds to an HDR mode 2.

As depicted in FIG. 20, first, a mode selection signal is input from the input device 12 (see FIG. 1) of the electronic device 1, and the control unit 3 determines whether or not to be the HDR mode on the basis of the input (step S600). When the control unit 3 determines not to be the HDR mode (NO in step S400), the control unit 3 performs the processing in steps S404 to S410 depicted in FIG. 18 as Mode 1. That is, Mode 1 corresponds to the high-resolution mode.

Whereas, when the control unit 3 determines to be the HDR mode (YES in step S600), the control unit 3 first performs photoelectric conversion by exposure of Pixel A, reading, and AD conversion as Mode 2 (step S602). Next, photoelectric conversion by exposure of Pixel A and Pixel B is simultaneously performed, reading is simultaneously performed to the floating diffusion FD (see FIG. 4), and AD conversion is performed on the basis of a potential of the floating diffusion FD (step S604). Next, photoelectric conversion by exposure of Pixel A, Pixel B, and Pixel C is simultaneously performed, reading is simultaneously performed to the floating diffusion FD (see FIG. 4), and AD conversion is performed on the basis of a potential of the floating diffusion FD (step S606). Then, photoelectric conversion by exposure of Pixel A to Pixel D is simultaneously performed, reading is simultaneously performed to the floating diffusion FD (see FIG. 4), and AD conversion is performed on the basis of a potential of the floating diffusion FD (step S608).

In this way, in the HDR mode, one image signal is generated without the FD addition, and then image signals of two pixels are added by the floating diffusion FD to generate an image signal. Moreover, next, image signals of three pixels are added by the floating diffusion FD to generate an image signal, and then image signals of four pixels are added by the floating diffusion FD to generate an image signal. Since sensitivity to low luminance increases as the number of pixels to be added increases, image signals having different dynamic ranges can be obtained. Therefore, a high dynamic range image signal can be obtained by adding the individual image signals. For example, the addition of the individual image signals can be executed by the image processing unit 5. In this way, in Mode 2, a high dynamic range (HDR) function of synthesizing image signals in which the number of pixels of four pixels is changed can be executed.

As described above, in the pixel unit 100 of the electronic device 1 according to the first embodiment, one floating diffusion FD and one AD conversion unit 190 are configured for the plurality of pixels 140, and there are: the high-resolution mode in which the AD conversion periods $t_{ADCT\_A}$ to $t_{ADCT\_D}$ of analog image signals of the plurality of pixels 140 by the AD conversion unit 190 are shifted; and the low distortion mode in which analog image signals of at least two pixels among pixels of the plurality of pixels 140 are summed by the floating diffusion FD, and AD conversion is performed by the AD conversion unit 190. As a result, in the high-resolution mode, it is possible to generate image data having a resolution corresponding to each pixel of the plurality of pixels 140. Whereas, in the low distortion mode, since analog image signals of at least two pixels are summed, it is possible to generate image data in which distortion of an image due to a shift in imaging time in each pixel is suppressed.

Second Embodiment

An electronic device 1 according to a second embodiment is different from the electronic device 1 according to the first embodiment in that a pixel unit of an imaging apparatus 4 includes a plurality of first pixel units 100*a* and a plurality of second pixel units 100*b*. Hereinafter, a difference from the electronic device 1 according to the first embodiment is described.

Figure 21A:
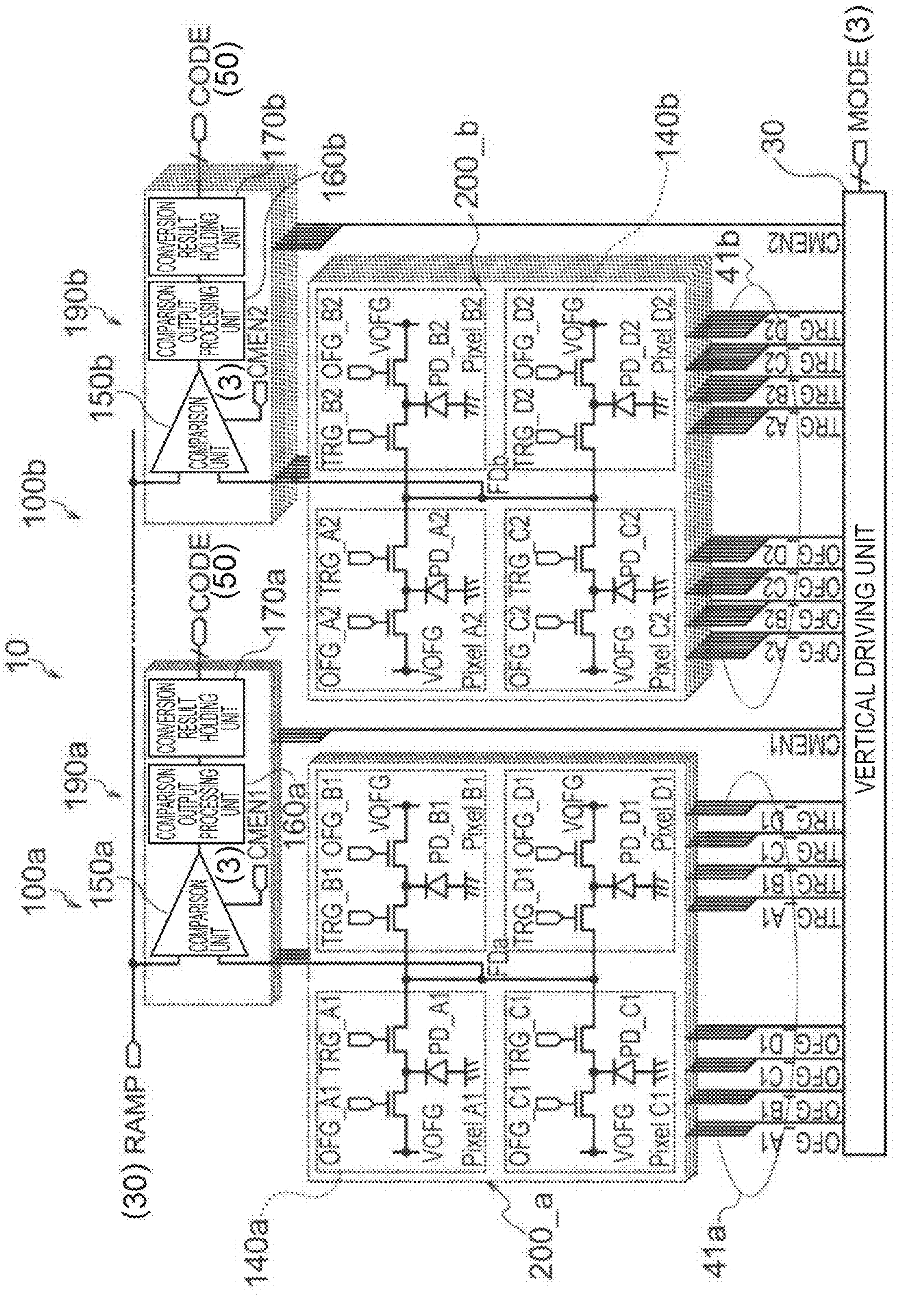
FIG. 21A is a block diagram depicting a configuration example of a pixel unit according to a second embodiment.

FIG. 21A is a block diagram depicting a configuration example of a pixel unit according to the second embodiment. As depicted in FIG. 21, a pixel array unit 10 includes the plurality of first pixel units 100*a* and the plurality of second pixel units 100*b*. The first pixel unit 100*a* includes an AD conversion unit 190*a* and a unit 200*a*. The analog-to-digital conversion unit 190*a* includes a comparison unit 150*a*, a comparison output processing unit 160*a*, and a conversion result holding unit 170*a*. Furthermore, the unit **200_*a* includes a plurality of pixels 140***a* and a floating diffusion FDa connected to the plurality of pixels 140. Similarly, the first pixel unit 100*ba* includes an AD conversion unit 190*b* and a unit 200*b*. The analog-to-digital conversion unit 190*b* includes a comparison unit 150*b*, a comparison output processing unit 160*b*, and a conversion result holding unit 170*b*. Furthermore, the unit **200_*b* includes a plurality of pixels 140***b* and a floating diffusion FDb connected to the plurality of pixels 140.

As depicted in FIG. 21A, the first pixel unit 100*a* and the second pixel unit 100*b* are arranged on the entire screen of the pixel array unit 10. The number of first pixel units 100*a* and the number of second pixel units 100*b* may be different. For example, in the pixel array unit 10 according to the present embodiment, more second pixel units 100*b* are arranged than the first pixel units 100*a*. From a vertical driving unit 40, a control signal (TRG_A1 to TRG_D1, OFG_A1 to OFG_D1) is supplied to the first pixel unit 100*a*, and a control signal (TRG_A2 to TRG_D2, OFG_A2 to OFG_D2) is supplied to the second pixel unit 100*b*. In this way, a signal line 41*a* and a signal line 41*b* are separately wired such that different signals are supplied from the vertical driving unit 40, as the OFG/TRG signals supplied to the first pixel unit 100*a* and the OFG/TRG signals supplied to the second pixel unit 100*b*. Furthermore, control signals CMEN1 and CMEN2 are supplied from a control unit 3. AD conversion is performed during a period in which the control signals CMEN1 and CMEN2 are at a high level.

Furthermore, the first pixel unit 100*a* and the second pixel unit 100*b* basically operate in different modes, but may operate in the same mode. For example, any of the modes described in FIGS. 15 to 20 can be executed independently of the first pixel unit 100*a* and the second pixel unit 100*b*.

Figure 21B:
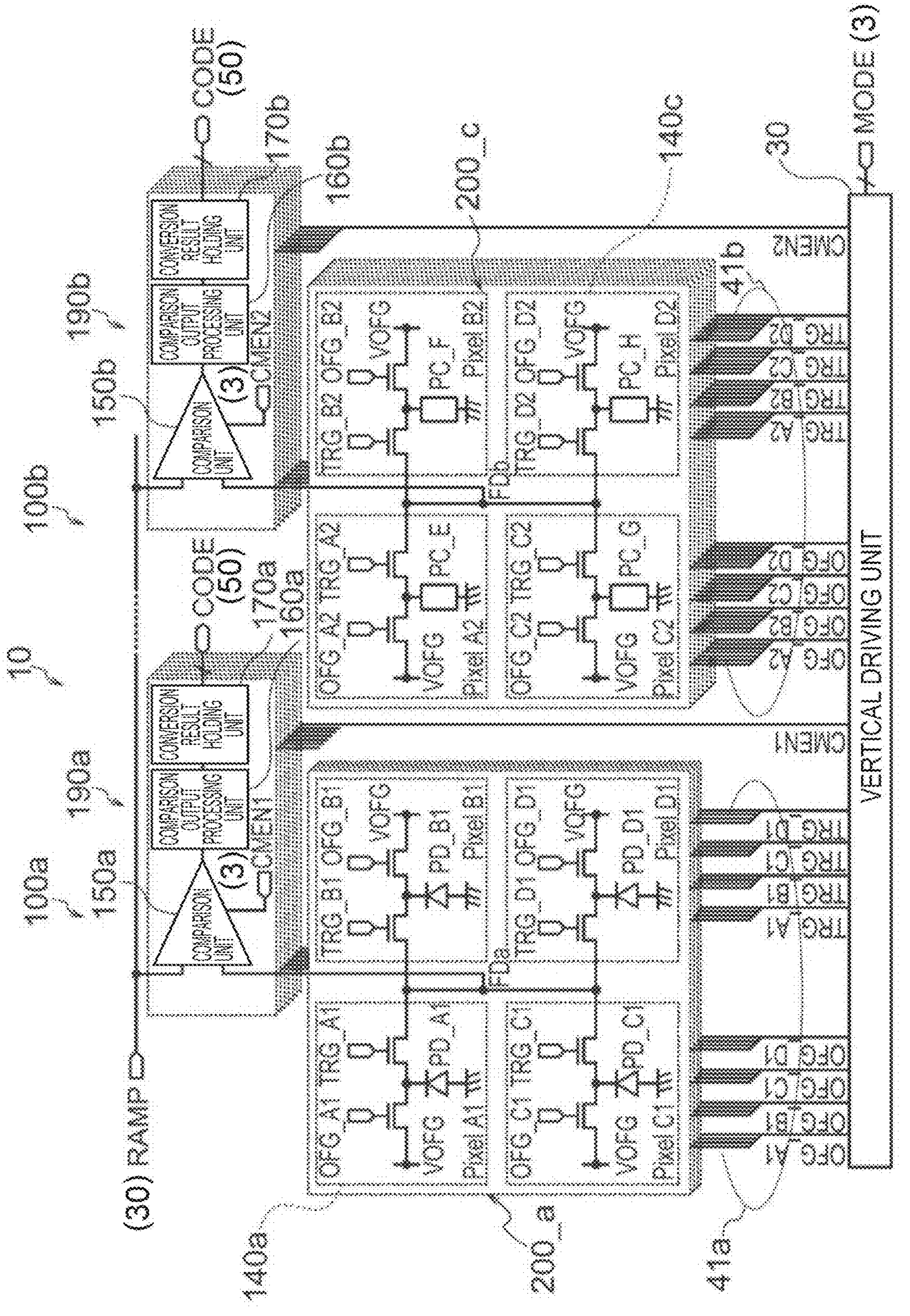
FIG. 21B is a block diagram depicting another configuration example of the pixel unit according to FIG. 21A.

FIG. 21B is a block diagram depicting another configuration example of the pixel unit 200*b* according to the second embodiment. As depicted in FIG. 21B, there is a difference from the pixel unit 200*b* depicted in FIG. 21A in that photoelectric conversion elements PC_E to PC_H constituting a pixel 140*c* of the unit 200*c* are photoelectric conversion elements (PCs) formed containing non-silicon, and are organic films, for example. In this way, the photoelectric conversion elements PC_E to PC_H formed containing non-silicon may be used as the photoelectric conversion element.

Here, an example of a combination of the units 200 will be described with reference to FIGS. 22 to 28. In the following description, a left figure “a” depicts an example of the unit 200 of the first pixel unit 100*a*, and a left figure “b” depicts an example of the unit 200 of the second pixel unit

Figure 22:
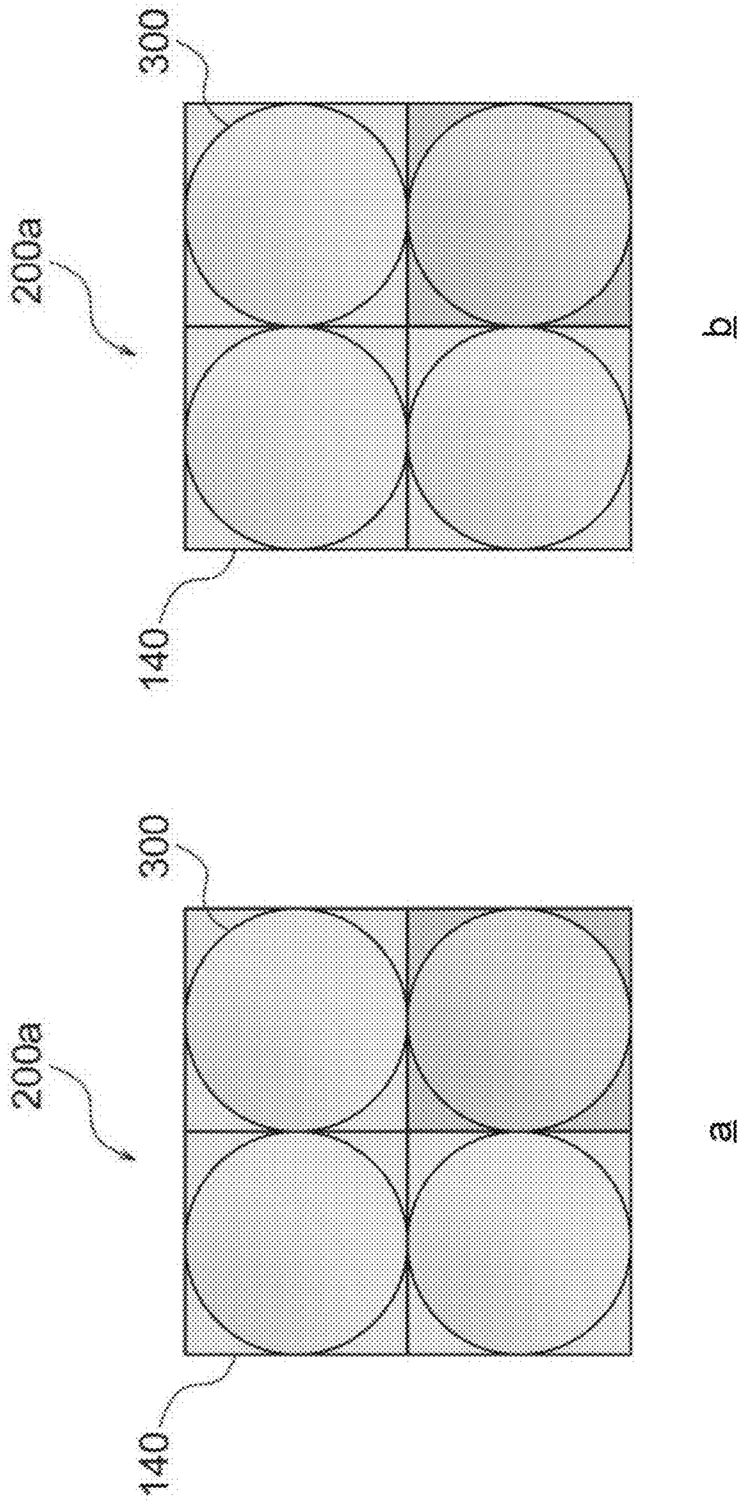
FIG. 22 is a view depicting an example of a combination of the units depicted in FIG. 6.
Figure 23:
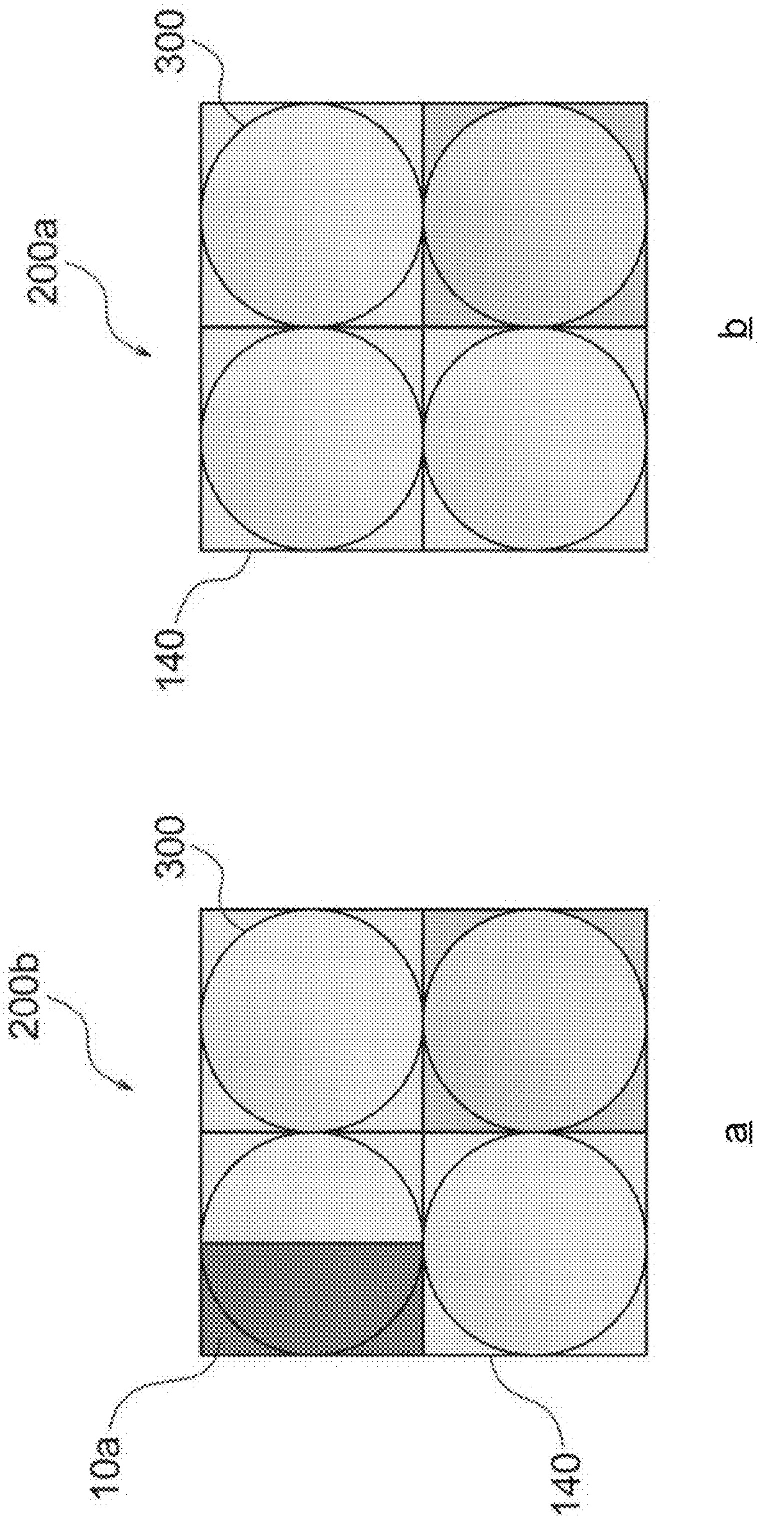
FIG. 23 is a view depicting an example of a combination of the unit (FIG. 7) and the unit (FIG. 6).
Figure 24:
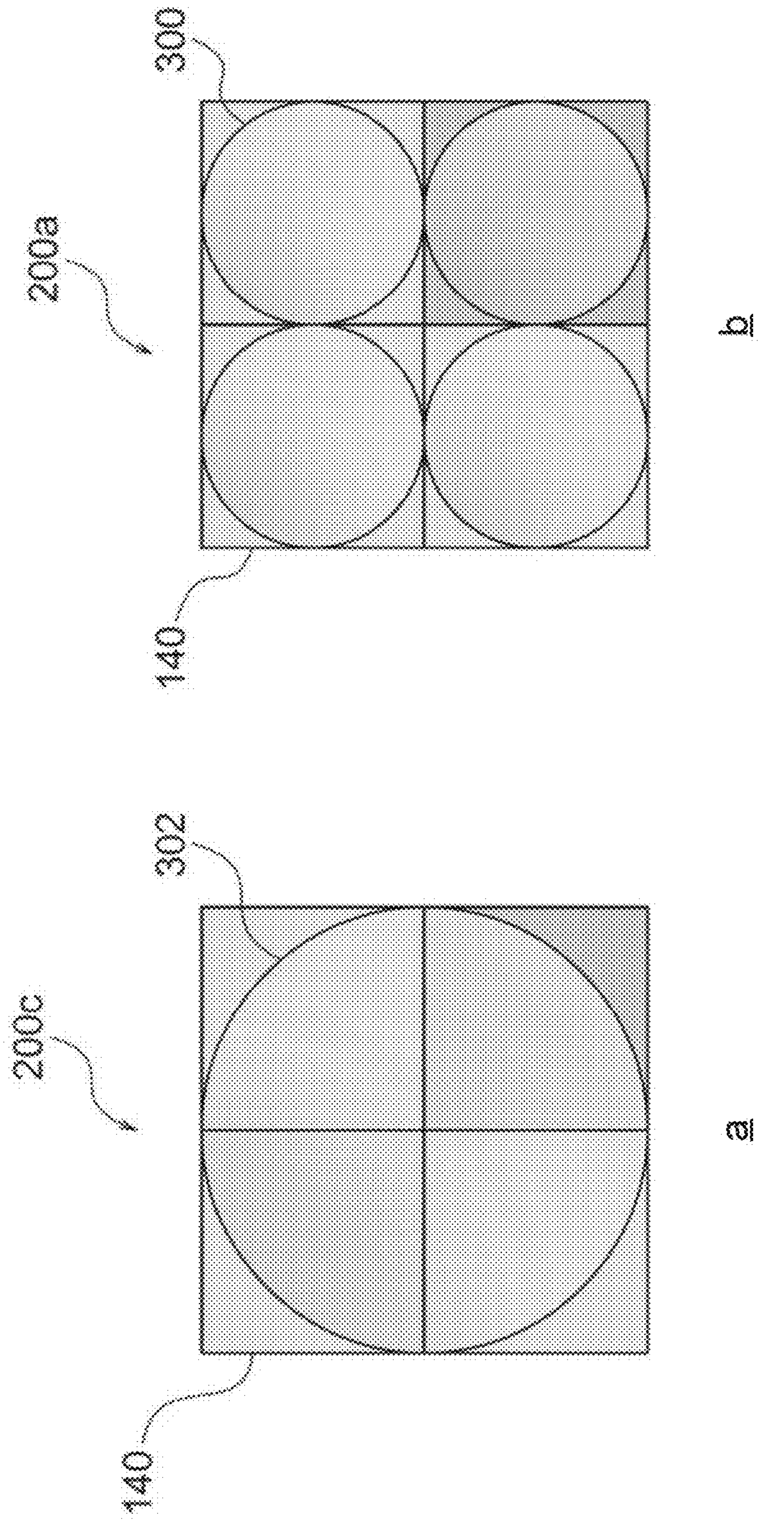
FIG. 24 is a view depicting an example of a combination of the unit (FIG. 8) and the unit (FIG. 6).
Figure 25:
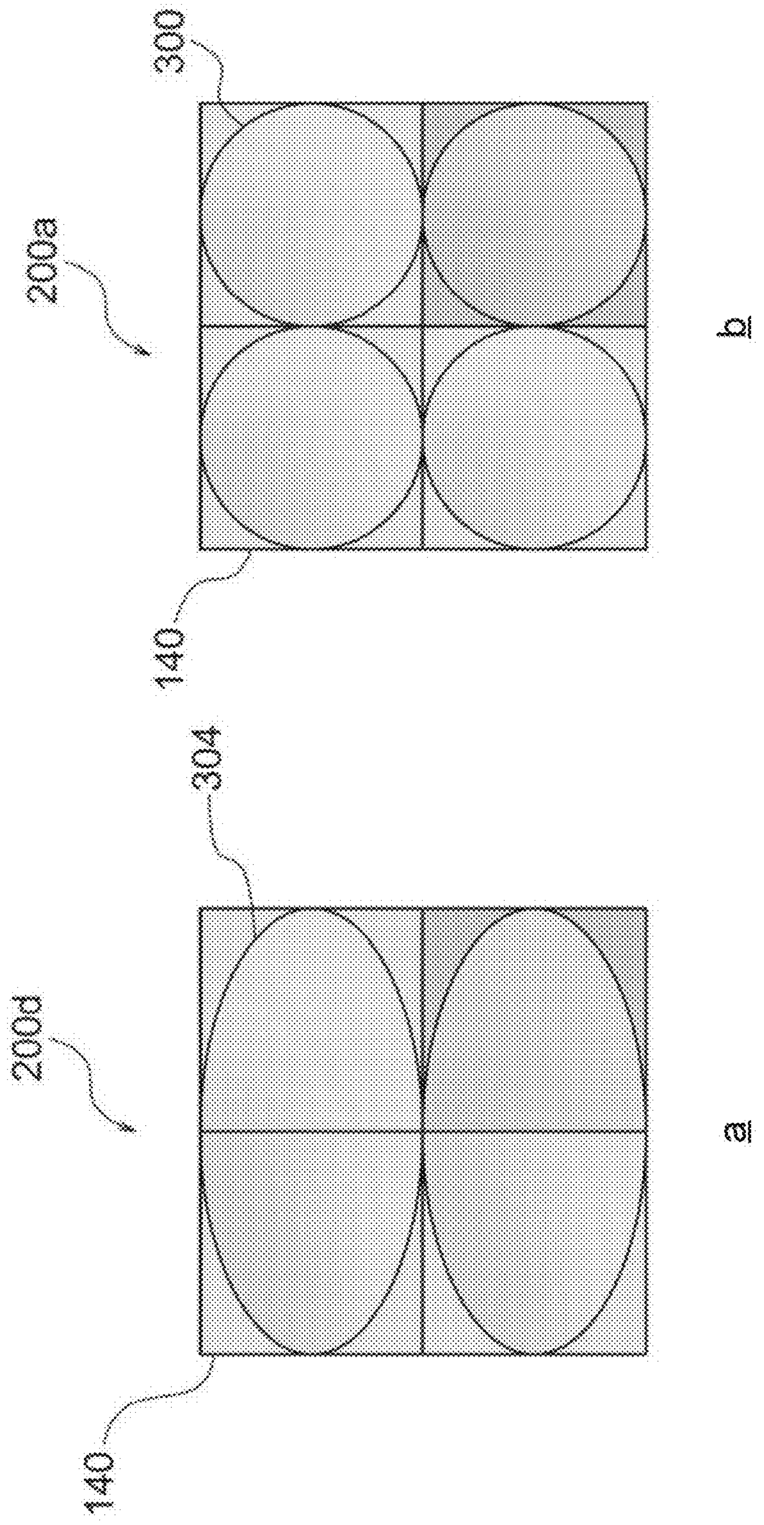
FIG. 25 is a view depicting an example of a combination of the unit (FIG. 9) and the unit (FIG. 6).
Figure 26:
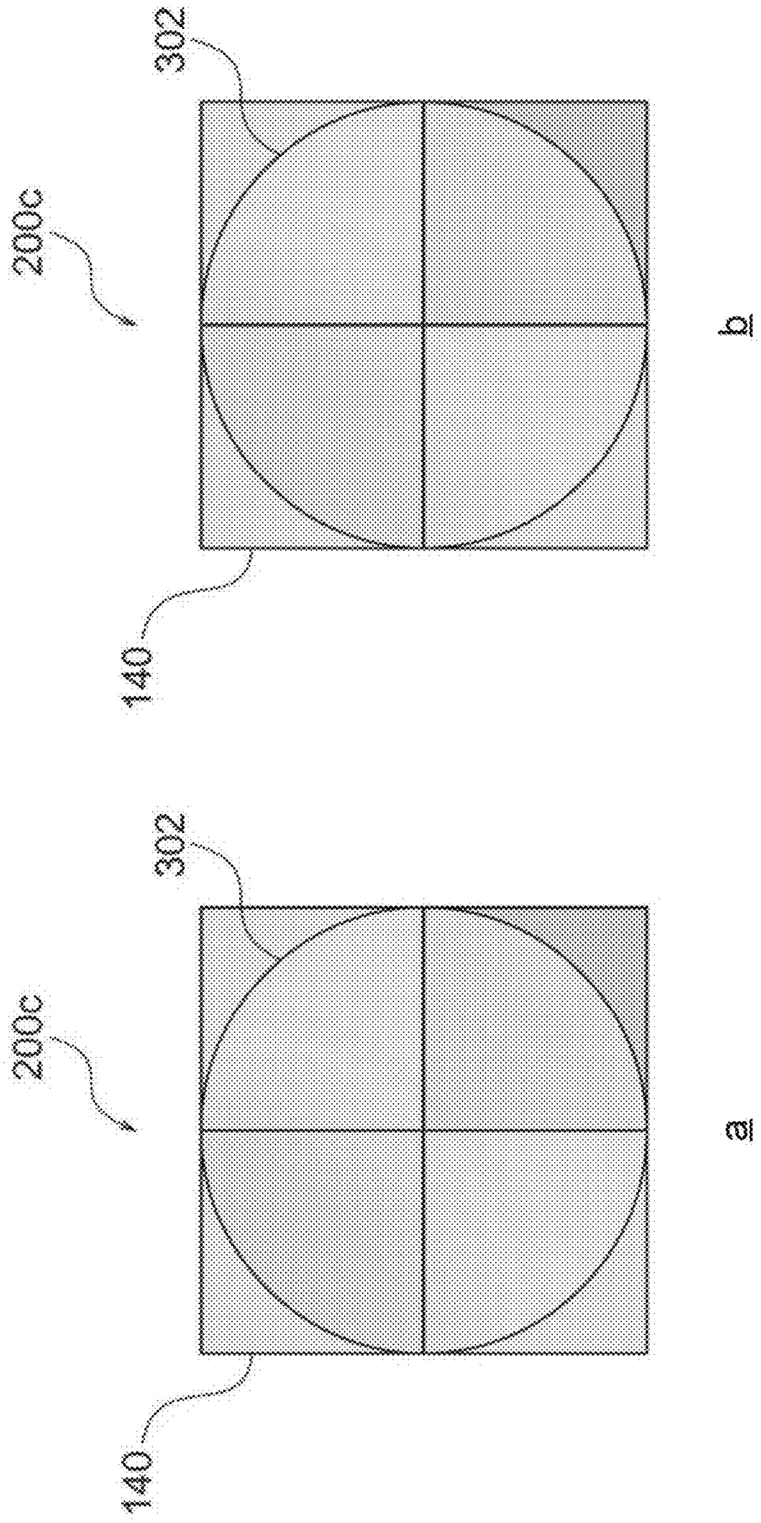
FIG. 26 is a view depicting an example of a combination of the units depicted in FIG. 8.
Figure 27:
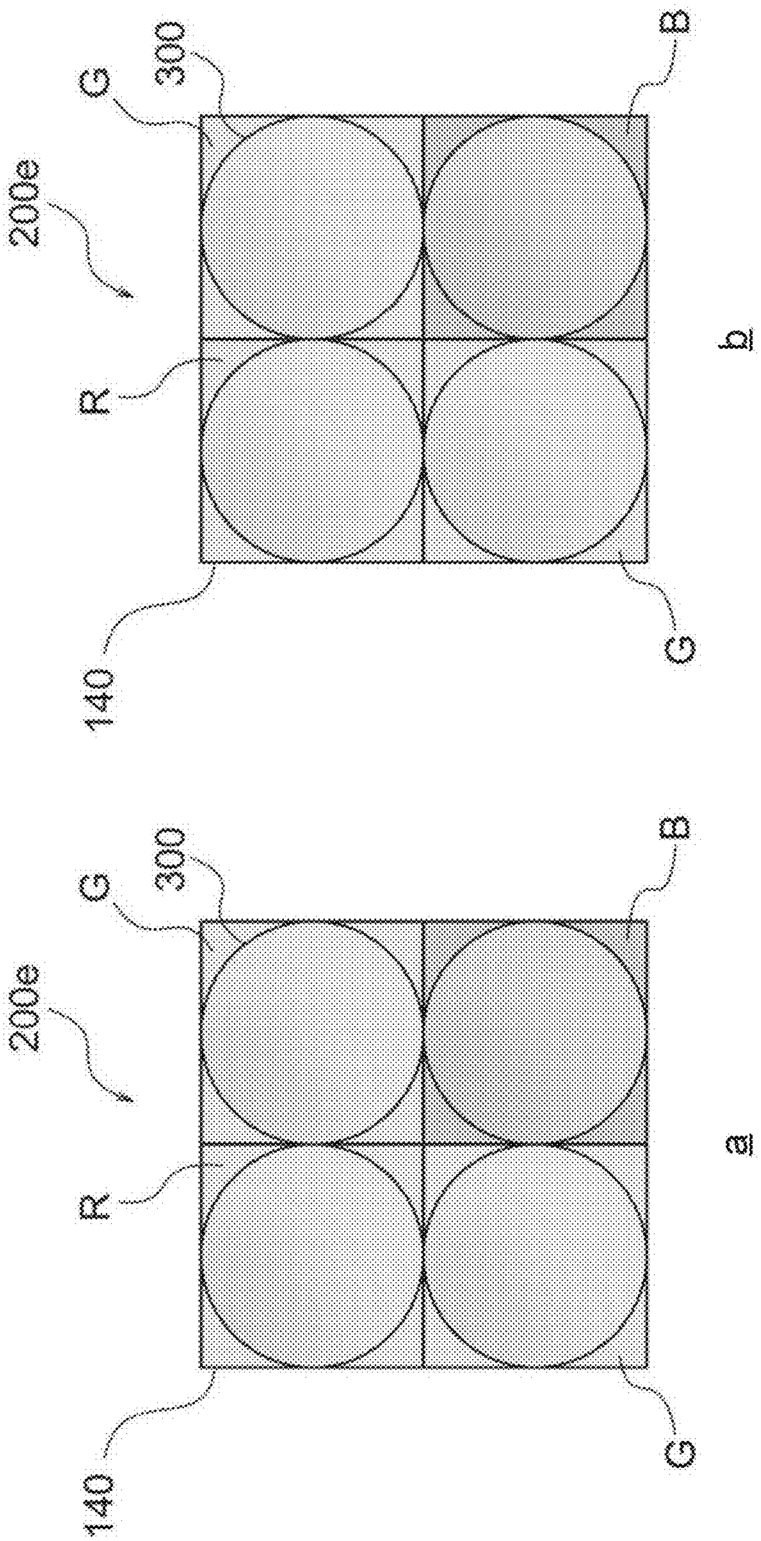
FIG. 27 is a view depicting an example of a combination of the units depicted in FIG. 10.
Figure 28:
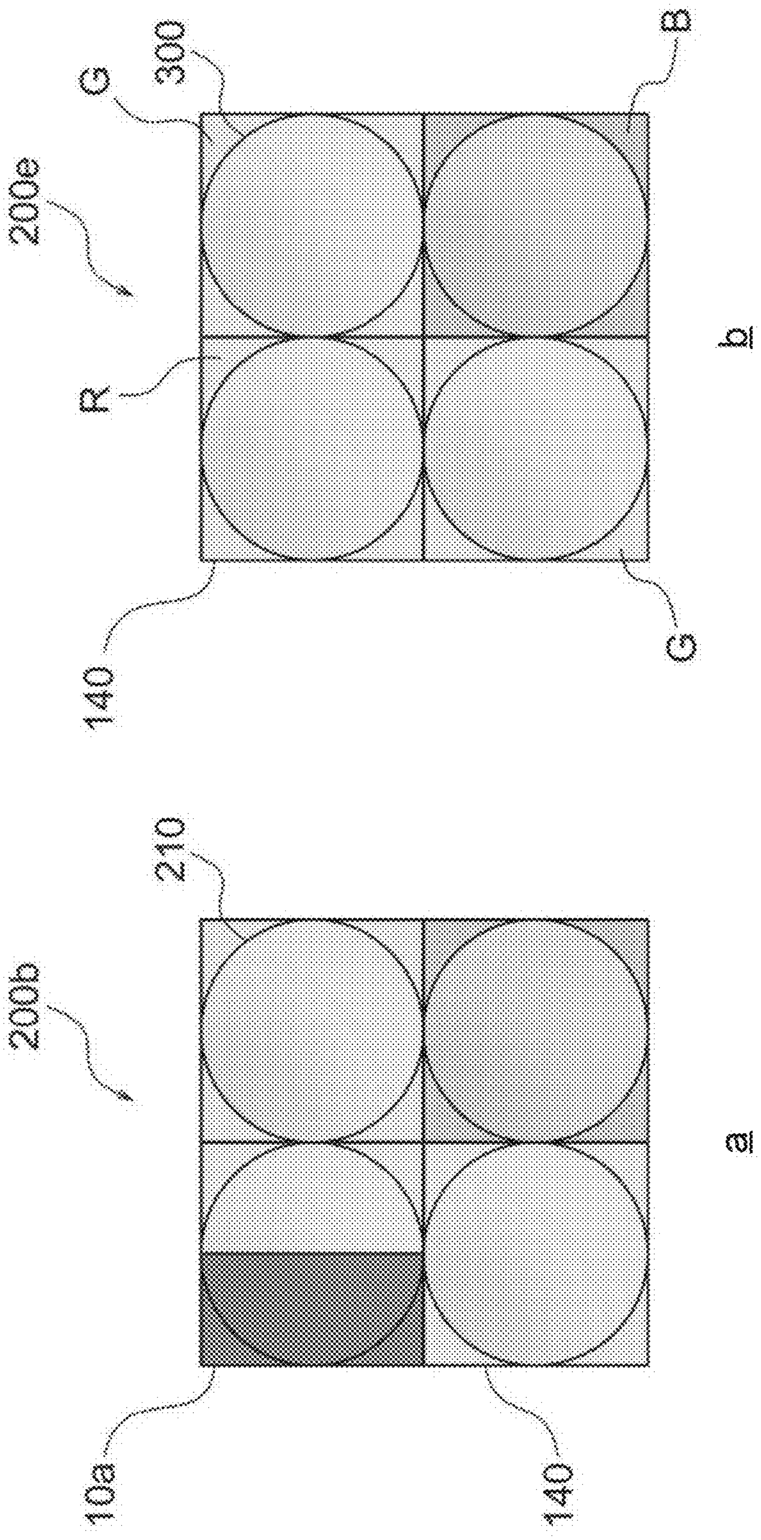
FIG. 28 is a view depicting an example of a combination of the unit (FIG. 7) and the unit (FIG. 10).

100*b*. FIG. 22 is an example of a combination of the unit 200*a* (see FIG. 6) and the unit 200*a* (see FIG. 6). FIG. 23 is an example of a combination of the unit 200*b* (see FIG. 7) and the unit 200*a* (see FIG. 6). FIG. 24 is an example of a combination of the unit 200*c* (see FIG. 8) and the unit 200*a* (see FIG. 6). FIG. 25 is an example of a combination of the unit 200*d* (see FIG. 9) and the unit 200*a* (see FIG. 6). FIG. 26 is an example of a combination of the unit 200*c* (see FIG. 8) and the unit 200*c* (see FIG. 8). FIG. 27 is an example of a combination of the unit 200*e* (see FIG. 10) and the unit 200*e* (see FIG. 10). FIG. 28 is an example of a combination of the unit 200*b* (see FIG. 7) and the unit 200*e* (see FIG. 10). In this way, in the first pixel unit 100*a* and the second pixel unit 100*b*, a shape of an on-chip lens and the presence or absence of an image-plane phase pixel (ZAF) can be freely combined. Furthermore, the types of photoelectric conversion elements can be freely combined.

Here, an imaging mode of the imaging apparatus 4 will be described with reference to FIGS. 29 and 30. In the imaging apparatus 4, the mode is set by changing each of the control signals of OFG_A1 to OFG_D1, TRG_A1 to TRG_D1, OFG_A2 to OFG_D2, and TRG_A2 to TRG_D2 in response to a control signal from the control unit 3 (see FIG. 1).

Figure 29:
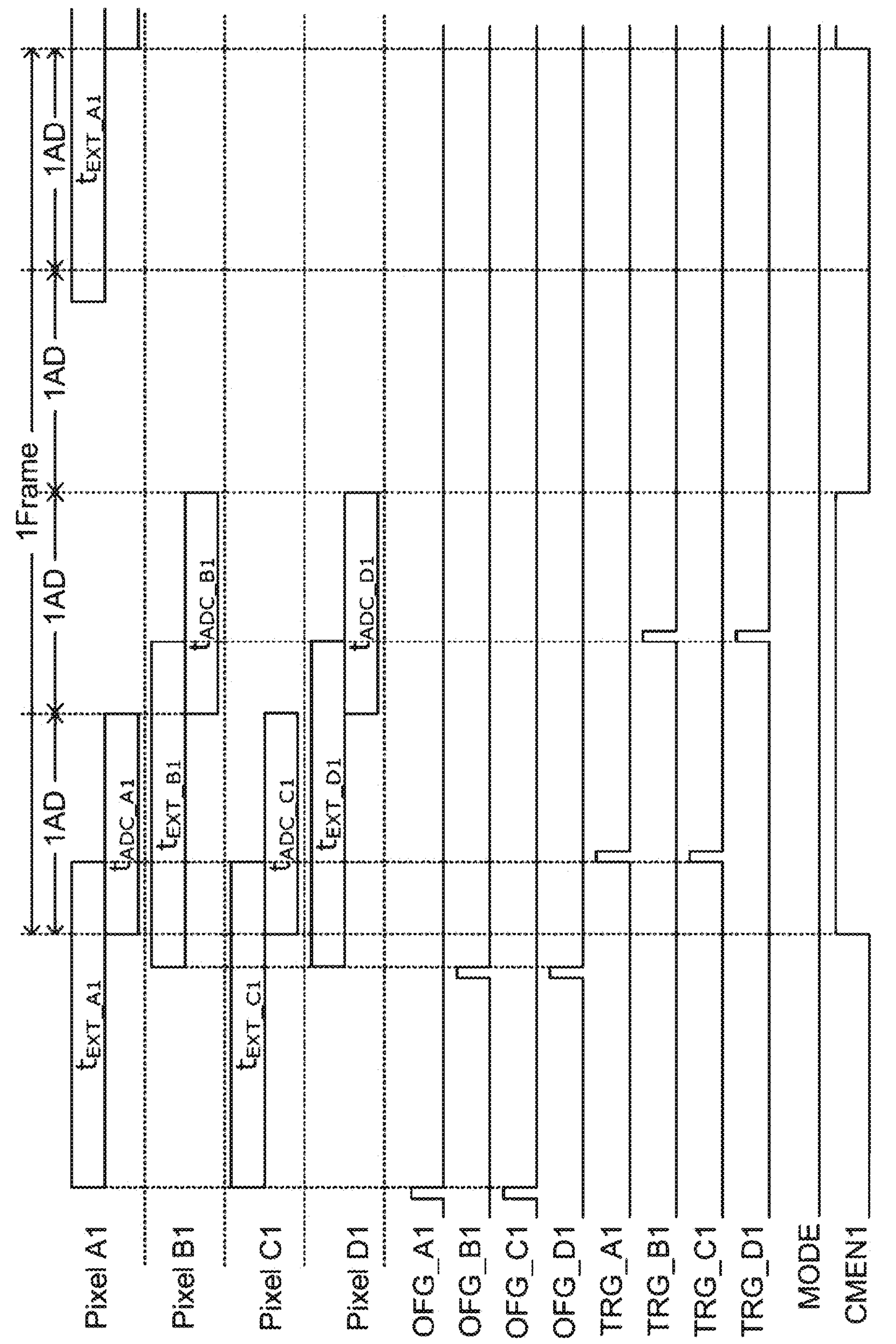
FIG. 29 is a time chart depicting a control example of Mode n.

FIG. 29 is a time chart depicting a control example of Mode n. A horizontal axis represents time. Pixel A1, Pixel B1, Pixel C1, and Pixel D1 indicate the individual pixels 140*a* constituting the unit 200_*a*. Furthermore, the control signals OFG_A1 to OFG_D1 indicate gate signals of an overflow gate transistor TR1 (see FIG. 5), and the control signals TRG_A1 to TRG_D1 indicate gate signals of a charge transfer transistor TR2.

As depicted in FIG. 29, first, the control signals OFG_A1 and OFG_C1 become a high level, and photoelectric conversion elements of Pixel A1 and Pixel C1 are reset. Subsequently, the control signals OFG_A1 and OFG_C1 become a low level, and photoelectric conversion periods $t_{EXT\_A1}$ and $t_{EXT\_C1}$ of Pixel A1 and Pixel C1 are started.

Next, a floating diffusion FD (see FIG. 4) is reset, and AD conversion periods $t_{ADCT\_A1}$ and $t_{ADCT\_A1}$ Of Pixel A1 and Pixel C1 are started. Subsequently, the control signals TRG_A1 and TRG_C1 become a high level, accumulated electric charges of Pixel A1 and Pixel C1 are transferred to the floating diffusion FD, and the photoelectric conversion periods $t_{EXT\_A1}$ and $t_{EXT\_C1}$ are ended. Subsequently, the AD conversion periods $t_{ADCT\_A1}$ and $t_{ADCT\_C1}$ are ended. Similar driving is executed for Pixel B1 and Pixel D1. Each of the AD conversion periods $t_{ADCT\_A}$ to $t_{ADCT\_D}$ corresponds to one AD period, and four AD periods correspond to one Frame.

In this way, in Mode n, photoelectric conversion of pixels Pixel A1 and Pixel C1 is simultaneously performed, and individual accumulated electric charges are summed by the floating diffusion FD and converted into a digital image signal. Next, photoelectric conversion of the pixels Pixel B1 and Pixel D1 is simultaneously performed, and individual accumulated electric charges are summed by the floating diffusion FD and converted into a digital image signal.

Figure 30:
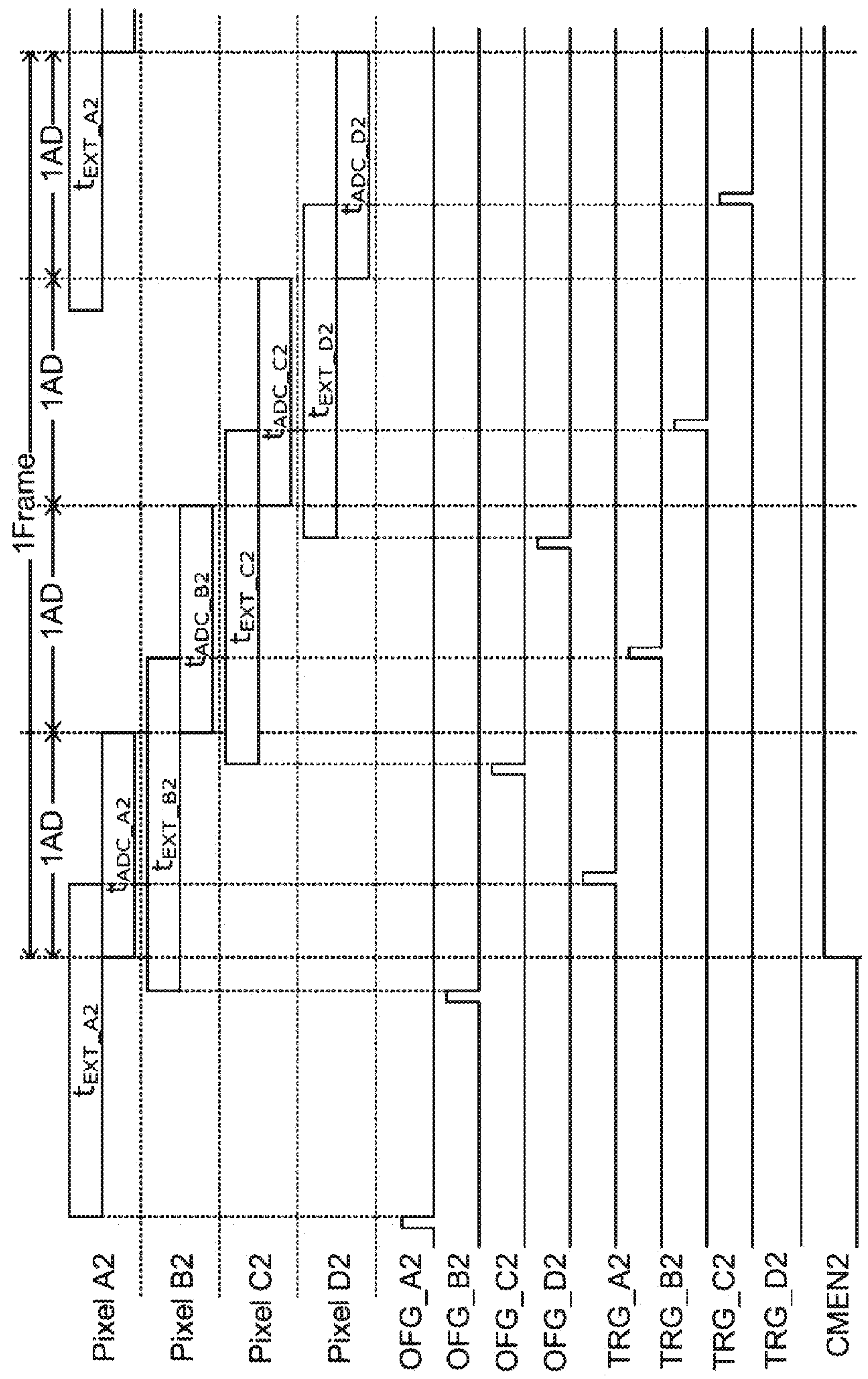
FIG. 30 is a time chart depicting a control example of Mode m.

FIG. 30 is a time chart depicting a control example of Mode m. A horizontal axis represents time. A horizontal axis represents time. Pixel A2, Pixel B2, Pixel C2, and Pixel D2 indicate the individual pixels 140*b* constituting the unit 200_*b*. Furthermore, the control signals OFG_A2 to OFG_D2 indicate gate signals of the overflow gate transistor TR1 (see FIG. 5), and the control signals TRG_A2 to TRG_D2 indicate gate signals of the charge transfer transistor TR2.

As depicted in FIG. 30, first, the control signal OFG_A2 becomes a high level, and Pixel A2 is reset. Subsequently, the control signal OFG_A2 becomes a low level, and the photoelectric conversion period $t_{EXT\_A2}$ is started.

Next, the floating diffusion FDb (see FIG. 21) is reset, and the AD conversion period $t_{ADCT\_A2}$ of Pixel A2 is started. Subsequently, the control signal TRG_A2 becomes a high level, accumulated electric charges of Pixel A2 are transferred to the floating diffusion FDb, and the photoelectric conversion period $t_{EXT\_A2}$ is ended. Subsequently, the AD conversion period $t_{ADCT\_A2}$ is ended. Pixel B2, Pixel C2, and Pixel D2 are similarly driven, and the AD conversion periods $t_{ADCT\_A2}$ to $t_{ADCT\_D2}$ are executed with a time series shift so as not to overlap. Each of the AD conversion periods $t_{ADCT\_A2}$ to $t_{ADCT\_D2}$ corresponds to one AD period, and four AD periods correspond to one Frame.

In this way, in Mode m, the photoelectric conversion periods $t_{EXT\_A2}$ to $t_{EXT\_D2}$ of the individual pixels 140 constituting the unit 200*b* are executed with a time series shift. Then, in conjunction with the photoelectric conversion periods $t_{EXT\_A2}$ to $T_{EXT\_D2}$, the AD conversion periods $t_{ADCT\_A2}$ to $t_{ADCT\_D2}$ are executed with a time series shift so as not to overlap as described above. As can be seen from these, in the control example of Mode m, accumulated electric charges for each of pixels Pixel A2, Pixel B2, Pixel C2, and Pixel D2 are converted into a digital image signal. As a result, in Mode m, a high-resolution image can be captured.

As described above, the pixel array unit 10 of the electronic device 1 according to the present embodiment includes the plurality of first pixel units 100*a* and the plurality of second pixel units 100*b*. As a result, the plurality of first pixel units 100*a* and the plurality of second pixel units 100*b* can be driven in different modes. Furthermore, the plurality of first pixel units 100*a* and the plurality of second pixel units 100*b* can be configured by different units 200*a* to 200*e*. Therefore, the plurality of first pixel units 100*a* and the plurality of second pixel units 100*b* can be arranged in a region according to a purpose in the pixel array unit 10, and can be driven according to the purpose.

Third Embodiment

An electronic device 1 according to a third embodiment is different from the electronic device 1 according to the first embodiment in that a pixel array unit 10 of an imaging apparatus 4 includes a unit 200 and a unit 202 that are stacked. Hereinafter, a difference from the electronic device 1 according to the first embodiment is described.

Figure 31:
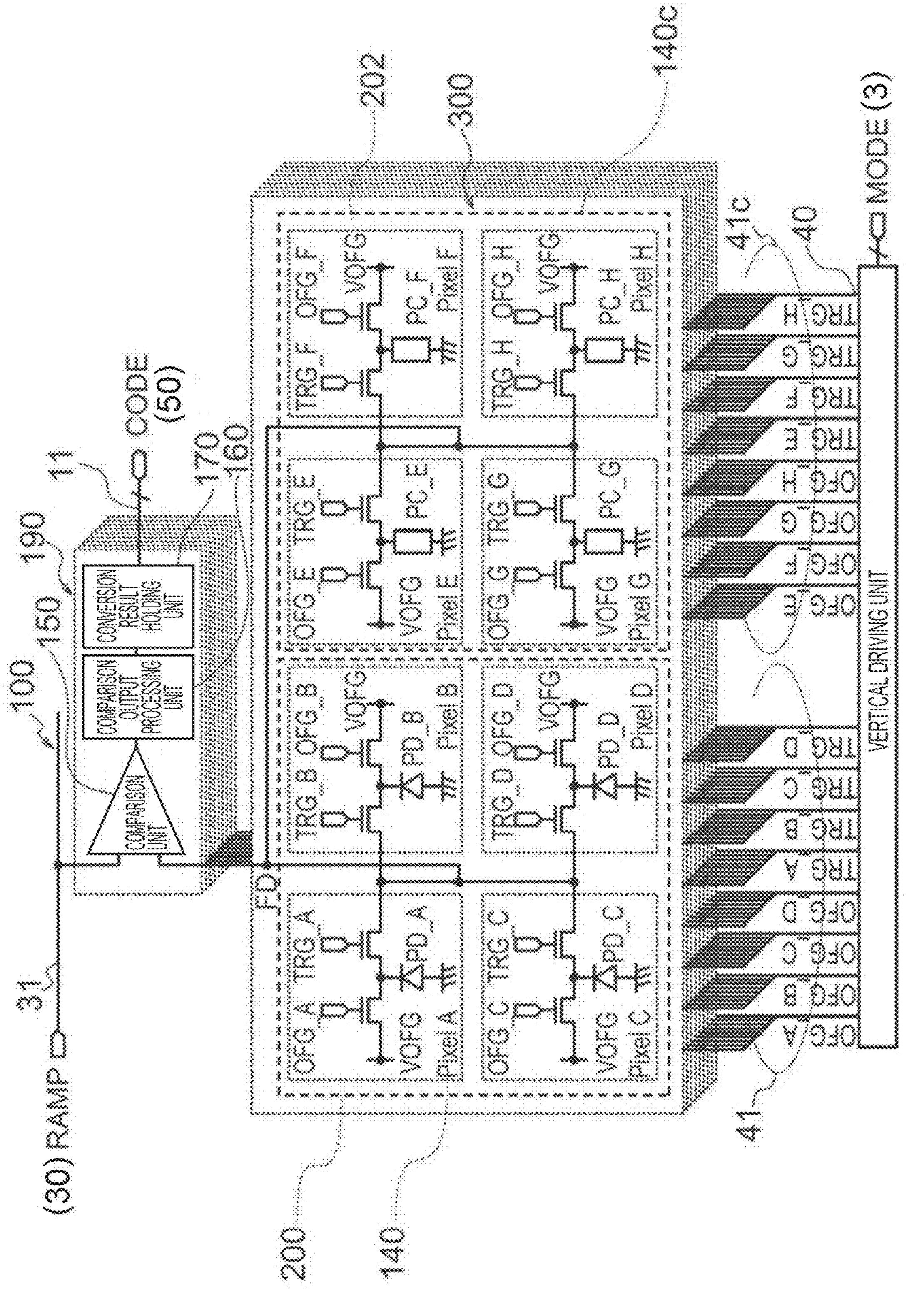
FIG. 31 is a block diagram depicting a configuration example of a pixel unit according to a third embodiment.

FIG. 31 is a block diagram depicting a configuration example of a pixel unit 100 according to the third embodiment. As depicted in FIG. 31, a unit 300 includes the unit 200 and the unit 202. The photoelectric conversion element of a pixel 140*c* of the unit 202 is a photoelectric conversion element (PC) formed containing non-silicon, and is, for example, an organic film. A plurality of pixels 140 in the unit 200 and a plurality of pixels 140*c* in the unit 202 are connected to a floating diffusion FD.

A control signal (TRG_A to TRG_D, OFG_A to OFG_D) is supplied to the unit 200, and a control signal (TRG_E to TRG_H, OFG_E to OFG_H) is supplied to the unit 200, from a vertical driving unit 40. In this way, a signal line 41 and a signal line 41*c* are separately wired such that different signals are supplied from the vertical driving unit 40, as the OFG/TRG signals supplied to the unit 200 and the OFG/TRG signals supplied to the unit 200.

Figure 32:
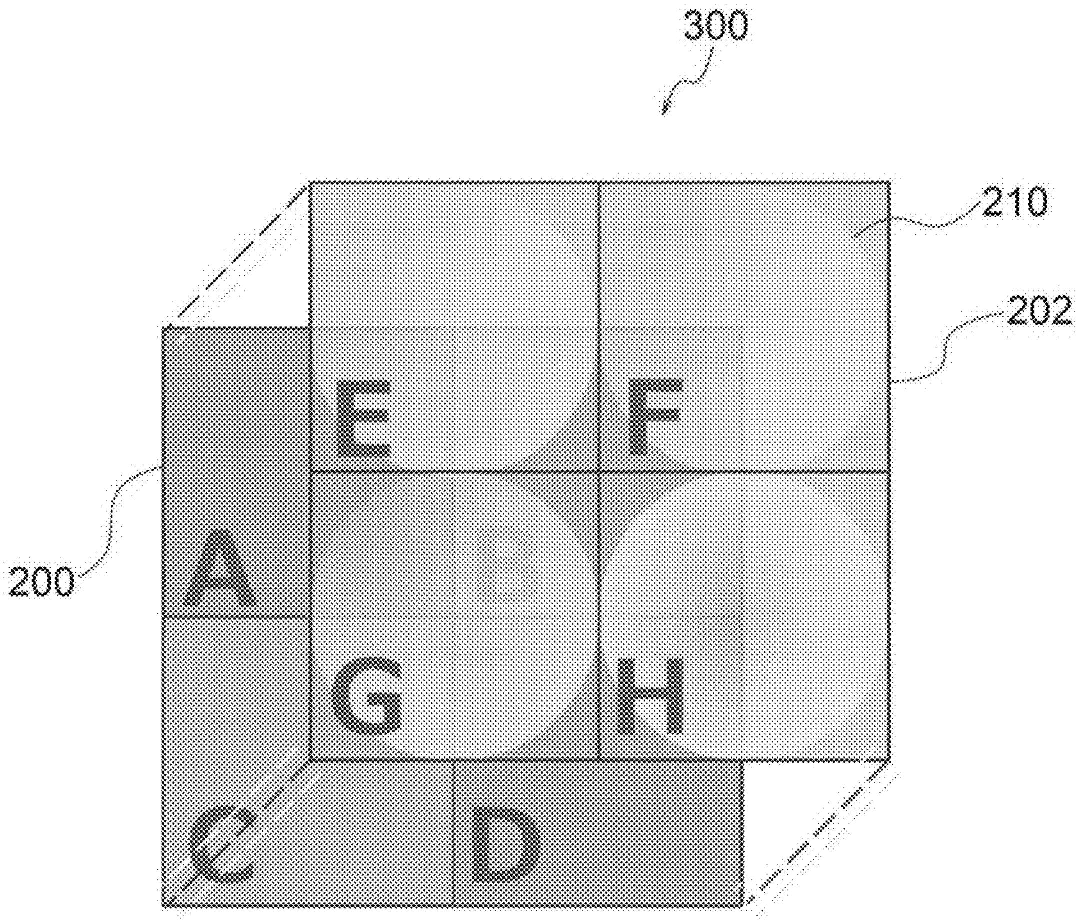
FIG. 32 is a block diagram depicting an arrangement example of units according to the third embodiment.

FIG. 32 is a block diagram depicting an arrangement example of the unit 300 according to the third embodiment. As depicted in FIG. 32, the unit 300 is configured by stacking the unit 200 and the unit 202. That is, the unit 300 has a structure in which pixels Pixel E to Pixel H of the unit 200 are stacked on top of pixels Pixel A to Pixel D of the unit 202. For example, pixels Pixel A and Pixel D are blue pixels, and pixels Pixel B and Pixel C are red pixels. The pixels Pixel E to Pixel H are green pixels. In this way, a color filter B is stacked on pixels Pixel A and Pixel D, a color filter R is stacked on pixels Pixel B and Pixel C, and a color filter G is stacked on pixels Pixel E to Pixel H.

Figure 33:
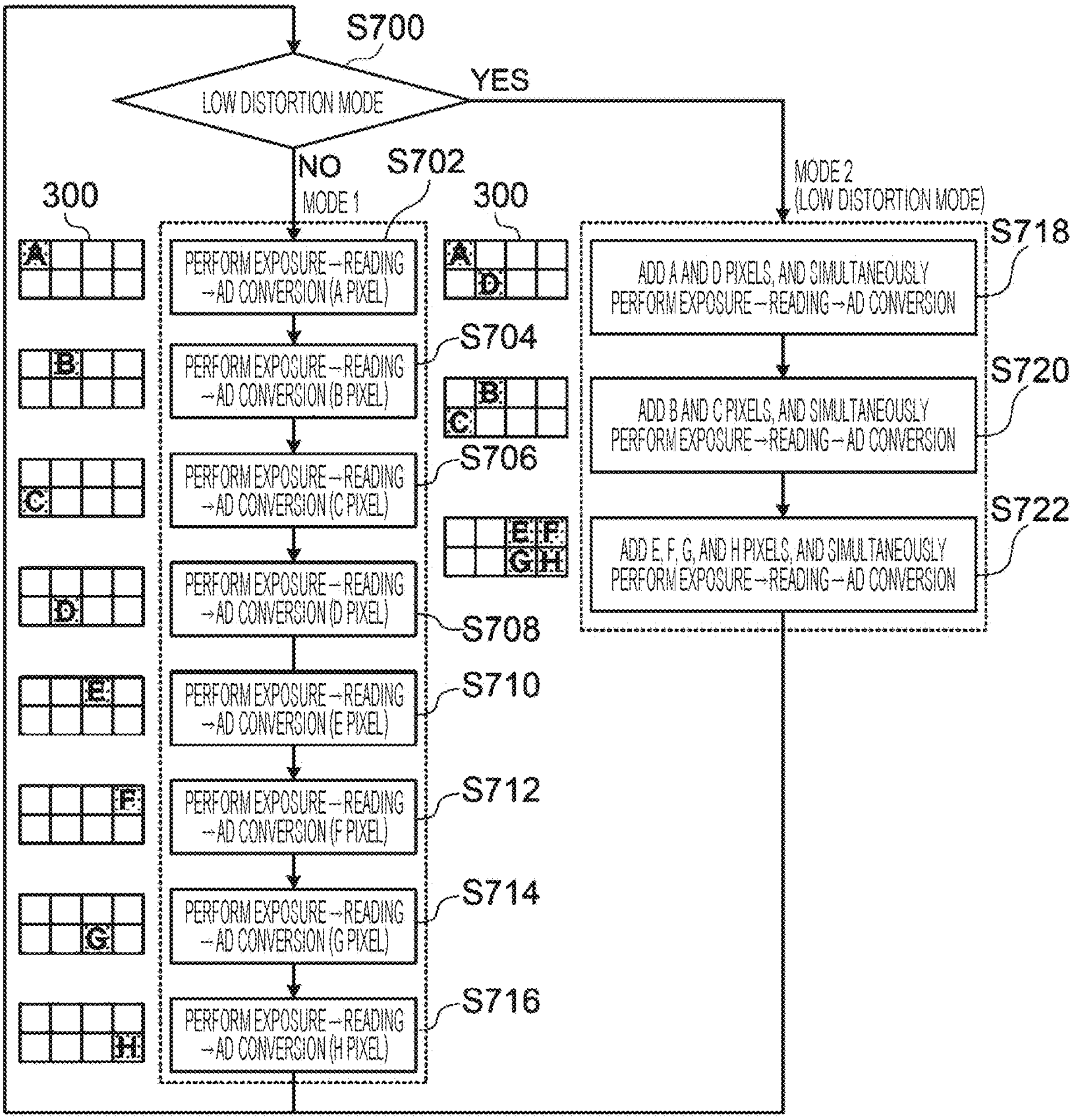
FIG. 33 is a flowchart depicting a control example using the unit according to the third embodiment.

FIG. 33 is a flowchart depicting a control example using the unit 300. As depicted in FIG. 33, Mode 2 corresponds to the low distortion mode.

As depicted in FIG. 33, first, a mode selection signal is input from an input device 12 (see FIG. 1) of the electronic device 1, and a control unit 3 determines whether or not to be the low distortion mode on the basis of the input (step S700). When the control unit 3 determines not to be the low distortion S mode (NO in step S700), the control unit 3 first performs photoelectric conversion by exposure of Pixel A, reading, and AD conversion as Mode 1 (step S702). Next, photoelectric conversion by exposure of Pixel B, reading, and AD conversion are performed (step S704). Next, photoelectric conversion by exposure of Pixel C, reading, and AD conversion are performed (step S706). Next, photoelectric conversion by exposure of Pixel D, reading, and AD conversion are performed (step S708).

Next, photoelectric conversion by exposure of Pixel E, reading, and AD conversion are performed (step S710). Next, photoelectric conversion by exposure of Pixel F, reading, and AD conversion are performed (step S712). Next, photoelectric conversion by exposure of Pixel G, reading, and AD conversion are performed (step S714). Next, photoelectric conversion by exposure of Pixel H, reading, and AD conversion are performed (step S716).

Whereas, when the control unit 3 determines to be the low distortion mode (YES in step S700), the control unit 3 first simultaneously performs photoelectric conversion by exposure of Pixel A and Pixel D, simultaneously performs reading to the floating diffusion FD (see FIG. 4), and performs AD conversion on the basis of a potential of the floating diffusion FD (step S718). Next, photoelectric conversion by exposure of Pixel B and Pixel C is simultaneously performed, reading is simultaneously performed to the floating diffusion FD (see FIG. 4), and AD conversion is performed on the basis of a potential of the floating diffusion FD (step S720). Next, photoelectric conversion by exposure of Pixel E to Pixel H is simultaneously performed, reading is simultaneously performed to the floating diffusion FD (see FIG. 4), and AD conversion is performed on the basis of a potential of the floating diffusion FD (step S722).

In this way, in the electronic device 1 according to the present embodiment, the unit 200 and the unit 202 are stacked. As a result, the same imaging region can be imaged in different modes.

Fourth Embodiment

An electronic device 1 according to a fourth embodiment is different from the electronic device 1 according to the first embodiment in that three or more types of units 200 to be driven in different modes are mixed in a pixel array unit 10 of an imaging apparatus 4. Hereinafter, a difference from the electronic device 1 according to the first embodiment is described.

Figure 34:
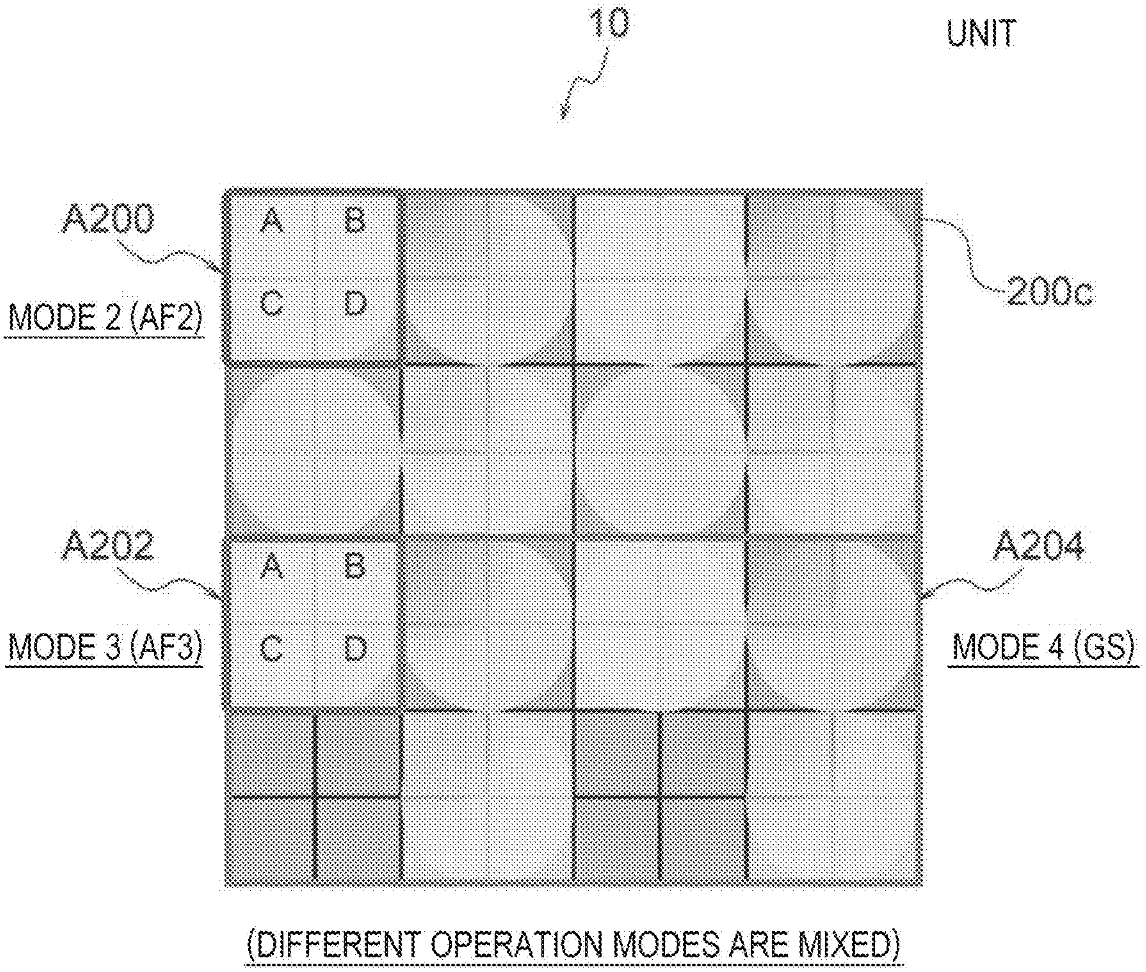
FIG. 34 is a view depicting an example of a pixel array unit in which the units (FIG. 8) are arranged.

FIG. 34 is a view depicting an example of the pixel array unit 10 in which units 200*c* (see FIG. 8) are arranged. While referring to FIG. 18, as depicted in FIG. 34, the unit 200*c* in an area A200 is driven in Mode 2 (AF mode 2), the unit 200*c* in an area A202 is driven in Mode 3 (AF mode 3), and the unit 200*c* in an area A204 which is another area is driven in Mode 4 (GS mode).

Figure 35:
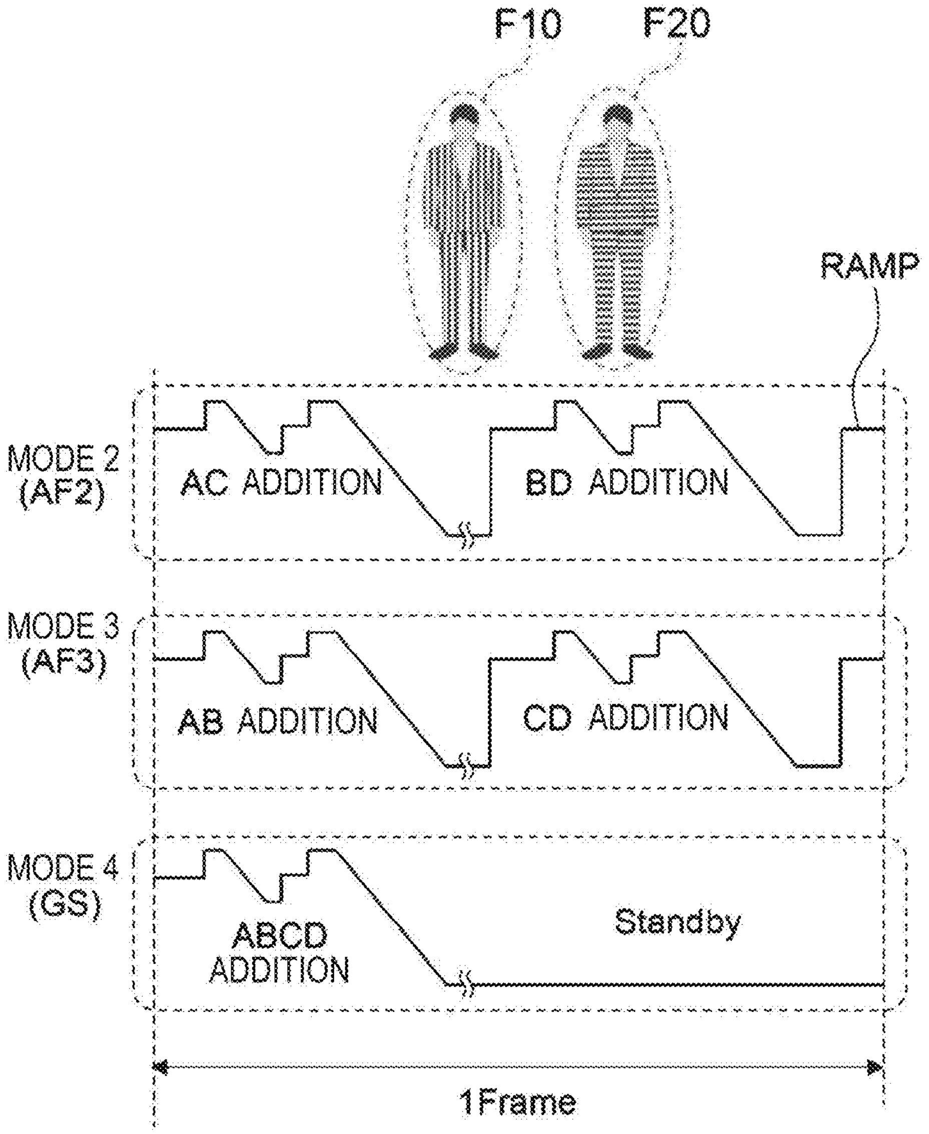
FIG. 35 is a time chart of Mode 2 (AF mode 2), Mode 3 (AF mode 3), and Mode 4 (GS mode).

FIG. 35 is a time chart of Mode 2 (AF mode 2), Mode 3 (AF mode 3), and Mode 4 (GS mode). A horizontal axis represents time, and a vertical axis represents RAMP signals of Mode 2, Mode 3, and Mode 4 individually. As depicted in FIG. 35, in the first half of one Frame, pixels Pixel A and Pixel C are added in Mode 2, pixels Pixel A and Pixel B are added in Mode 3, and pixels Pixel A to Pixel D are added in Mode 4. In the latter half of one Frame, the pixels Pixel B and Pixel D are added in Mode 2, and the pixels Pixel C and Pixel D are added in Mode 3. The unit 200*c* mainly used to perform AF processing on a subject F10 having many vertical lines and operated in Mode 3 is mainly used to perform the AF processing on a subject F12 having many horizontal lines. Furthermore, the unit 200*c* that acts in Mode 4 is used to acquire an image without distortion. By mixing units of different operation modes in a pixel plane in this manner, it is possible to simultaneously realize high-accuracy AF processing and global shutter (GS).

Figure 36:
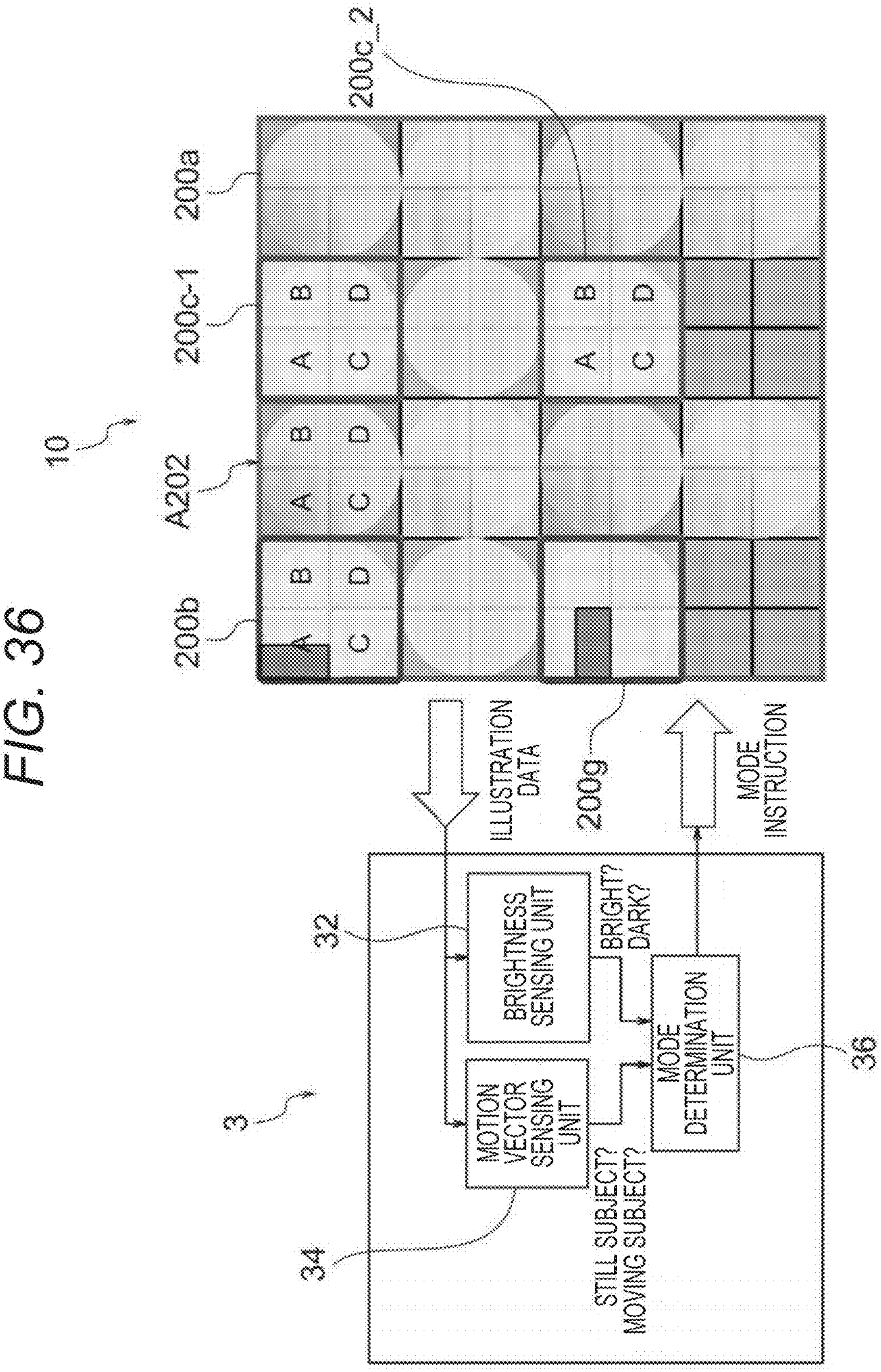
FIG. 36 is a view depicting a configuration example of a control unit and a configuration example of the pixel array unit.

FIG. 36 is a view depicting a configuration example of a control unit 3 and a configuration example of the pixel array unit 10. As depicted in FIG. 36, a unit 200*a* (see FIG. 6) is arranged in a region A202 that occupies a large region of the pixel array unit 10. Then, units 200*b* (see FIG. 7), 200*c*_1 (see FIG. 8), 200*c*_2 (see FIG. 8), and 200*g* (see FIG. 12) are arranged in a mixed manner in the pixel array unit 10. The control unit 3 analyzes image data generated by the pixel array unit 10, and determines the mode of each of the units 200*a*, 200*b*, 200*c*_1, 200*c*_2, and 200*g*.

The control unit 3 includes a brightness sensing unit 32, a motion vector sensing unit 34, and a mode determination unit 36. The brightness sensing unit 32 detects luminance of a subject on the basis of image data. For example, the brightness sensing unit 32 senses a degree of brightness of the subject by using an average value of image signals of the subject. Furthermore, the motion vector sensing unit 34 senses a degree of motion of the subject by, for example, optical flow calculation processing on the basis of image data.

FIGS. 37 to 40 are tables depicting a mode determination example of the mode determination unit 36. In the following description, Unit 1 corresponds to the units 200*b* and 200*g*, Unit 2 corresponds to the unit 200*c*_1, Unit 3 corresponds to 200*c*_2, and Unit 4 corresponds to the unit 200*g*. Furthermore, A to D correspond to pixels Pixel A, Pixel B, Pixel C, Pixel D, and the like. Furthermore, "+" means addition of an analog image signal in a floating diffusion FD and the like. For example, "B+C+D" indicates that analog image signals of Pixel B, Pixel C, and Pixel D are summed by the floating diffusion FD and subjected to AD conversion. As depicted in FIGS. 37 to 40, for example, the mode determination unit 36 determines the mode by using signals output from the brightness sensing unit 32 and the motion vector sensing unit 34. The mode determination unit 36 supplies a mode setting signal MODE including information about the determined mode to the vertical driving unit 40.

FIG. 37 is a table depicting a mode (MODE 1) determination example in a case where luminance of the subject is in a bright state and the degree of motion is high. In the first AD conversion, Unit 1 simultaneously adds pixels Pixel B, Pixel C, and Pixel D, and Unit 2, Unit 3, and Unit 4 simultaneously add pixels Pixel A, Pixel B, Pixel C, and Pixel D. In the second AD conversion, only a signal of the pixel Pixel A of Unit 1 is subjected to AD conversion. In this way, in a case of a moving subject, in principle, imaging is performed in the GS mode in order to acquire an image without distortion. Then, in order to use, for AF, data of an image-plane phase pixel (ZAF) having higher AF accuracy in a bright environment, only a signal of the pixel Pixel A of Unit 1 is subjected to AD conversion.

FIG. 38 is a table depicting a mode (MODE 2) determination example in a case where luminance of the subject is in a dark state and the degree of motion is high. In the first AD conversion, Unit 1 simultaneously adds pixels Pixel B, Pixel C, and Pixel D, Unit 2 simultaneously adds pixels Pixel A and Pixel C, Unit 3 simultaneously adds pixels Pixel A and Pixel B, and Unit 4 simultaneously adds pixels Pixel A, Pixel B, Pixel C, and Pixel D. In the second AD conversion, only a signal of the pixel Pixel A is subjected to AD conversion in Unit 1, Unit 2 simultaneously adds the pixels Pixel B and Pixel D, and Unit 3 simultaneously adds the pixels Pixel C and Pixel D. In this way, when the moving subject is in a dark state, Unit 4 captures an image in the GS mode in order to obtain an image without distortion. Then, in order to use, for AF, data of Units 2 and 3 (2×2 OCL), which are good at AF in a dark environment, Units 2 and 3 are driven in the AF mode. Note that (2×2 OCL) means that on-chip lenses are arranged individually for four pixels.

FIG. 39 is a table depicting a mode (MODE 3) determination example in a case where luminance of the subject is in a bright state and the degree of motion is low. In a case where the degree of motion is low, imaging is performed in the high-resolution mode in principle. That is, Units 1 to 4 are driven in the high-resolution mode in which AD conversion is performed pixel by pixel. In order to use, for AF, data of the image-plane phase pixel (ZAF) having higher AF accuracy in a bright environment, a signal of the pixel Pixel A of Unit 1 is used for AF.

FIG. 40 is a table depicting a mode (MODE 4) determination example in a case where luminance of the subject is in a dark state and the degree of motion is low. In the first AD conversion, Units 1 and 4 are driven in the high-resolution mode in which AD conversion is performed pixel by pixel. Then, in order to use, for AF, data of Units 2 and 3 (2×2 OCL) with higher AF accuracy in a dark environment, Units 2 and 3 are driven in the AF mode.

In this way, in the electronic device 1 according to the present embodiment, three or more types of the units 200 to be driven in different modes are mixed in the pixel array unit 10 of the imaging apparatus 4. As a result, three or more types of image data, image-plane phase information, and the like according to a purpose can be acquired. Furthermore, the control unit 3 sets the mode of each unit 200 in accordance with the degree of brightness and the degree of motion of the subject.

As a result, the electronic device 1 can set a mode according to an imaging environment, and can generate image data with higher definition or image data with lower distortion.

Fifth Embodiment

An electronic device 1 according to a fifth embodiment can acquire phase difference information of a plurality of times by a plurality of times of capturing of a sub frame within one frame, and further perform autofocus (AF) control using the phase difference information of the plurality of times, which are different from the electronic device 1 according to the first to fourth embodiments. Hereinafter, a difference from the electronic device 1 according to the first to fourth embodiments will be described.

Figure 41:
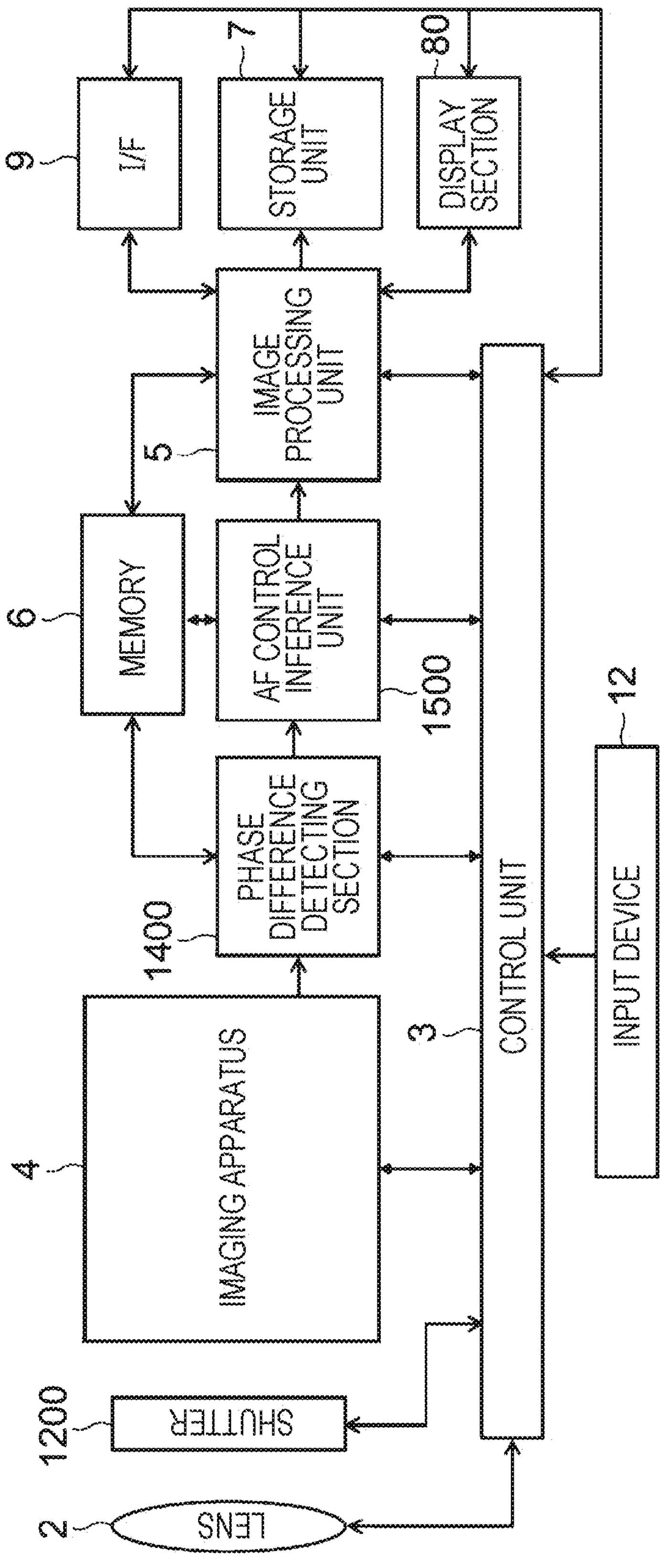
FIG. 41 is a block diagram depicting a configuration of an example of an electronic device according to a fifth embodiment.

FIG. 41 is a block diagram depicting a configuration of an example of the electronic device 1 according to the fifth embodiment. In FIG. 41, the electronic device 1 is different from the electronic device 1 depicted in FIG. 1 in further including a shutter 1200, a phase difference detecting section 1400, and an AF control inference unit 1500. The shutter 1200 is a shutter including a diaphragm function. The phase difference detecting section 1400 can perform phase difference detection from an image-plane phase difference pixel.

The AF control inference unit 1500 generates a focal position of a lens 2 of the next frame from phase difference information detected by the phase difference detecting section 1400. Furthermore, the AF control inference unit 1500 can also infer a focal position of the lens 2 after a predetermined time, for example, at a start of imaging of the next frame, by using a plurality of pieces of phase difference information detected by the phase difference detecting section 1400. A control unit 3 can control the position of the lens 2 and the shutter 1200 in response to signals generated by the phase difference detecting section 1400 and the AF control inference unit 1500.

Figure 42:
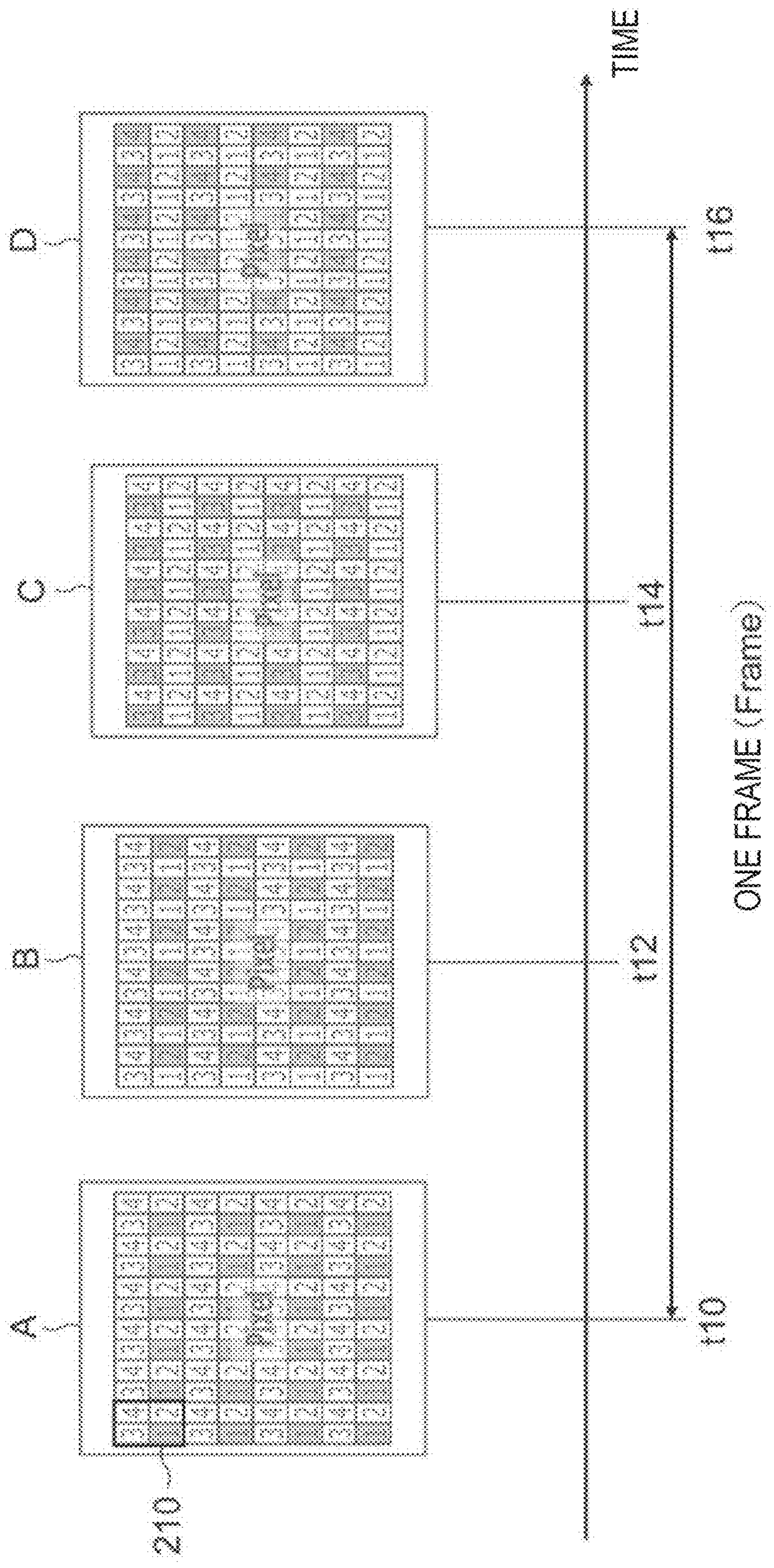
FIG. 42 is a diagram depicting an imaging example in a pixel array according to the fifth embodiment.

While referring to FIGS. 2 and 4, an imaging example in a pixel array unit 10 will be described with reference to FIG. 42. FIG. 42 is a diagram depicting an imaging example in the pixel array unit 10 according to the fifth embodiment. A horizontal axis indicates time. For example, the control unit 3 operates a combination of four adjacent pixel circuits 140 as a pixel circuit 210. For example, the pixel circuit 210 corresponds to a unit 200 (see FIG. 4).

As depicted in FIG. 42, in the pixel circuit 210 according to the present embodiment, for example, a lower left pixel circuit 140 among four adjacent pixel circuits 140 is defined as a sub-pixel group A, a lower right pixel circuit 140 is defined as a sub-pixel group B, an upper left pixel circuit 140 is defined as a sub-pixel group C, and an upper right pixel circuit 140 is defined as a sub-pixel group D. In the sub-pixel groups A, B, C, and D, image-plane phase pixels (ZAF pixels) are arranged at predetermined positions in the pixel array 10. For example, as depicted in FIGS. 7, 11, and 12, the image-plane phase pixel is configured as a pixel in which a part of a light receiving unit is shielded from light by a light shielding member, for example. Note that, in a case of control to cause imaging to be performed with time shifted in the order of the sub-pixel groups A, B, C, and D, for example, a pixel unit 100 (see FIG. 2, for example) including one FD for four pixel circuits 140, such as a unit 200*b* (see FIG. 7), can be used.

For example, exposure, reading, and AD conversion of the sub-pixel group A are performed at times t10 to t12. Similarly, exposure, reading, and AD conversion of the sub-pixel group B are performed at times t12 to t14. At times t14 to t16, exposure, reading, and AD conversion of the sub-pixel group C are performed. Exposure, reading, and AD conversion of the sub-pixel group D are performed at times t16 to t18 (not illustrated). Note that these are examples of driving examples, and driving is not limited thereto. For example, standby time or the like may be further included between imaging operations between the pixel groups. Furthermore, the number of pixel groups is not limited to four, and may be, for example, 8, 16, 32, 64, or the like.

Note that, in the present embodiment, a first reading period of the pixel array unit 10 may be referred to as a main frame or a frame, and a second reading period shorter than the first reading period may be referred to as a sub frame. For example, a period obtained by summing a plurality of sub frames corresponds to the main frame. Furthermore, an image including an image signal read in the sub frame may be referred to as a sub-frame image. For example, each of times t10 to t12, times t12 to t14, times t14 to t16, and times t16 to t18 may be referred to as a sub frame, and individual images may be referred to as sub-frame images A, B, C, or D.

(Third Mode)

A third mode is a mode in which a position of the lens 2 is fixed, an imaging target 8 is imaged as the sub-frame images A, B, C, and D in the order of the sub-pixel groups A, B, C, and D, and phase difference information with respect to the imaging target 8 is obtained in time series. A moving direction and a moving amount of the lens 2 of the imaging target 8 along an optical axis direction can be predicted from the phase difference information obtained in time series. Note that the third mode according to the present embodiment corresponds to the fixed mode.

Figure 43:
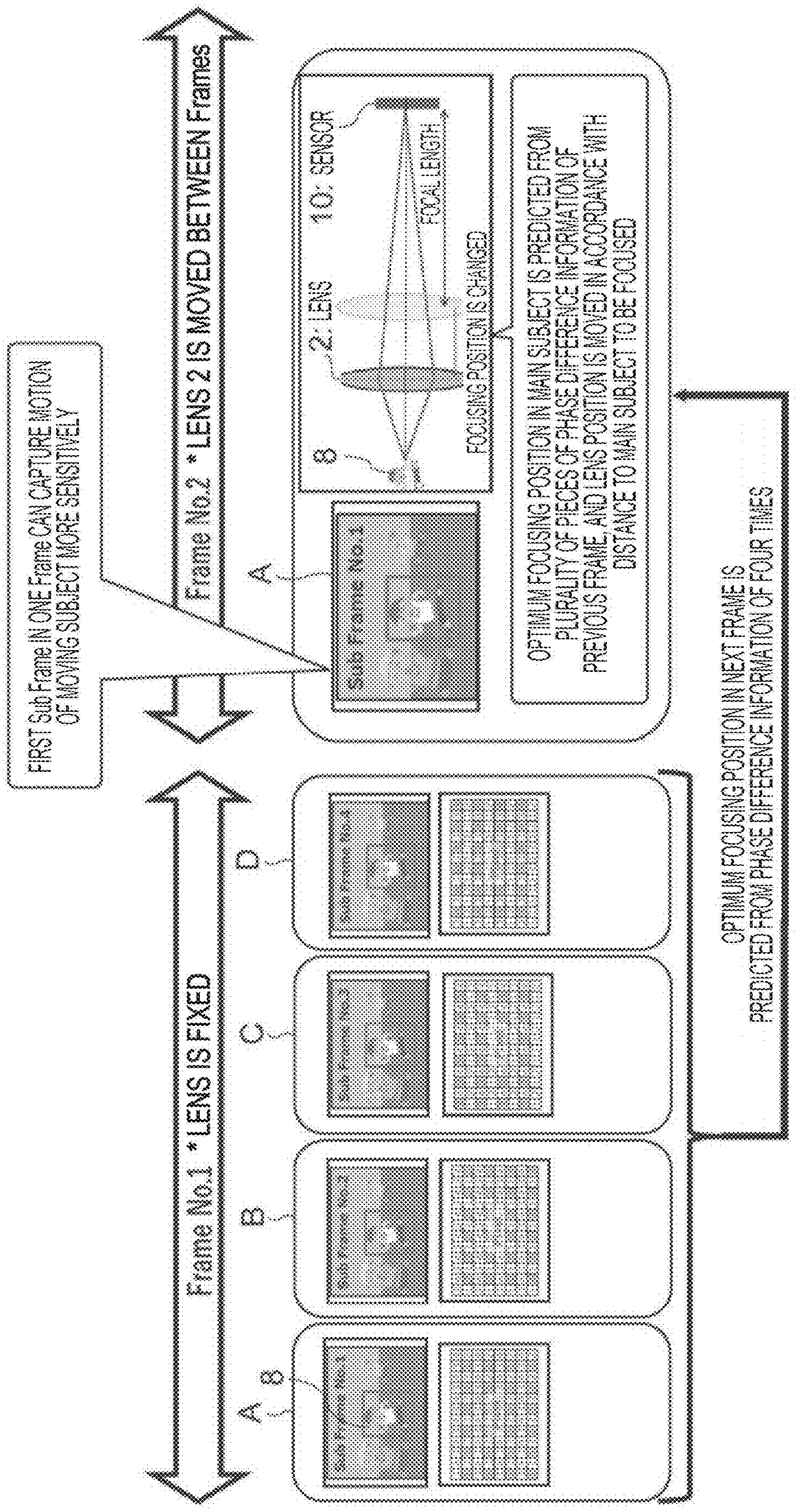
FIG. 43 is a view depicting a drive example of the electronic device in a third mode.

FIG. 43 is a diagram depicting a drive example of the electronic device 1 in the third mode. In a first frame, a control circuit 3 (see FIG. 41) fixes the position of the lens 2, and causes an imaging apparatus 4 (see FIG. 41) to image the imaging target 8 in the order of the pixel groups A, B, C, and D (see FIG. 42). The phase difference detecting section 1400 performs phase difference detection from image-plane phase difference pixels in the order of the pixel groups A, B, C, and D. Then, signals including the detected image-plane phase difference information are sequentially output to the AF control inference unit 1500.

The AF control inference unit 1500 uses the image-plane phase difference information obtained in time series to estimate the image-plane phase difference information at an imaging start time point in a second frame. Then, using the estimated image-plane phase difference information at the imaging start time point in the second frame or the estimated position of the lens 2, the position of the lens 2 in a state of being in focus on the imaging target 8 is inferred. Subsequently, the AF control inference unit 1500 outputs a signal including information regarding the predicted lens position to the control circuit 3. As a result, the control circuit 3 starts imaging the second frame after moving the lens 2 to the predicted lens position.

Note that estimating the image-plane phase difference information by the AF control inference unit 1500 is equivalent to estimating the position of the lens 2. In other words, estimating the image-plane phase difference information by the AF control inference unit 1500 is equivalent to estimating a distance from an imaging surface of the pixel array 10 to the imaging target 8 via the lens 2.

In the second frame, the lens position after the movement is fixed, and imaging in the third mode is performed similarly to the first frame. In this way, the AF control inference unit 1500 estimates the image-plane phase difference information of the imaging target 8 at a start time point of the next frame, and the control circuit 3 moves the position of the lens 2 in advance so as to be in focus on the imaging target 8. As a result, in the next frame, imaging can be started in a state where the imaging target 8 should be focused. Furthermore, since the image according to the present embodiment is of imaging by a so-called global shutter method, distortion of the sub-frame images A, B, C, and D is suppressed, and a decrease in accuracy of a focal length of the lens 2 is suppressed. As will be described later with reference to FIG. 48, in the imaging by the global shutter method, a time lag for each row is suppressed and image quality is further improved, as compared with the rolling shutter method.

In this way, in the present embodiment, the control unit 3 fixes the position of the lens 2 and images the imaging target 8 as the sub-frame images A, B, C, and D in the order of the sub-pixel groups A, B, C, and D, and the phase difference detecting section 1400 generates the phase difference information with respect to the imaging target 8 in time series. Then, by using the time-series phase difference information, the AF control inference unit 1500 predicts the position of the lens 2 in focus on the imaging target 8 at a predetermined time point, for example, at an imaging start time point of the next frame. As a result, in the next frame, imaging can be started in a state where the imaging target 8 should be focused.

Sixth Embodiment

An electronic device 1 according to a sixth embodiment can further perform a plurality of times of imaging of sub frames within one frame while changing a position of a lens 2, and this point is different from the electronic device 1 according to the fifth embodiment. Hereinafter, a difference from the electronic device 1 according to the fifth embodiment is described.

(Fourth Mode)

A fourth mode is a mode in which an imaging target is imaged as sub-frame images A, B, C, and D in the order of sub-pixel groups A, B, C, and D while a lens 2 is being moved. It is possible to obtain the sub-frame images A, B, C, and D having different focal positions in time series. Note that the fourth mode according to the present embodiment corresponds to a moving mode.

Figure 44:
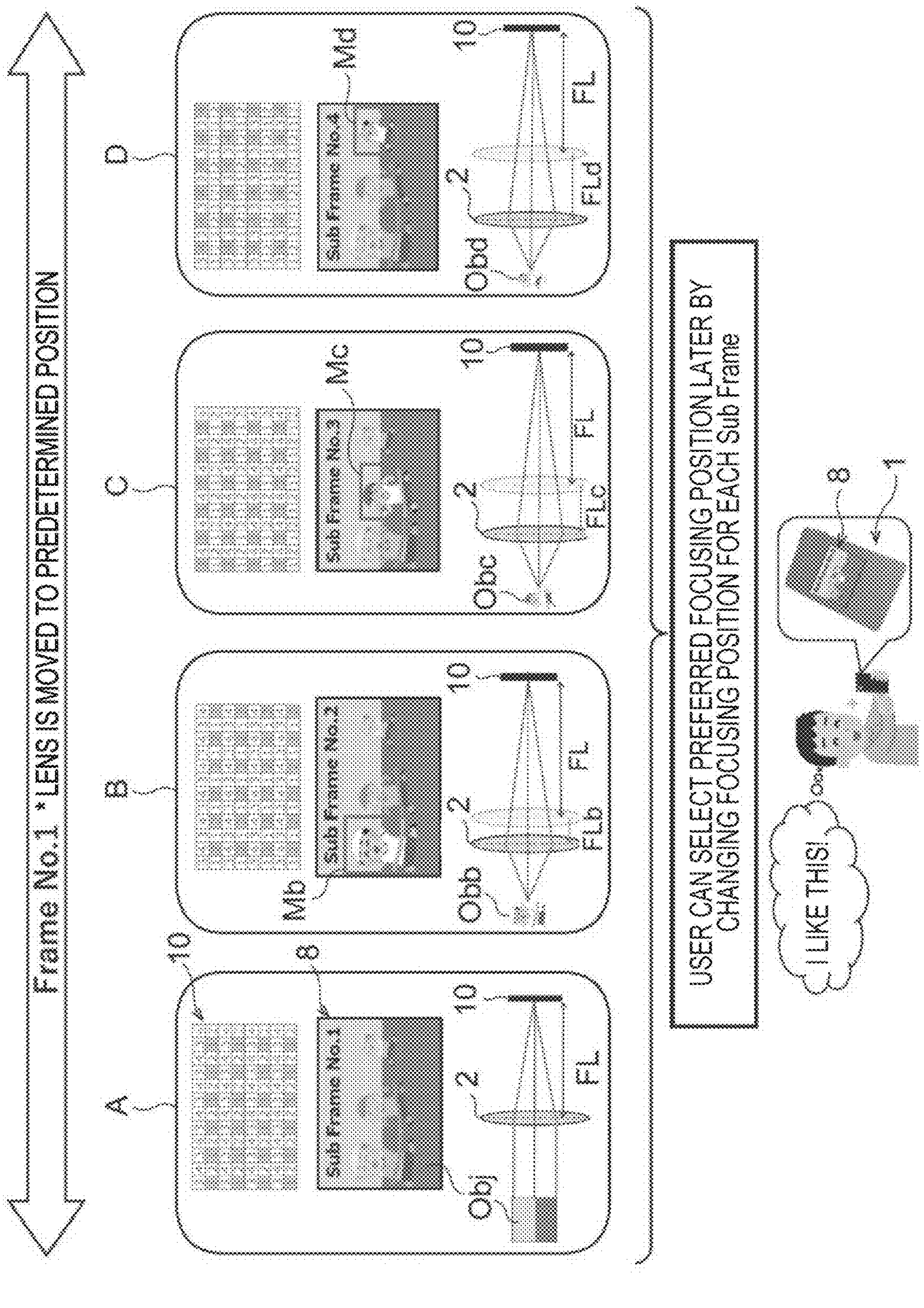
FIG. 44 is a view depicting a drive example of the electronic device in a fourth mode.

FIG. 44 is a diagram depicting a drive example of the electronic device 1 in the fourth mode. A control circuit 3 (see FIG. 41) causes an imaging apparatus 4 (see FIG. 41) to image an imaging target 8 in the order of pixel groups A, B, C, and D while sequentially moving a position of the lens 2 to a predetermined position. For example, in FIG. 44, the control circuit 3 moves the position of lens 2 so as to obtain focal lengths FL, FL+FLb, FL+FLC, and FL+FLd. For example, there is a relationship of FLb<FLC<FLd.

As a result, in the sub-frame image A, an image in focus on an imaging target Obj having the focal length FL is captured. That is, in the sub-frame image A, an image in focus on the specific imaging target Obj within a range of the image capture target 8 is captured. In the sub-frame image B, an image in focus on an imaging target Obb corresponding to the focal length FL+FLb is captured. In the sub-frame image C, an image in focus on an imaging target Obc corresponding to the focal length FL+FLc is captured. In the sub-frame image D, an image in focus on an imaging target Obd corresponding to the focal length FL+FLd is captured. Furthermore, since the image according to the present embodiment is of imaging by a so-called global shutter method, an image in which distortion is suppressed is captured in the sub-frame images A, B, C, and D. Note that the imaging targets Obb, Obc, and Obd correspond to subjects in frames Mb, Mc, and Md, for example.

A person who captures an image can cause a display section 80 to display the sub-frame images A, B, C, and D in this order by an operation input via an input device 12 (see FIG. 41). Furthermore, the person who captures an image can input an instruction signal for selecting captured images of the sub-frame images A, B, C, and D displayed on the display section 80, on the basis of an operation input via the input device 12 (see FIG. 41). For example, the control circuit 3 can select a captured image from among the captured images of the sub-frame images A, B, C, and D on the basis of the instruction signal, and cause only the selected captured image to be stored in a storage unit 7. As a result, a capacity of the storage unit 7 can be mitigated.

In this way, for example, even in a case where it is difficult to focus on a specific imaging target, it is possible to obtain a focused captured image. For example, even in a case where a large number of people are imaged in an athletic meet or the like, it is possible to capture an image in focus on a different person for each of the sub-frame images A, B, C, and D. Note that the input device 12 according to the present embodiment corresponds to an input unit.

In this way, in the present embodiment, a control unit 3 images the imaging target in the order of the sub-frame images A, B, C, and D while the lens 2 is being moved. As a result, the person who captures an image can obtain captured images at a plurality of focal positions without performing a focusing operation.

Seventh Embodiment

An electronic device 1 according to a seventh embodiment can further perform cluster reading on a captured image, and this point is different from the electronic device 1 according to the sixth embodiment. Hereinafter, a difference from the electronic device 1 according to the sixth embodiment is described.

Figure 45:
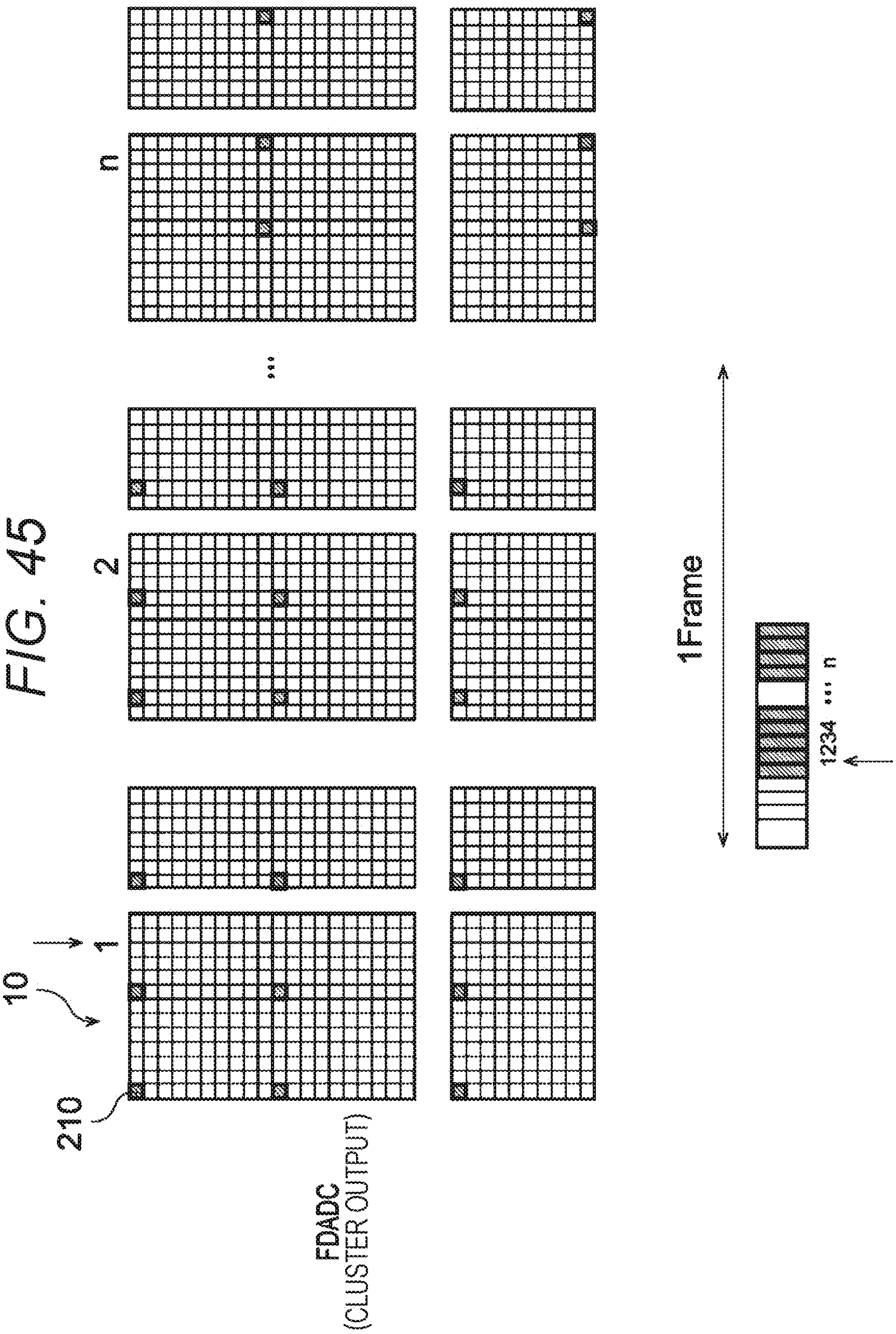
FIG. 45 is a view depicting an operation example of cluster reading.

FIG. 45 is a view depicting an operation example of cluster reading. As depicted in FIG. 45, one cluster includes, for example, N vertical pixel circuits 210 and M horizontal pixel circuits 210. Here, Z=N×M, N=10 (row), and M=7 (column) are satisfied, and n is a natural number of 1 to Z. The individual clusters are arranged in a matrix in a pixel array unit 10 (see FIG. 2).

In cluster reading, the pixel circuits 210 for each cluster are sequentially read in parallel. For example, any one of numbers 1 to Z corresponds to each pixel circuit 210 in the cluster. As a result, for example, in one cluster, the pixel circuit 210 at the left end of the first row is read when n=1 is satisfied, for example, the second pixel circuit 210 from the left end of the second row is read when n=9 is satisfied, and for example, the pixel circuit 210 at the right end of an N-th row is read when n=70 is satisfied. An operation of sequentially reading the pixel circuits 210 in the cluster in parallel for each cluster in this manner is referred to as the cluster reading. That is, in a case where the number of pixel circuits 210 in the cluster is 70, reading is performed 70 times in parallel for each cluster.

Figure 46:
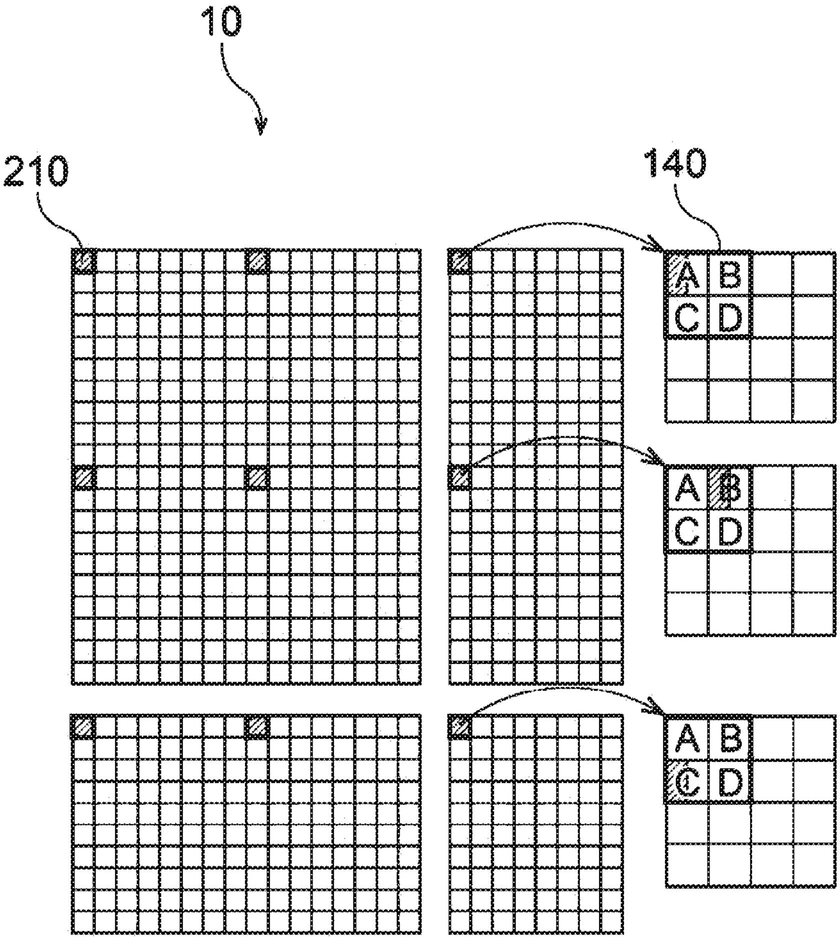
FIG. 46 is a view depicting an arrangement example of image-plane phase pixels in a pixel circuit.

FIG. 46 is a diagram depicting an arrangement example of image-plane phase pixels in the pixel circuit 210. As depicted in FIG. 46, in the pixel circuit 210 to be subjected to the cluster reading first, one of the four pixel circuits 140 is set as an image-plane phase pixel (ZAF pixel). For example, as depicted in FIGS. 7, 11, and 12, the image-plane phase pixel is configured as a pixel in which a part of a light receiving unit is shielded from light by a light shielding member, for example.

Furthermore, in the present embodiment, in the pixel circuit 210 to be subjected to the cluster reading first, the pixel circuit 210 in which the image-plane phase pixel is arranged at a position of A, the pixel circuit 210 in which the image-plane phase pixel is arranged at a position of B, the pixel circuit 210 in which the image-plane phase pixel is arranged at a position of C, and the pixel circuit 210 in which the image-plane phase pixel is arranged at a position of D are evenly distributed and arranged in the pixel array unit 10.

Furthermore, in the present embodiment, the cluster reading is performed for each sub-pixel group. Among four adjacent pixel circuits 140 of the pixel circuit 210 according to the present embodiment, an upper left pixel circuit 140 is defined as a sub-pixel group A, an upper right pixel circuit 140 is defined as a sub-pixel group B, a lower left pixel circuit 140 is defined as a sub-pixel group C, and a lower right pixel circuit 140 is defined as a sub-pixel group D.

For example, in a case where the sub-pixel group A is read, the upper left pixel circuit 140 of the pixel circuit 210 for each cluster is subjected to the cluster reading in parallel. Then, a sub-frame image A is formed on the basis of an image signal obtained by the cluster reading.

When the cluster reading of the sub-pixel group A is ended, next, the sub-pixel group B is read by the cluster reading. In a case of reading the sub-pixel group B, the pixel circuit 140 on the upper right of the pixel circuit 210 for each cluster is subjected to the cluster reading in parallel. Then, a sub-frame image B is formed on the basis of an image signal obtained by the cluster reading.

When the cluster reading of the sub-pixel group B is ended, next, the sub-pixel group C is read by the cluster reading. In a case of reading the sub-pixel group C, the pixel circuit 140 on the lower left of the pixel circuit 210 for each cluster is subjected to the cluster reading in parallel. Then, a sub-frame image C is formed on the basis of an image signal obtained by the cluster reading.

When the cluster reading of the sub-pixel group C is ended, next, the sub-pixel group D is subjected to the cluster reading. In a case of reading the sub-pixel group D, the pixel circuit 140 on the lower right of the pixel circuit 210 for each cluster is subjected to the cluster reading in parallel. Then, a sub-frame image D is formed on the basis of an image signal obtained by the cluster reading.

In this way, in a case where the number of pixel circuits 210 in the cluster is 70, the cluster reading is performed 70 times for each of the sub-frame images A, B, C, and D, and an image for one sub frame is generated. As can be seen from these, in the present embodiment, in the pixel circuit 140 that is read first for each of the sub-frame images A, B, C, and D, the image-plane phase pixels are equally included, and are evenly distributed and arranged in the pixel array unit 10.

Note that the cluster reading is not limited to the reading of all the pixel circuits 210 in the cluster, and for example, the pixel circuits 210 may be read every 4, 8, 16, and 32 pieces. Furthermore, the reading order of the pixel circuits 140 is not limited to the order of A, B, C, and D, and may be any order, and the pixel circuits 140 not subjected to reading may be set.

(Fifth Mode)

In a fifth mode, the cluster reading is performed for each of the sub-pixel groups A, B, C, and D, and a lens position for the next sub-frame image is inferred by using an image signal of the image-plane phase pixel for each of the sub-pixel groups A, B, C, and D. As a result, it is possible to obtain the sub-frame images A, B, C, and D whose focal positions are controlled in time series. Note that the fifth mode according to the present embodiment corresponds to the moving mode.

Figure 47:
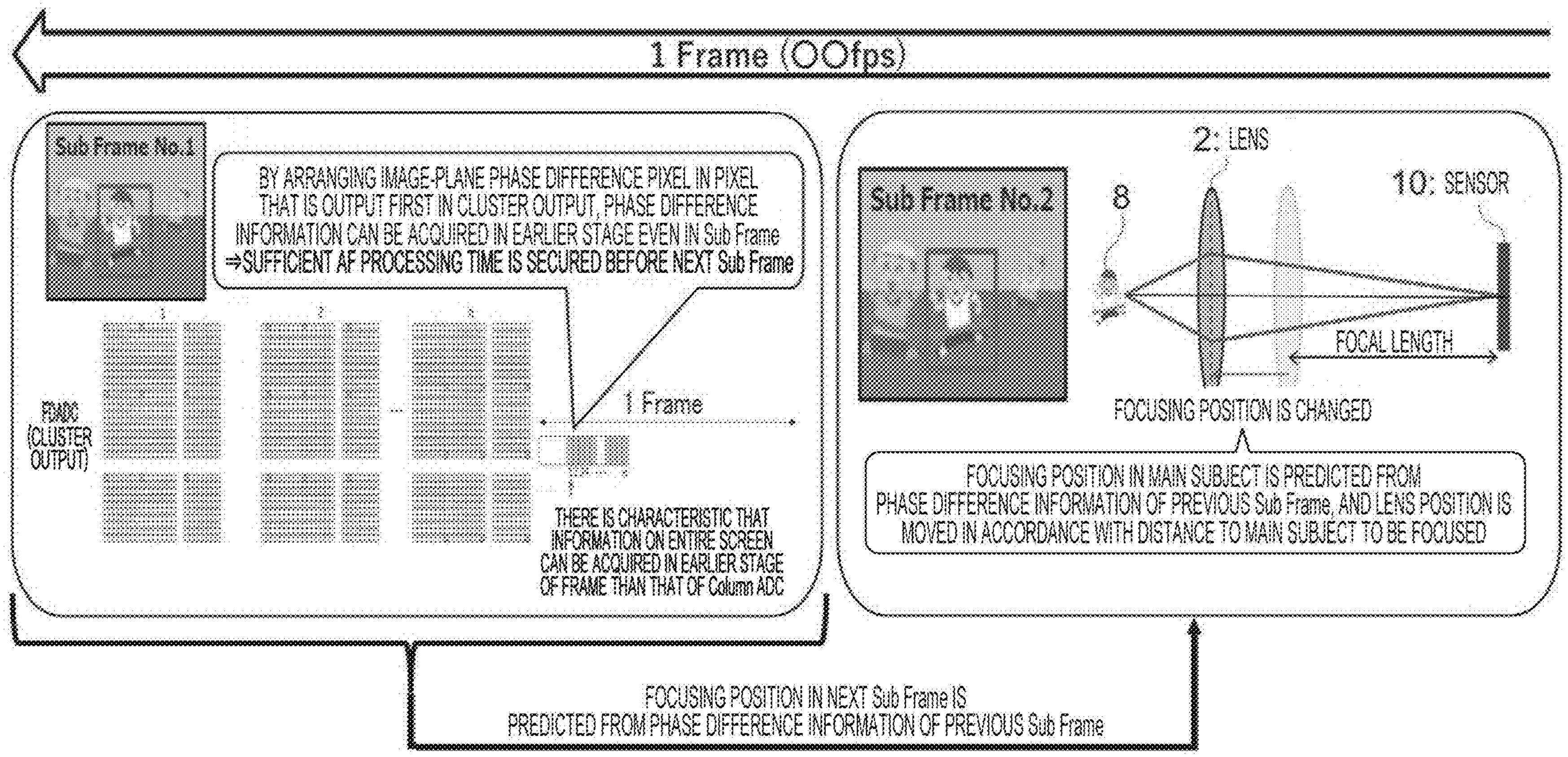
FIG. 47 is a view depicting a drive example of the electronic device 1 in a fifth mode.

FIG. 47 is a diagram depicting a drive example of the electronic device 1 in the fifth mode. A control circuit 3 (see FIG. 41) reads image signals by the cluster reading from the pixel circuit 210 in the order of the sub-pixel groups A, B, C, and D.

For example, a phase difference detecting section 1400 (see FIG. 41) detects phase difference information for each sub frame from the image-plane phase difference pixel that has been read first for each of the sub-pixel groups A, B, C, and D. Next, an AF control inference unit 1500 (see FIG. 41) sequentially infers a lens position of the next sub frame on the basis of the phase difference information for each sub frame detected by the phase difference detecting section 1400. Then, the control circuit 3 moves the lens 2 to the inferred position.

In this way, in the fifth mode, for example, during the cluster reading of the sub-pixel group A, a lens position for the sub-frame image B (Sub Frame No. 2) can be inferred, and the lens position can be moved in accordance with an imaging timing of the sub-frame image B. In this case, the pixel circuit 140 subjected to the cluster reading first includes the image-plane phase pixel. Therefore, it is possible to infer a focal position for the sub-frame image B and secure longer time to move the position of the lens before the sub-frame image B is captured next.

Moreover, the image-plane phase pixels included in the pixel circuits 140 subjected to the cluster reading first are evenly distributed and arranged in the pixel array unit 10. As a result, inference accuracy of the lens position for the sub-frame image B is further improved. In this way, in the fifth mode, the sub-frame image A (Sub Frame No. 1) is captured, and the position of the lens can be moved in accordance with an imaging timing of the next sub-frame image B (Sub Frame No. 2) during the cluster reading. By repeating such processing, even in a case where the subject 8 moves, the lens position is controlled in time series in accordance with the subject 8 for each of the sub-frame images A, B, C, and D, and it is possible to capture an image in which a focal position is more aligned.

Figure 48:
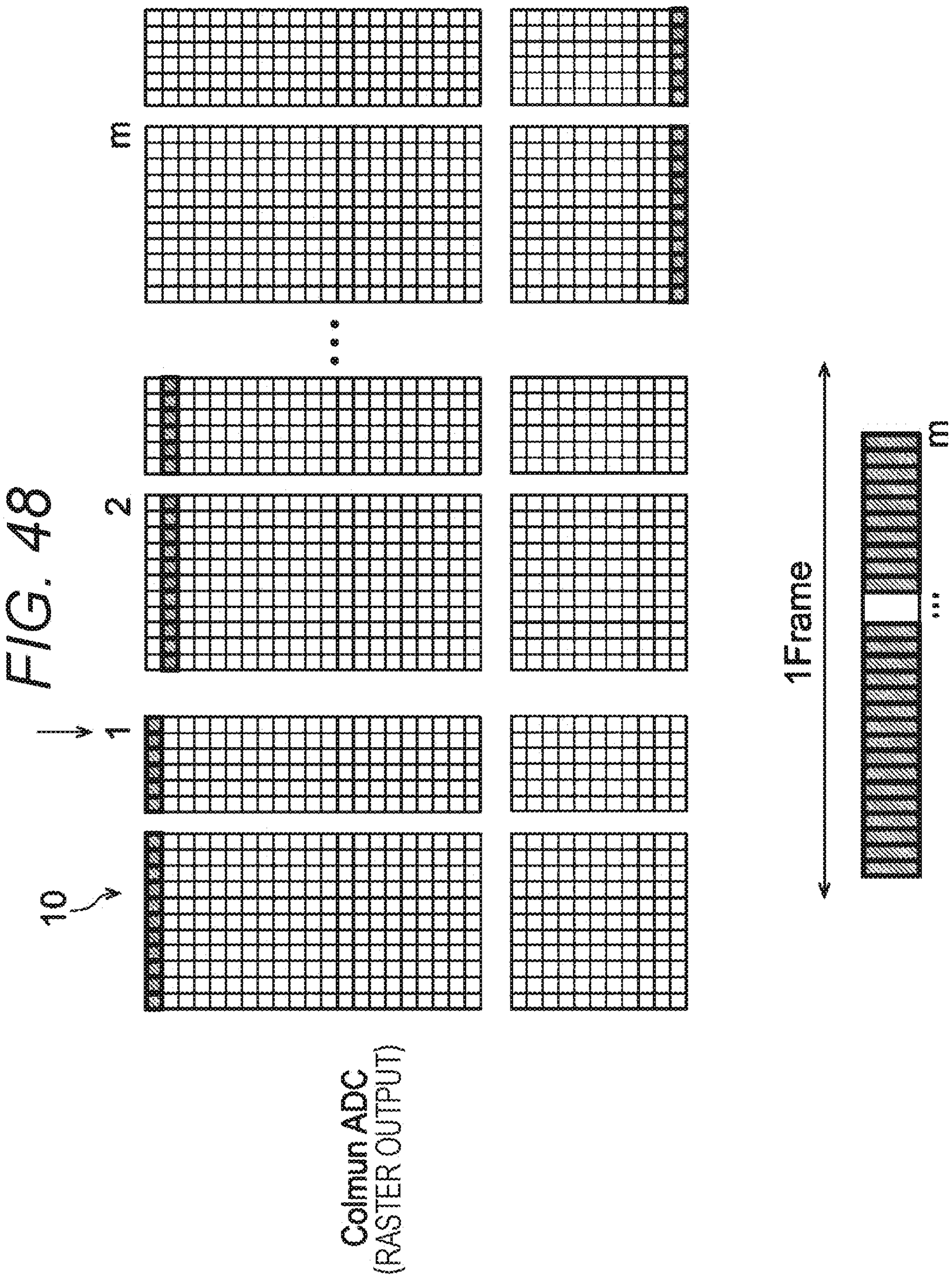
FIG. 48 is a view depicting an imaging operation example of a comparative example.

FIG. 48 is a view depicting an imaging operation example of a comparative example. FIG. 48 is a so-called raster system, and an image captured for each row is subjected to raster output, so that the image is distorted. The so-called raster system may be referred to as a rolling shutter system. Therefore, focal position control of the lens 2 is also lower than focal position control in imaging by the global shutter method according to the present embodiment.

In this way, according to the present embodiment, the control circuit 3 performs the cluster reading to read the pixel circuits 210 in a cluster in a predetermined order, and the AF control inference unit 1500 (see FIG. 41) infers a lens position of the next sub frame from phase difference information detected from the image-plane phase difference pixel read by the phase difference detecting section 1400 in a predetermined order, for example, for each sub frame. Then, the control circuit 3 moves the lens 2 to the inferred position. As a result, for example, the focal position control can be performed for each sub frame.

Eighth Embodiment

Technology (present technology) according to the present disclosure is applicable to various products. For example, the technology according to the present disclosure may also be realized as a device mounted on any type of mobile body such as an automobile, an electric automobile, a hybrid electric automobile, a motorcycle, a bicycle, a personal mobility, an airplane, a drone, a ship, and a robot.

Figure 49:
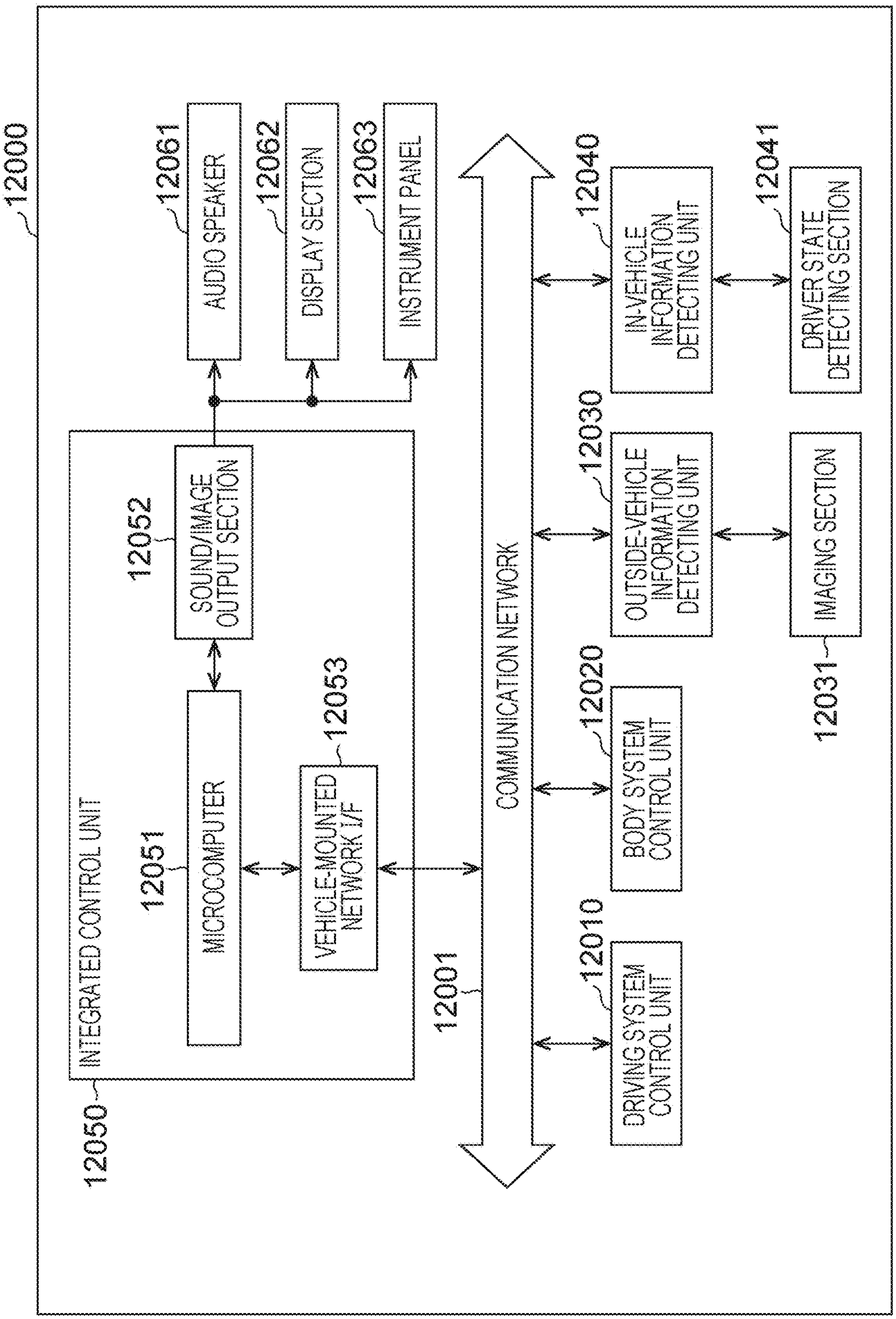
FIG. 49 is a block diagram depicting an example of a schematic configuration of a vehicle control system.

FIG. 49 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 49, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 41, an audio speaker 12061, a display section 12062, and an instrument panel 12063 are illustrated as the output device. The display section 12062 may, for example, include at least one of an on-board display and a head-up display.

Figure 50:
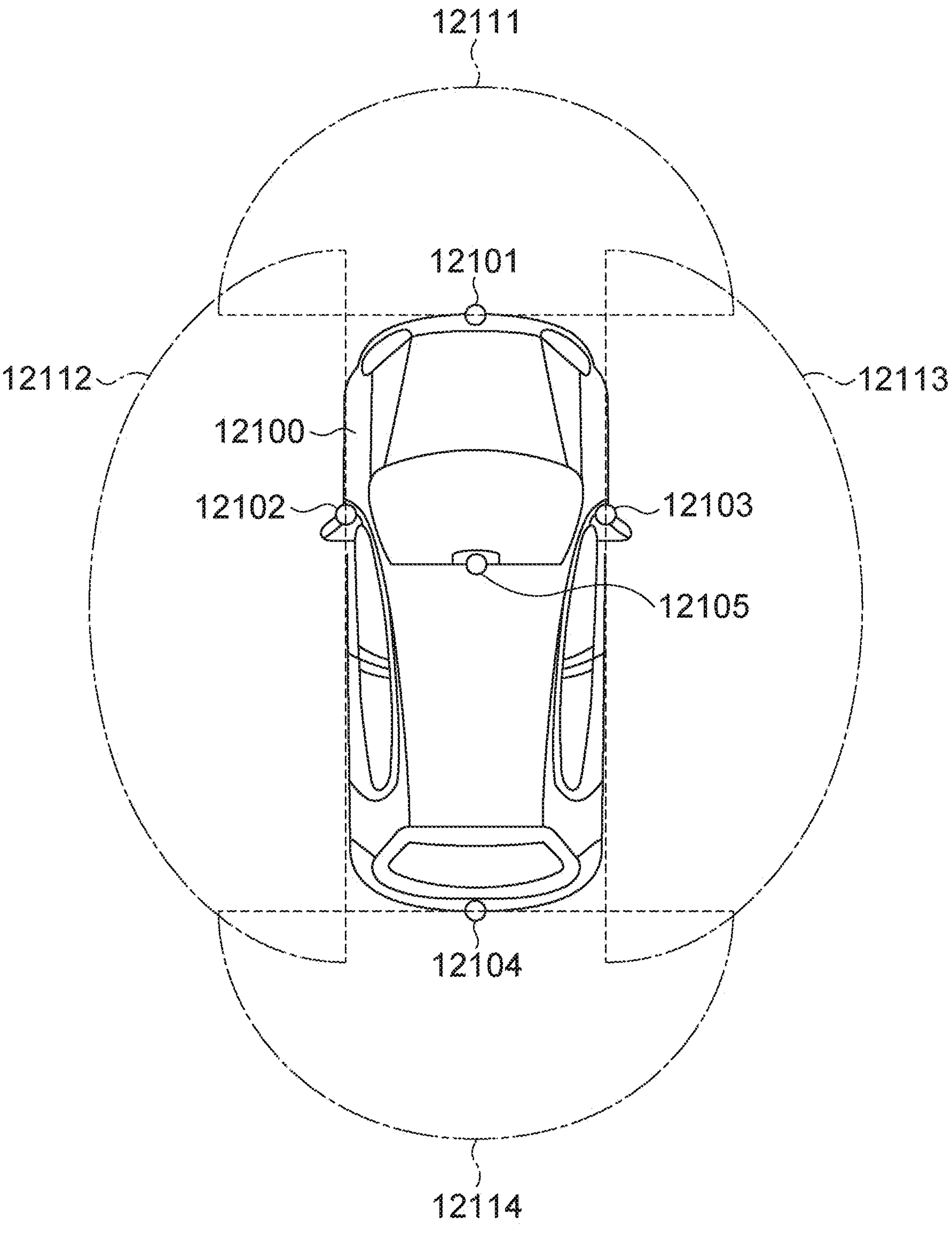
FIG. 50 is an explanatory view depicting an example of installation positions of an outside-vehicle information detecting section and an imaging section.

FIG. 50 is a diagram depicting an example of the installation position of the imaging section 12031.

In FIG. 50, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 50 depicts an example of photographing ranges of the imaging sections 12101 to 12104. An imaging range 12111 indicates an imaging range of the imaging section 12101 provided at the front nose, imaging ranges 12112 and 12113 indicate imaging ranges of the imaging sections 12102 and 12103 each provided at the side mirrors, and an imaging range 12114 indicates an imaging range of the imaging section 12104 provided at the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 and the like, for example, among the configurations described above. Specifically, for example, the electronic device 1 in FIG. 1 can be applied to the imaging section 12031. By applying the technology according to the present disclosure to the imaging section 12031, it is possible to set a mode according to an imaging environment, and it is possible to generate image data with higher definition or image data with lower distortion.

Note that the present technology can have the following configurations.

(1)

An imaging apparatus including a plurality of pixel units, in which each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

(2)

The imaging apparatus according to (1), in which each of the plurality of photoelectric conversion elements is connected to the floating diffusion via a first transistor, and the imaging apparatus further includes a vertical driving unit configured to supply a first control signal that brings the first transistor into a connected state or a disconnected state.

(3)

The imaging apparatus according to (1) or (2), in which a predetermined potential is supplied to each of the plurality of photoelectric conversion elements via a second transistor, and the vertical driving unit further includes a vertical driving unit configured to supply two control signals that bring the second transistor into a connected state or a disconnected state.

(4)

The imaging apparatus according to (2) or (3), in which the vertical driving unit changes the first control signal and the second control signal in response to a mode setting signal.

(5)

The imaging apparatus according to (1), in which each of the plurality of photoelectric conversion elements receives light in a same wavelength band.

(6)

The imaging apparatus according to (1), in which, at least two photoelectric conversion elements among the plurality of photoelectric conversion elements individually receives light via color filters of different colors.

(7)

The imaging apparatus according to (1), in which at least one of the plurality of photoelectric conversion elements is configured as a pixel in which a light receiving unit is partially shielded from light by a light shielding member.

(8)

The imaging apparatus according to (1), in which each of the plurality of photoelectric conversion elements receives light via a lens arranged at each corresponding position.

(9)

The imaging apparatus according to (1), in which at least two photoelectric conversion elements among the plurality of photoelectric conversion elements receive light via one lens arranged at a position corresponding to the at least two photoelectric conversion elements.

(10)

The imaging apparatus according to (1), in which the plurality of photoelectric conversion elements includes a first photoelectric conversion element formed containing silicon and a second photoelectric conversion element formed containing non-silicon.

(11)

The imaging apparatus according to (10), in which the first photoelectric conversion element and the second photoelectric conversion element are stacked, and the first photoelectric conversion element receives light transmitted through the second photoelectric conversion element.

(12)

The imaging apparatus according to (11), in which the imaging apparatus receives light transmitted through a lens arranged at a position corresponding to the stacked first and second photoelectric conversion elements.

(13)

The imaging apparatus according to (4), in which, in the first mode, the vertical driving unit controls the second transistor connected to each of the plurality of photoelectric conversion elements from a disconnected state to a connected state in time series.

(14)

The imaging apparatus according to (4), in which, in the second mode, the vertical driving unit simultaneously controls the second transistor connected to each of the plurality of photoelectric conversion elements from a disconnected state to a connected state.

(15)

The imaging apparatus according to (1), in which the plurality of photoelectric conversion elements in each of the pixel units includes at least two or more photoelectric conversion elements configured to receive light through a green filter, a photoelectric conversion element configured to receive light through a red filter, and a photoelectric conversion element configured to receive light through a blue filter, and there are:

a mode in which electric charges generated by the plurality of photoelectric conversion elements are individually transferred to the floating diffusion in different periods, and a conversion period of the analog-to-digital conversion unit is made different in accordance with the different periods; and a mode including a first period in which an electric charge generated by the photoelectric conversion element that has received light via the red filter or the blue filter is transferred to the floating diffusion and converted by the analog-to-digital conversion unit, the mode including a second period different from the first period in which electric charges generated by the at least two or more photoelectric conversion elements that receive light via the green filter are transferred to the floating diffusion and simultaneously converted by the analog-to-digital conversion unit.

(16)

The imaging apparatus according to (1), in which light is received through one lens arranged at a position corresponding to at least two photoelectric conversion elements among the plurality of photoelectric conversion elements in each of the pixel units, and there are:

a mode in which electric charges generated by the two photoelectric conversion elements are individually transferred to the floating diffusion in different periods, and a conversion period of the analog-to-digital conversion unit is made different in accordance with the different periods; and a mode in which electric charges generated by the two photoelectric conversion elements are transferred to the floating diffusion, and are simultaneously converted by the analog-to-digital conversion unit.

(17)

The imaging apparatus according to (1), in which light is received through one lens arranged at a position corresponding to at least four photoelectric conversion elements among the plurality of photoelectric conversion elements in each of the pixel units, and there are:

a mode in which electric charges generated by the four photoelectric conversion elements are individually transferred to the floating diffusion in different periods, and a conversion period of the analog-to-digital conversion unit is made different in accordance with the different periods;

a mode in which electric charges generated by two photoelectric conversion elements among the four photoelectric conversion are transferred to the floating diffusion, and are simultaneously converted by the analog-to-digital conversion unit; and a mode in which electric charges generated by the four photoelectric conversion elements are transferred to the floating diffusion, and are simultaneously converted by the analog-to-digital conversion unit.

(18)

The imaging apparatus according to (1), in which among the plurality of photoelectric conversion elements in each of the pixel units, a pixel is configured in which a light receiving unit is partially shielded from light by a light shielding member, and there are:

a mode in which electric charges generated by the plurality of photoelectric conversion elements are individually transferred to the floating diffusion in different periods, and a conversion period of the analog-to-digital conversion unit is made different in accordance with the different periods; and a mode in which an electric charge generated by a photoelectric conversion element that has received light via the predetermined diaphragm is transferred to the floating diffusion and converted by the analog-to-digital conversion unit, and then electric charges generated by photoelectric conversion elements different from the photoelectric conversion element that has received light via the predetermined diaphragm among the plurality of photoelectric conversion elements are transferred to the floating diffusion and simultaneously converted by the analog-to-digital conversion unit.

(19)

There are:

a mode in which electric charges generated by at least two photoelectric conversion elements among the plurality of photoelectric conversion elements in each of the pixel units are individually transferred to the floating diffusion in different periods, and a conversion period of the analog-to-digital conversion unit is made different in accordance with the different periods; and a mode in which an electric charge generated by one photoelectric conversion element among the plurality of photoelectric conversion elements is transferred to the floating diffusion and converted by the analog-to-digital conversion unit, and then electric charges generated by two photoelectric conversion elements among the plurality of photoelectric conversion elements are transferred to the floating diffusion and simultaneously converted by the analog-to-digital conversion unit.

(20)

An imaging apparatus in which a plurality of first pixel units and a plurality of second pixel units are arranged, a first control signal supplied to a first pixel unit and a first control signal supplied to a second pixel unit are individually connected to a vertical driving unit, and the vertical driving unit changes the first control signal supplied to the first pixel unit and the first control signal supplied to the second pixel unit in response to a mode setting signal.

(21)

An electronic device including:

the imaging apparatus according to (4); and a control unit configured to generate the mode setting signal in accordance with image data generated using the imaging apparatus.

(22)

The electronic device according to (21), in which the control unit generates the mode setting signal on the basis of a degree of brightness of a subject based on the image data and a degree of motion of the subject.

(23)

The electronic device according to (21), in which the control unit generates the mode setting signal on the basis of a degree of motion of the subject.

(24)

An electronic device including:

a pixel array unit including a plurality of pixel groups each including a plurality of image-plane phase difference pixels; and a control unit configured to perform control to provide a different timing of imaging a subject through a lens for each of the plurality of pixel groups, in which there is at least one of:

a fixed mode in which a position of the lens is fixed; or a moving mode in which a position of the lens is different for each of the different timings.

(25)

The electronic device according to (24), further including:

a phase difference detecting section configured to generate phase difference information on the basis of an image signal of the plurality of phase difference pixels; and an inference unit configured to use the phase difference information to infer a position of the lens in a next frame or a next sub frame.

(26)

The electronic device according to (25), in which in the fixed mode, the phase difference detecting section generates time-series phase difference information on the basis of an image signal of the plurality of phase difference pixels, the image signal being obtained for each of the plurality of pixel groups, and the inference unit uses the time-series phase difference information to infer a position of the lens of a next frame.

(27)

The electronic device according to (26), in which the control unit moves the lens to a position of the lens inferred by the inference unit on the basis of image capture start time of a next frame.

(28)

The electronic device according to (24), in which in the moving mode, the control unit causes a display section to display a captured image obtained for the plurality of pixel groups each.

(29)

The electronic device according to (28), further including:

an input unit configured to input an instruction signal for selection of an image to be displayed on the display section, in which the control unit selects a captured image obtained for the plurality of pixel groups each, on the basis of the instruction signal.

(30)

The electronic device according to (29), in which the control unit causes a storage unit to store only a captured image selected from among captured images obtained for the plurality of pixel groups each, on the basis of the instruction signal.

(31)

The electronic device according to (24), in which the pixel array unit is sectioned into rectangular regions, and pixels including the plurality of image-plane phase difference pixels are arranged in a matrix, and the control unit reads image signals in parallel in a predetermined order from a pixel in a region for each of the rectangular regions.

(32)

The electronic device according to (31), in which in the moving mode, a plurality of image-plane phase difference pixels is included in each of the rectangular regions, and the electronic device further includes:

a phase difference detecting section configured to generate phase difference information on the basis of an image signal read in a predetermined order for each of the rectangular regions; and an inference unit capable of inferring a position of a lens in accordance with the predetermined order by using the phase difference information.

(33)

The electronic device according to (32), in which at least a plurality of image-plane phase difference pixels is included in a pixel that is read first for each of the rectangular regions, and the phase difference detecting section generates phase difference information on the basis of a pixel image signal read first for each of the rectangular regions.

(34)

An electronic device in which in a pixel array unit, pixels including the plurality of image-plane phase difference pixels are arranged in a matrix, and the pixel array unit is sectioned into rectangular regions, and the electronic device includes a control unit configured to read image signals in parallel in a predetermined order from a pixel in a region for each of the rectangular regions.

(35)

The electronic device according to any one of (24) to (34), in which the pixel array unit includes a plurality of pixel units, and each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements.

(36)

The electronic device according to (24), in which there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

(37)

The electronic device according to any one of (24) to (30), in which the pixel array unit includes a plurality of pixel units, each of the pixel units includes: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit.

(38)

The electronic device according to (24), in which the pixel array unit includes a plurality of pixel units, each of the pixel units includes: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, light is received through one on-chip lens arranged at a position corresponding to at least two photoelectric conversion elements among the plurality of photoelectric conversion elements in each of the pixel units, and there are:

a mode in which electric charges generated by the two photoelectric conversion elements are individually transferred to the floating diffusion in different periods, and a conversion period of the analog-to-digital conversion unit is made different in accordance with the different periods; and a mode in which electric charges generated by the two photoelectric conversion elements are transferred to the floating diffusion, and are simultaneously converted by the analog-to-digital conversion unit.

(39)

The electronic device according to (24), in which the pixel array unit includes a plurality of pixel units, each of the pixel units includes: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, light is received through one on-chip lens arranged at a position corresponding to at least four photoelectric conversion elements among the plurality of photoelectric conversion elements in each of the pixel units, and there are:

a mode in which electric charges generated by the four photoelectric conversion elements are individually transferred to the floating diffusion in different periods, and a conversion period of the analog-to-digital conversion unit is made different in accordance with the different periods;

a mode in which electric charges generated by two photoelectric conversion elements among the four photoelectric conversion are transferred to the floating diffusion, and are simultaneously converted by the analog-to-digital conversion unit; and a mode in which electric charges generated by the four photoelectric conversion elements are transferred to the floating diffusion, and are simultaneously converted by the analog-to-digital conversion unit.

(40)

The electronic device according to (24), in which the pixel array unit includes a plurality of pixel units, each of the pixel units includes: a plurality of photoelectric conversion elements belonging individually to the plurality of pixel groups;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, at least one of the plurality of photoelectric conversion elements in each of the pixel units is configured as a pixel in which a light receiving unit is partially shielded from light by a light shielding member, and there are:

a mode in which electric charges generated by the plurality of photoelectric conversion elements are individually transferred to the floating diffusion in different periods, and a conversion period of the analog-to-digital conversion unit is made different in accordance with the different periods; and a mode in which an electric charge generated by a photoelectric conversion element that has received light via a predetermined diaphragm is transferred to the floating diffusion and converted by the analog-to-digital conversion unit, and then electric charges generated by photoelectric conversion elements different from the photoelectric conversion element that has received light via the predetermined diaphragm among the plurality of photoelectric conversion elements are transferred to the floating diffusion and simultaneously converted by the analog-to-digital conversion unit.

(41)

An electronic device including:

a pixel array unit including a plurality of pixel groups each including a plurality of image-plane phase difference pixels;

a control unit configured to perform control to provide a different timing of imaging a subject through a lens for each of the plurality of pixel groups;

a phase difference detecting section configured to generate time-series phase difference information on the basis of an image signal of the plurality of phase difference pixels, the image signal being obtained for each of the plurality of pixel groups; and an inference unit configured to use the time-series phase difference information to infer a position of the lens of a next frame.

(42)

An electronic device including:

a pixel array unit including a plurality of pixel groups each including a plurality of image-plane phase difference pixels; and a control unit configured to perform control to provide a different timing of imaging a subject through a lens for each of the plurality of pixel groups, in which the control unit changes a position of the lens for each of the plurality of pixel groups.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Electronic device
2 Lens
3 Control unit
4 Imaging apparatus
10 Pixel array unit
40 Vertical driving unit
100, 100*a*, 100*b* Pixel unit
190 Analog-to-digital conversion unit
300, 302, 304 On-chip lens
1400 phase difference detecting section
1500 AF control inference unit
FD Floating diffusion (energy storage unit)
TR1 Overflow gate transistor (first transistor)
TR2 Charge transfer transistor (second transistor)
TRG_A to TRG_D, TRG_A1 to TRG_D1, TRG_A2 to TRG_D2 Control signal
OFG_A to OFG_D, OFG_A1 to OFG_D1, OFG_A2 to OFG_D2 Control signal
PD_A to PD_D, PC_E to PC_H Photoelectric conversion element
10 FD Floating diffusion

The invention claimed is:

1. An imaging apparatus comprising:

a plurality of pixel units, wherein each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit, wherein the second mode includes multiple periods in which different subsets of the plurality of photoelectric conversion elements are transferred to the floating diffusion, and wherein a first subset of the plurality of photoelectric conversion elements is converted in a first period and a second subset of the plurality of photoelectric conversion elements is simultaneously converted in a second period different from the first period.

2. The imaging apparatus according to claim 1, wherein each of the plurality of photoelectric conversion elements is connected to the floating diffusion via a first transistor, and the imaging apparatus further comprises a vertical driving unit configured to supply a first control signal that brings the first transistor into a connected state or a disconnected state.

3. The imaging apparatus according to claim 2, wherein a predetermined potential is supplied to each of the plurality of photoelectric conversion elements via a second transistor, and the vertical driving unit further includes a vertical driving unit configured to supply the first control signal and a second control signal that bring the second transistor into a connected state or a disconnected state.

4. The imaging apparatus according to claim 3, wherein the vertical driving unit changes the first control signal and the second control signal in response to a mode setting signal.

5. The imaging apparatus according to claim 1, wherein each of the plurality of photoelectric conversion elements receives light in a same wavelength band.

6. The imaging apparatus according to claim 1, wherein at least two photoelectric conversion elements among the plurality of photoelectric conversion elements individually receives light via color filters of different colors.

7. The imaging apparatus according to claim 1, wherein at least one of the plurality of photoelectric conversion elements is configured as a pixel in which a light receiving unit is partially shielded from light by a light shielding member.

8. The imaging apparatus according to claim 1, wherein each of the plurality of photoelectric conversion elements receives light via a lens arranged at each corresponding position.

9. The imaging apparatus according to claim 1, wherein at least two photoelectric conversion elements among the plurality of photoelectric conversion elements receive light via one lens arranged at a position corresponding to the at least two photoelectric conversion elements.

10. The imaging apparatus according to claim 1, wherein the plurality of photoelectric conversion elements includes a first photoelectric conversion element formed containing silicon and a second photoelectric conversion element formed containing non-silicon.

11. The imaging apparatus according to claim 10, wherein the first photoelectric conversion element and the second photoelectric conversion element are stacked, and the first photoelectric conversion element receives light transmitted through the second photoelectric conversion element.

12. The imaging apparatus according to claim 11, wherein the imaging apparatus receives light transmitted through a lens arranged at a position corresponding to the stacked first and second photoelectric conversion elements.

13. The imaging apparatus according to claim 4, wherein, in the first mode, the vertical driving unit controls the first transistor connected to each of the plurality of photoelectric conversion elements from a disconnected state to a connected state in time series.

14. The imaging apparatus according to claim 4, wherein, in the second mode, the vertical driving unit simultaneously controls the first transistor connected to each of the plurality of photoelectric conversion elements from a disconnected state to a connected state.

15. The imaging apparatus according to claim 1, wherein light is received through one lens arranged at a position corresponding to at least two photoelectric conversion elements among the plurality of photoelectric conversion elements in each of the pixel units, and there are:

a mode in which electric charges generated by the two photoelectric conversion elements are individually transferred to the floating diffusion in different periods, and a conversion period of the analog-to-digital conversion unit is made different in accordance with the different periods; and a mode in which electric charges generated by the two photoelectric conversion elements are transferred to the floating diffusion, and are simultaneously converted by the analog-to-digital conversion unit.

16. The imaging apparatus according to claim 1, wherein at least one of the plurality of photoelectric conversion elements in each of the pixel units is configured as a pixel in which a light receiving unit is partially shielded from light by a light shielding member, and there are:

a mode in which electric charges generated by the plurality of photoelectric conversion elements are individually transferred to the floating diffusion in different periods, and a conversion period of the analog-to-digital conversion unit is made different in accordance with the different periods; and a mode in which an electric charge generated by a photoelectric conversion element that has received light via a predetermined diaphragm is transferred to the floating diffusion and converted by the analog-to-digital conversion unit, and then electric charges generated by photoelectric conversion elements different from the photoelectric conversion element that has received light via the predetermined diaphragm among the plurality of photoelectric conversion elements are transferred to the floating diffusion and simultaneously converted by the analog-to-digital conversion unit.

17. An imaging apparatus comprising:

a plurality of pixel units, wherein each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit, wherein the plurality of photoelectric conversion elements in each of the pixel units includes at least two or more photoelectric conversion elements configured to receive light through a green filter, a photoelectric conversion element configured to receive light through a red filter, and a photoelectric conversion element configured to receive light through a blue filter, and there are:

a mode in which electric charges generated by the plurality of photoelectric conversion elements are individually transferred to the floating diffusion in different periods, and a conversion period of the analog-to-digital conversion unit is made different in accordance with the different periods; and a mode including a first period in which an electric charge generated by the photoelectric conversion element that has received light via the red filter or the blue filter is transferred to the floating diffusion and converted by the analog-to-digital conversion unit, the mode including a second period different from the first period in which electric charges generated by the at least two or more photoelectric conversion elements that receive light via the green filter are transferred to the floating diffusion and simultaneously converted by the analog-to-digital conversion unit.

18. An imaging apparatus comprising:

a plurality of pixel units, wherein each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit, wherein light is received through one lens arranged at a position corresponding to at least four photoelectric conversion elements among the plurality of photoelectric conversion elements in each of the pixel units, and there are:

a mode in which electric charges generated by the four photoelectric conversion elements are individually transferred to the floating diffusion in different periods, and a conversion period of the analog-to-digital conversion unit is made different in accordance with the different periods;

a mode in which electric charges generated by two photoelectric conversion elements among the four photoelectric conversion are transferred to the floating diffusion, and are simultaneously converted by the analog-to-digital conversion unit; and a mode in which electric charges generated by the four photoelectric conversion elements are transferred to the floating diffusion, and are simultaneously converted by the analog-to-digital conversion unit.

19. An imaging apparatus comprising:

a plurality of pixel units, wherein each of the pixel units includes:

a plurality of photoelectric conversion elements;

a floating diffusion configured to output an electric charge photoelectrically converted by each of the photoelectric conversion elements in each of the pixel units; and an analog-to-digital conversion unit configured to convert, into a digital signal, a signal corresponding to an electric charge photoelectrically converted by each of the photoelectric conversion elements, and there are:

a first mode in which electric charges photoelectrically converted by the plurality of photoelectric conversion elements are transferred to the floating diffusion in different periods, and a conversion period of the analog-to-digital conversion unit is made different in accordance with the different periods; and a second mode in which electric charges generated by at least two of the plurality of photoelectric conversion elements are transferred to the floating diffusion, and are simultaneously converted by the analog-to-digital conversion unit, wherein there are:

a mode in which electric charges generated by at least two photoelectric conversion elements among the plurality of photoelectric conversion elements in each of the pixel units are individually transferred to the floating diffusion in different periods, and a conversion period of the analog-to-digital conversion unit is made different in accordance with the different periods; and a mode in which an electric charge generated by one photoelectric conversion element among the plurality of photoelectric conversion elements is transferred to the floating diffusion and converted by the analog-to-digital conversion unit, and then electric charges generated by two photoelectric conversion elements among the plurality of photoelectric conversion elements are transferred to the floating diffusion and simultaneously converted by the analog-to-digital conversion unit.

20. An electronic device comprising:

the imaging apparatus according to claim 4; and a control unit configured to generate the mode setting signal in accordance with image data generated using the imaging apparatus.

21. The electronic device according to claim 20, wherein the control unit generates the mode setting signal on a basis of a degree of brightness of a subject based on the image data.

22. The electronic device according to claim 20, wherein the control unit generates the mode setting signal on a basis of a degree of motion of a subject based on the image data.

* * * * *